United States Patent
Ball et al.

(10) Patent No.: US 8,281,800 B2
(45) Date of Patent: Oct. 9, 2012

(54) FAUCET MOUNTING SLEEVE

(75) Inventors: William T. Ball, Colorado Springs, CO (US); William L. Carlson, Elbert, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 253 days.

(21) Appl. No.: 12/649,103

(22) Filed: Dec. 29, 2009

(65) Prior Publication Data

US 2010/0116359 A1      May 13, 2010

Related U.S. Application Data

(63) Continuation-in-part of application No. 12/115,223, filed on May 5, 2008.

(60) Provisional application No. 60/947,902, filed on Jul. 3, 2007.

(51) Int. Cl.
*F16L 5/00*      (2006.01)
*F17D 3/00*      (2006.01)
*F16L 3/10*      (2006.01)
*F16M 13/02*     (2006.01)

(52) U.S. Cl. .......... 137/359; 137/360; 137/556; 248/70; 248/73; 248/542

(58) Field of Classification Search .......... 137/356–360, 137/377, 556; 248/73, 74.1, 540, 541, 230.1, 248/673, 674, 676–678, 70, 542

See application file for complete search history.

(56) References Cited

U.S. PATENT DOCUMENTS

| | | | | |
|---|---|---|---|---|
| 181,133 | A | * | 8/1876 | Berger .......................... 248/71 |
| 352,805 | A | * | 11/1886 | Carr .............................. 248/70 |
| 425,852 | A | * | 4/1890 | Berger .......................... 248/71 |
| 1,278,895 | A | * | 9/1918 | Farley .......................... 126/315 |
| 1,556,241 | A | | 10/1925 | Mueller |
| 1,816,443 | A | * | 7/1931 | Shaw ............................ 248/70 |
| 2,053,262 | A | * | 9/1936 | Cornell, Jr. ................... 248/65 |
| D239,448 | S | | 4/1976 | Kazienko et al. |
| 4,186,761 | A | * | 2/1980 | Guarnieri ................. 137/315.15 |
| 4,206,779 | A | | 6/1980 | Sandstrom |
| 4,366,866 | A | | 1/1983 | Sweeney |

(Continued)

FOREIGN PATENT DOCUMENTS

JP      2005-54387      3/2005

OTHER PUBLICATIONS

Official Action for Canadian Patent Application No. 2,636,578, dated May 6, 2011.

(Continued)

*Primary Examiner* — Craig Schneider
*Assistant Examiner* — Jonathan Waddy
(74) *Attorney, Agent, or Firm* — Sheridan Ross P.C.

(57) ABSTRACT

A system for mounting a faucet to the exterior portion of a dwelling is provided. A mounting sleeve is employed that is associated with a tube that is interconnected to the faucet that is generally positioned outside of a dwelling. The tube is rigidly interconnected to a mounting sleeve that is supported by at least one bracket that allows for selective adjustments. That is, the mounting sleeve may be selectively offset from the interior surface of the dwelling, thereby accommodating exterior building surfaces with irregular shapes such as stone, brick, mortar, stucco, etc. The mounting system provides additional rigidity to the faucet/dwelling interconnection.

9 Claims, 50 Drawing Sheets

U.S. PATENT DOCUMENTS

| | | | |
|---|---|---|---|
| D270,090 S | 8/1983 | Jennings | |
| 4,473,244 A | 9/1984 | Hill | |
| 4,490,954 A | 1/1985 | Cresti | |
| 4,848,395 A * | 7/1989 | Krippendorf | 137/359 |
| 4,863,201 A | 9/1989 | Carstens | |
| 4,878,696 A * | 11/1989 | Walker | 285/61 |
| 4,989,278 A | 2/1991 | Kostorz | |
| 5,033,777 A | 7/1991 | Blenkush | |
| 5,050,632 A | 9/1991 | Means, Jr. | |
| 5,316,041 A | 5/1994 | Ramacier et al. | |
| 5,381,826 A | 1/1995 | Franz | |
| 5,390,876 A * | 2/1995 | Hatano et al. | 248/73 |
| 5,535,776 A | 7/1996 | Kingman | |
| 5,547,152 A * | 8/1996 | Krock | 248/74.1 |
| 5,577,530 A | 11/1996 | Condon | |
| 5,582,199 A | 12/1996 | Schmidt et al. | |
| 5,803,508 A | 9/1998 | Lowella | |
| D408,895 S | 4/1999 | Lai | |
| 5,906,401 A | 5/1999 | Viegener | |
| 5,996,295 A | 12/1999 | Merkle | |
| 6,065,491 A | 5/2000 | Rider | |
| 6,142,172 A | 11/2000 | Shuler et al. | |
| 6,195,818 B1 | 3/2001 | Rodstein et al. | |
| D450,814 S | 11/2001 | Aldred et al. | |
| 6,360,770 B1 | 3/2002 | Buchner et al. | |
| 6,389,756 B1 | 5/2002 | Oberdorfer | |
| 6,394,125 B2 | 5/2002 | White | |
| 6,431,204 B1 | 8/2002 | Ball | |
| 6,578,800 B2 * | 6/2003 | Stefan | 248/52 |
| D477,385 S | 7/2003 | Hampton | |
| D478,652 S | 8/2003 | Lai | |
| 6,717,055 B2 * | 4/2004 | Kato | 174/72 A |
| D510,131 S | 9/2005 | Karasawa | |
| 6,948,518 B1 | 9/2005 | Ball | |
| 7,040,670 B2 | 5/2006 | Madden | |
| 7,055,863 B1 | 6/2006 | Commeulle et al. | |
| D586,880 S | 2/2009 | Gaston et al. | |
| D612,021 S | 3/2010 | Schmidt | |
| D622,348 S | 8/2010 | Gaston et al. | |
| D631,139 S | 1/2011 | Ball et al. | |
| D631,140 S | 1/2011 | Ball et al. | |
| D631,141 S | 1/2011 | Ball et al. | |
| D633,988 S | 3/2011 | Ball et al. | |
| D637,696 S | 5/2011 | Ball et al. | |
| 2004/0035064 A1 | 2/2004 | Kugler et al. | |
| 2005/0138726 A1 * | 6/2005 | Daly | 4/695 |
| 2007/0157981 A1 | 7/2007 | Burns et al. | |
| 2009/0007971 A1 | 1/2009 | Ball | |
| 2009/0211021 A1 | 8/2009 | Gabriele | |
| 2010/0116359 A1 | 5/2010 | Ball et al. | |
| 2010/0180375 A1 | 7/2010 | Meehan et al. | |

OTHER PUBLICATIONS

Official Action for U.S. Appl. No. 12/115,223, mailed Apr. 22, 2011.
Notice of Allowance for U.S. Appl. No. 29/333,698, mailed Mar. 17, 2011
Notice of Allowance for U.S. Appl. No. 29/383,460, mailed Feb. 10, 2011.
Advertisement entitled, "InBox™ for New Brick Weatherproof in Use Box with Protective Adapter Sleeve," Arlington Industries, Inc., 2006.
"Hose Bib Supporter", PerfectSett Product Sheet, 2006, p. 1.
Examiner's Report for Canadian Patent Application No. 132120, dated Jan. 6, 2010.
Official Action for Canadian Patent Application No. 2,636,578, dated Sep. 24, 2010.
Official Action for Canadian Patent Application No. 136095, dated Aug. 20, 2010.
Official Action for U.S. Appl. No. 29/352,946, mailed Sep. 29, 2010.
Notice of Allowability for U.S. Appl. No. 29/352,946, mailed Nov. 10, 2010.
Official Action for U.S. Appl. No. 29/352,949, mailed Sep. 29, 2010.
Notice of Allowance for U.S. Appl. No. 29/352,949, mailed Oct. 25, 2010.
Notice of Allowance for U.S. Appl. No. 29/352,945, mailed Oct. 25, 2010.
Official Action for U.S. App. No. 29/352,948, mailed Sep. 29, 2010.
Notice of Allowance for U.S. Appl. No. 29/352,948, mailed Oct. 27, 2010.

* cited by examiner

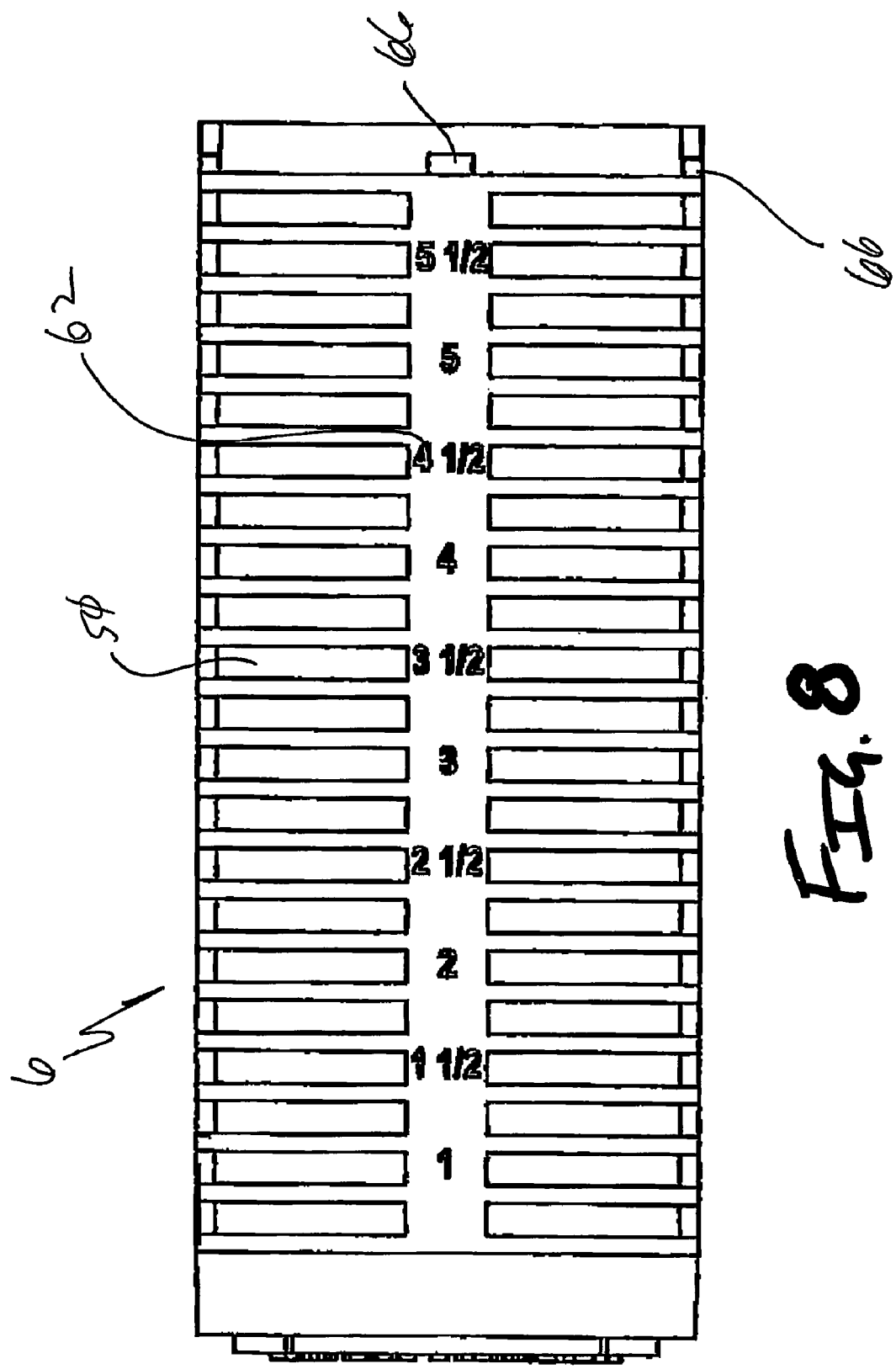

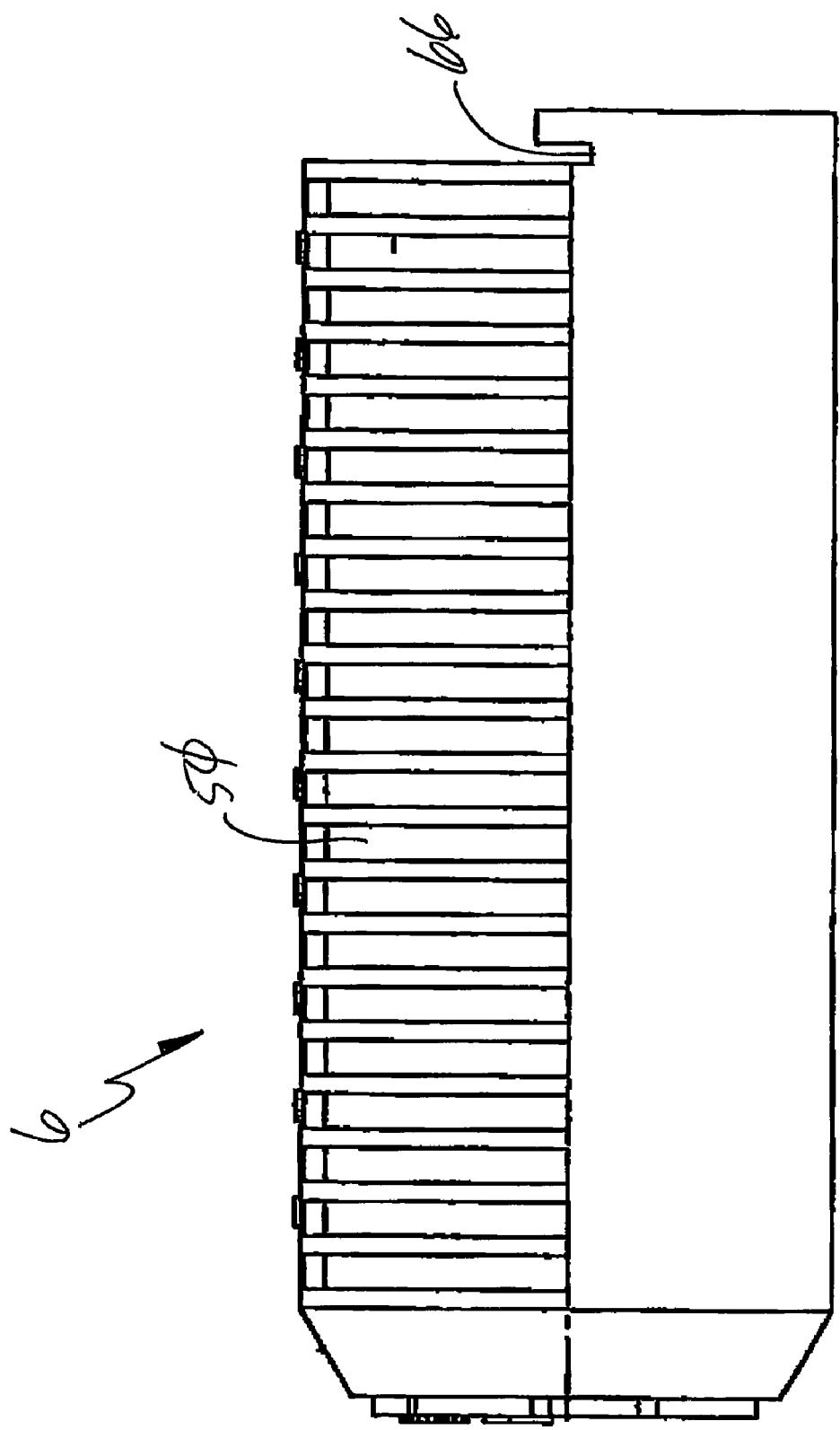

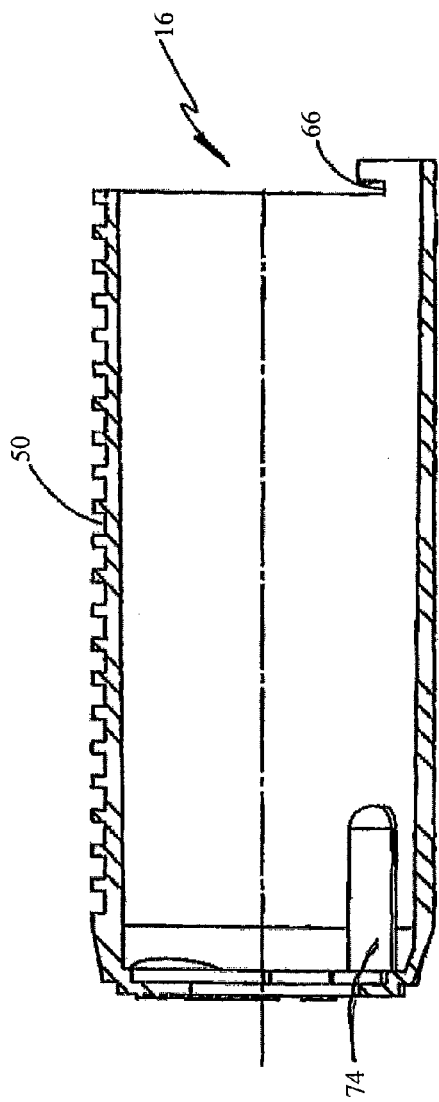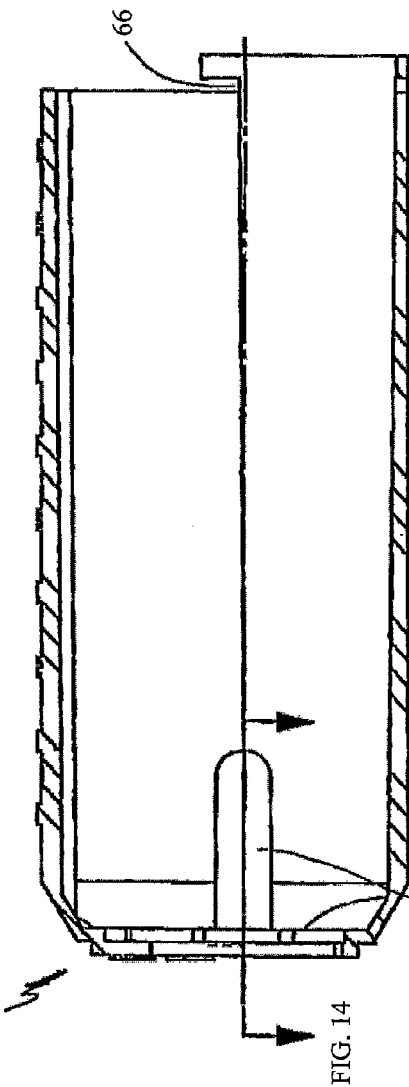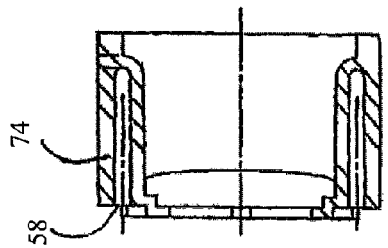

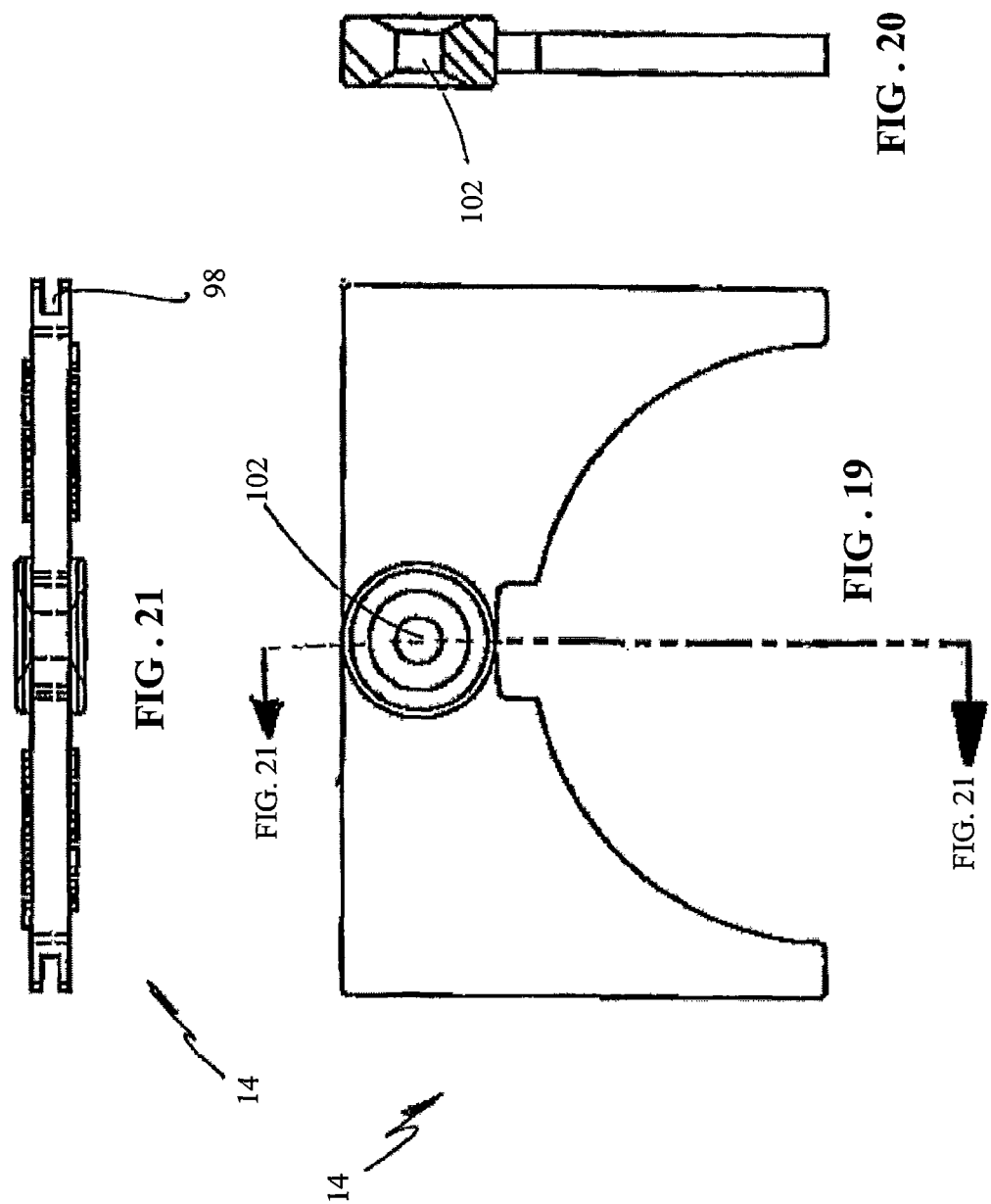

FAUCET MOUNTING SLEEVE

CROSS-REFERENCE TO RELATED APPLICATIONS

The present application is a continuation-in-part of U.S. patent application Ser. No. 12/115,223, filed May 5, 2008, entitled "Faucet Mounting Sleeve," which claims the benefit of U.S. Provisional Patent Application Ser. No. 60/947,902, filed Jul. 3, 2007, the entire disclosures of which are incorporated by reference herein.

FIELD OF THE INVENTION

Embodiments of the present invention are generally related to devices for securing faucets, or other fluid delivery devices, to a building surface. More specifically, a mounting assembly is used in conjunction with securing a faucet to an uneven exterior surface of a dwelling.

BACKGROUND OF THE INVENTION

Wall faucets are very common and often found mounted to the exterior of a dwelling to be used for supplying water outside of the dwelling. Wall faucets include a faucet assembly with a flange that is designed to interconnect to an exterior surface of a dwelling. The wall faucet assembly also includes a tube that is in fluidic communication with the water source of the dwelling. Traditionally, the flanges have been mounted to an exterior surface, i.e. siding of the dwelling. Siding, however, is not the only exterior building surface employed, and as such, often the wall faucet assembly interconnection must accommodate the uneven surface texture of stone, brick, mortar, stucco etc. One skilled in the art will appreciate that it is difficult to interconnect the flange of the faucet to non-continuous building surfaces. One prior art method of installing a faucet employs a plurality of elongated screws that interconnect the faucet flange to the wall. Long screws, however, are unstable and provide little support to the faucet. For example, one skilled in the art can envision that a hose interconnected to the faucet is subject to forces associated with moving or pulling the hose. These forces may be associated with weakening of the interconnection of the faucet to the dwelling and may cause the faucet to dislocate from the exterior building surface. Thus, faucet assemblies that are interconnected to such non-continuous and uneven building surfaces are often not very structurally stable. If a faucet assembly should separate from the dwelling, fluid (i.e., water), insects, or other outdoor contaminants will be able to enter the dwelling. If the faucet assembly is unstable it could also separate from the fluid supply line, thereby causing water/mold damage.

Furthermore, during installation of a faucet assembly, to an exterior building surface an installer must grout or otherwise seal the interconnection location to accommodate the uneven building surface. This additional work increases the time and cost of installation.

There have been devices in the prior art that are used to offset a faucet from an interior building surface to accommodate a brick surface. For example, attention is drawn to the hose bib supporter of PerfectSett made by JCT Innovations, LLC. This device includes a rectangular shaped face that is offset from a plate that is interconnected to the outer surface of the wall, board or sheathing of a building. The face provides a location for interconnection of a faucet assembly. One drawback of the PerfectSett device is that it does not provide selective adjustments and only accommodates exterior building surfaces of a set thickness.

Thus, it is a long felt need in the field of outdoor plumbing to provide a stable interconnection scheme for attaching wall faucets to the exterior surface of a dwelling. The following disclosure describes an improved method and system for interconnecting a wall faucet to the exterior of a building that addresses and overcomes the problems experienced in the prior art.

SUMMARY OF THE INVENTION

It is one aspect of the present invention to provide a mounting box that supports a faucet assembly. More specifically, embodiments of the present invention employ a mounting sleeve that is associated with a fluid delivery tube that terminates at a faucet. The mounting sleeve is interconnected to at least one supporting bracket. The bracket is adapted for interconnection to an interior building surface, which increases the stability of the interconnection of the faucet assembly to the dwelling. The mounting sleeve is adapted to secure the fluid delivery tube and to provide a location for interconnection of the faucet. Embodiments of the present invention employ a mounting sleeve that is selectively adjustable such that a flange of the faucet, which traditionally is used to secure the faucet to an exterior building surface, may be placed generally adjacent to the outer surface of the dwelling and not interconnected directly to it.

Another aspect of the present invention is to provide a system for mounting a wall faucet to a building that increases the stability of the interconnection of the faucet to the building. More specifically, as opposed to prior art methods of interconnecting a wall faucet assembly to a dwelling, embodiments of the present invention employ one or more brackets that are interconnected to an interior (or exterior) building surface. For example, the brackets of the invention may be interconnected to the inside or outside of any building member, such as 2×4 studs, sill plates, a concrete basement wall, a foundation member, headers, sheathing, etc. Interconnecting the brackets to a structural element improves the structurally stability of the faucet assembly. That is, as opposed to prior art systems, which interconnect a the faucet flange directly to an exterior building surface, the mounting sleeve employed in various embodiments of the present invention is held within the brackets, thus supplying a sufficient support to the faucet assembly. In such a manner the above-identified issues related to interconnecting a faucet to mortar, rock, stone, bricks, stucco, etc., are reduced if not eliminated. The method and associated apparatus of the present invention for securing a tube within mounting sleeve, which is then interconnected to a rigidly interconnected bracket, is superior over prior art methods and system of interconnection.

It is another aspect of the present invention to provide a mounting system and methods that allow for robust installation. More specifically, embodiments of the present invention may be installed prior to or after the siding or other exterior building surface is installed. The brackets that secure the mounting sleeve may be installed by the framers, siding installers or plumbers. Guess work as to the location of the faucet is thus reduced. This aspect of the present invention is made possible by the fact that the faucet does not need to be initially installed in order to install the bracket and to locate the mounting sleeve. After installation of the mounting sleeve, the mounting sleeve may be removed from the bracket and associated with the tube of the faucet, for example.

It is still yet another aspect of the present invention to provide a mounting system and method that provides the ability to selectively adjust the location of the faucet. More specifically, embodiments of the present invention provide a mounting sleeve that is adapted to move in relation to the fixed bracket. A second bracket is employed to secure the mounting sleeve relative to the fixed bracket such that no additional movement of the mounting sleeve is possible. This aspect of the invention ultimately allows for the flange of the faucet to be offset (in various dimensions, but particularly along an axis perpendicular from the dwelling wall) from an interior or exterior wall of the dwelling to accommodate the thickness and surface texture of exterior building material such as stone, etc. In operation, if the faucet is not located as envisioned relative to the exterior building surface, quick readjustments are possible that do not require extensive structural modifications as would be necessary with prior art systems.

It is another aspect of the present invention to provide a faucet assembly attachment scheme that improves mounting options, wherein the faucet may be interconnected to an irregular surface easily. That is, as briefly described above, the mounting device of one embodiment of the present invention includes an adjustable mounting sleeve that allows for selective adjustments of the location of the faucet flange, i.e. within a predetermined scope of dimensions from a first anticipated final position. Thus an installer can easily customize the location of the flange such that it be aesthetically pleasing and structurally stable. Embodiments of the present invention also employ a mounting sleeve with a measurement indication mechanism. Preferably, a linear scale is provided associated with each sleeve, e.g. imprinted thereon, molded thereto, etc., to facilitate the installation of a plurality of faucets about the exterior of a building. After one mounting sleeve is interconnected and correctly offset from a house, the remainder of mounting sleeves will be more quickly installed since the required offset is readily known by inspection of the linear scale. Installers will also be able to facilitate installation of mounting sleeves through experience by knowing generally how much offset should be used for a particular building surface, which will reduce time and cost of installing faucets.

Embodiments of the present invention employ components that can be easily replaced. For example, if after installing the mounting sleeve relative to the bracket it is found that the offset is incorrect, it is contemplated that quick adjustments may be made. More specifically, it is contemplated that the length of the mounting sleeve can easily made in order to accommodate unique sizes of bricks, stone, etc. If this is difficult due, for example, to debris or grout residing in the grooves of the mounting sleeve the mounting sleeve can be discarded and a second replacement mounting sleeve can be interconnected to the bracket.

It is yet another aspect of the present invention to prevent water, debris, animals, insects, etc. from entering the dwelling through the faucet connection. That is, when a faucet of the prior art becomes loose or disconnects from the exterior of the dwelling, gaps form that allow the above-mentioned foreign objects to enter the dwelling. For example, gaps between the flange and the building surface allow moisture to penetrate between the faucet flange and the exterior building surfaces. Embodiments of the present invention provide a system and method that minimizes gaps between the external building surface and the faucet associated thereto. More specifically, since the mounting sleeve of embodiments of the present invention is of generally continuous shape (preferably cylindrical, but other shapes are contemplated), the installer can finish, with insulation, foam, mortar etc., up to the outer surface of the mounting sleeve thus reduces or eliminates gaps between the faucet assembly and the exterior building surfaces. A related aspect of the present invention is that the shape of the mounting sleeve and described finishing creates a cleaner appearance that is more aesthetically pleasing to the eye.

It is another aspect of the present invention that the embodiments preferably be constructed of common materials, such as plastic, steel, aluminum, rubber (or other flexible materials), vulcanized rubber, wood, or any other common building materials that comply with applicable codes. Preferably, the mounting sleeve and associated brackets are made of rigid plastic, which is non-corrosive and provides the needed rigidity to secure the faucet assembly.

It is still yet another aspect of the present invention to provide a system that utilizes components that are easily customizable. More specifically, the mounting sleeves of embodiments of the present invention may be made of any color of plastic to blend in with the finished materials, such as the faucet flange of a handle, thereby adding to the aesthetically pleasing appearance of the finished assembly.

It is yet another aspect of the present invention to provide a faucet mounting system that efficiently utilizes pipes generally found in a dwelling. More specifically, faucet mounting schemes of the prior art generally require that the mounting structure be tied in some way to the sill plate, or other building member associated with the foundation or basement wall of a structure. Mounting a faucet in such a way necessarily requires routing (in often a circuitous path) of additional pipes from the main water supply line to the faucet. One of skill in the art will appreciate that with such a routing scheme the probability of leaks increases, and, if a leak should occur, it is often located in low traffic or little used areas of a dwelling (crawl space, basement, etc.). Leaks of this nature can be very damaging since a home owner, for example, will be prevented from quickly addressing the matter.

Thus, embodiments of the invention, due to their ability to be interconnected to a dwelling in areas other than the sill plate, can be placed in such a way to omit the need of a long and complex pipe routing scheme. Embodiments of the invention, for example, may be positioned away from the foundation near the water lines connected to a kitchen sink of a dwelling. Mounting a faucet in such away saves piping and facilitates construction. This mounting location also allows enhanced access to the outside faucet since individuals do not have to bend over as much to access the sill cock. Associating the mounting sleeve with existing pipes also has the advantage of allowing a homeowner to more quickly identify leak and freeze issues since the penetration and pipes associated with the outdoor faucet are located in high traffic and often used area of a dwelling. The location and pipe lengths contemplated also facilitate repair operations. Further, due to its proximity to an interior faucet, the mounting sleeves of embodiments of the present invention may be adapted to accommodate at least two pipes, one for hot water and one for cold, for example. Upon review of the figures provided herein one of skill in the art will appreciate that the mounting brackets employed can be sized to accommodate more than one mounting sleeve and/or a mounting sleeve that is interfaced to more than one fluid pipe.

It is another aspect of the present invention to provide a mounting sleeve that can accommodate faucets having flanges of various shapes. More specifically, some faucets possess a handle that is laterally offset from the faucet outlet whereby access to the handle is improved. To further increase access and to remove obstructions between the faucet and the faucet outlet, the outlet may be angled as well such that the flow of water from the faucet outlet is at an angle relative to the vertical direction.

Faucets of this type also may include an elliptical or oval handle that allows the user to more easily grip the handle and to add additional torque when turning. Thus, one embodiment of the present invention includes a flange interconnected to the mounting sleeve that is adapted to receive faucet flanges that are other than circular. More specifically, the faucets described above, often have an elongated flange to accommodate an enlarged housing wherein the faucet outlet and handle are interconnected thereto. Thus one can appreciate that a mounting sleeve having a circular flange would not adequately accommodate this enlarged flange thus embodiments of the present invention include an enlarged flange of any shape that is customizable to a faucet flange. It is a related aspect of the invention to provide a generic faucet flange that accommodates more than one type, make or model of faucet. Alternatively, one of skill in the art will appreciate that the faucet flange may be customized to fit only a specific faucet.

It is yet another aspect of the present invention to provide a faucet mounting sleeve that is specifically designed for heavy duty applications. More specifically, many industrial faucets include heavy duty flanges and heavier and more bulky faucet components. These are often associated with concrete or metal walls and require additional bracing to maintain the heavier faucet and hoses that are associated therewith that are often pulled abruptly that could cause damage to the faucet. Thus one embodiment of the present invention employs a mounting sleeve that includes a flange that accommodates the larger flanges generally employed by industrial faucets.

It is another aspect of the present invention to provide a mounting sleeve that does not employ a bracket to interconnect the same to a wall. More specifically, some embodiments of the present invention include a mounting sleeve having a threaded outer surface. A threaded outer surface would be situated around the faucet tube and receive a nut element that would sandwich the wall of the structure between the flange of the mounting sleeve and the nut element. One skilled in the art will appreciate that a sleeve of this nature may not necessarily be threaded but may also include a ratchet interconnection wherein the mounting sleeve includes a keyway that selectively sees a sliding element having at least one tooth, wherein rotation of the element would lock the element relative to the mounting sleeve. Such a connection scheme is shown, for example, in U.S. Patent Application Publication No. 2004/0035064 to Kugler et al., the entire disclosure of which is incorporated by reference herein.

It is another aspect of the present invention to provide a sleeve that has telescoping features. For example, one embodiment of the present invention includes a threaded outer sleeve and a threaded inner sleeve that interconnects to the outer sleeve. Of course, one of skill in the art will appreciate that the secondary lengthening sleeve may be situated outside of the primary sleeve that interconnects to the faucet. Such expandability allows for the combination of thicker walls by the mounting sleeve. Furthermore, one skilled in the art will appreciate that the telescoping portions of the sleeve may not be necessarily threaded, but may include other features, such as an interference fit or a keyway type connection, as described above, to achieve the goal of accommodating thicker walls.

It is another aspect of the present invention to provide a mounting system that can accommodate multiple fluid lines. More specifically, one embodiment of the present invention accommodates a faucet having a hot and cold water input. More specifically, it is often desirable to supply hot water, cold water, or a combination thereof. Such faucets include a hot water side and a cold water side that each include a handle for selectively opening a valve to supply the desired temperature of water. These faucets also may include a mixing chamber that allows for the selective alteration of the temperature of the water. Faucets of this nature include at least two input lines, one running to a hot water source and one running to a cold water source. In one embodiment of the present invention an elongated sleeve flange is employed that accommodates at least two mounting sleeves that are associated with each of the input lines. In one embodiment of the present invention, such sleeves include grooves and are interconnected to a bracket as described above. One of skill in the art will appreciate that the mounting flange may include an elongated box or other housing emanating therefrom that accommodates both the hot and cold water lines wherein a large hole is drilled into the wall. However, the preferred embodiment includes two distinct holes, as such are easily formed into a wall with drill bits of common sizes.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 8 is a top plan view of FIG. 7;

FIG. 9 is front elevation view of FIG. 7;

FIG. 12 is a cross-sectional view of FIG. 10;

FIG. 13 is a cross-sectional view of FIG. 12;

FIG. 14 is a cross-sectional view of FIG. 10;

FIG. 19 is a front elevation view of the top bracket shown in FIG. 18;

FIG. 20 is a cross-sectional view of FIG. 19;

FIG. 21 is a top plan view of FIG. 19;

Figure 1:
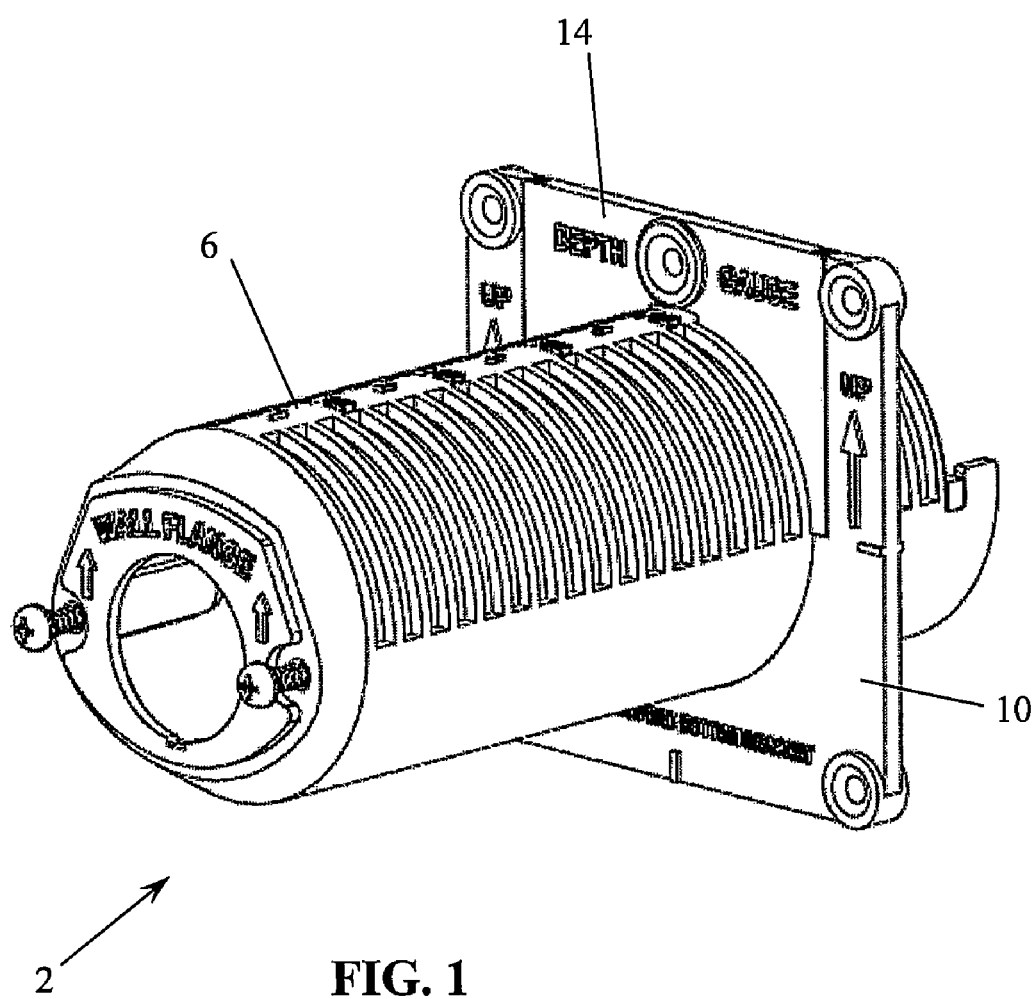
FIG. 1 is a front perspective view of a faucet mounting assembly of one embodiment of the present invention.
Figure 2:
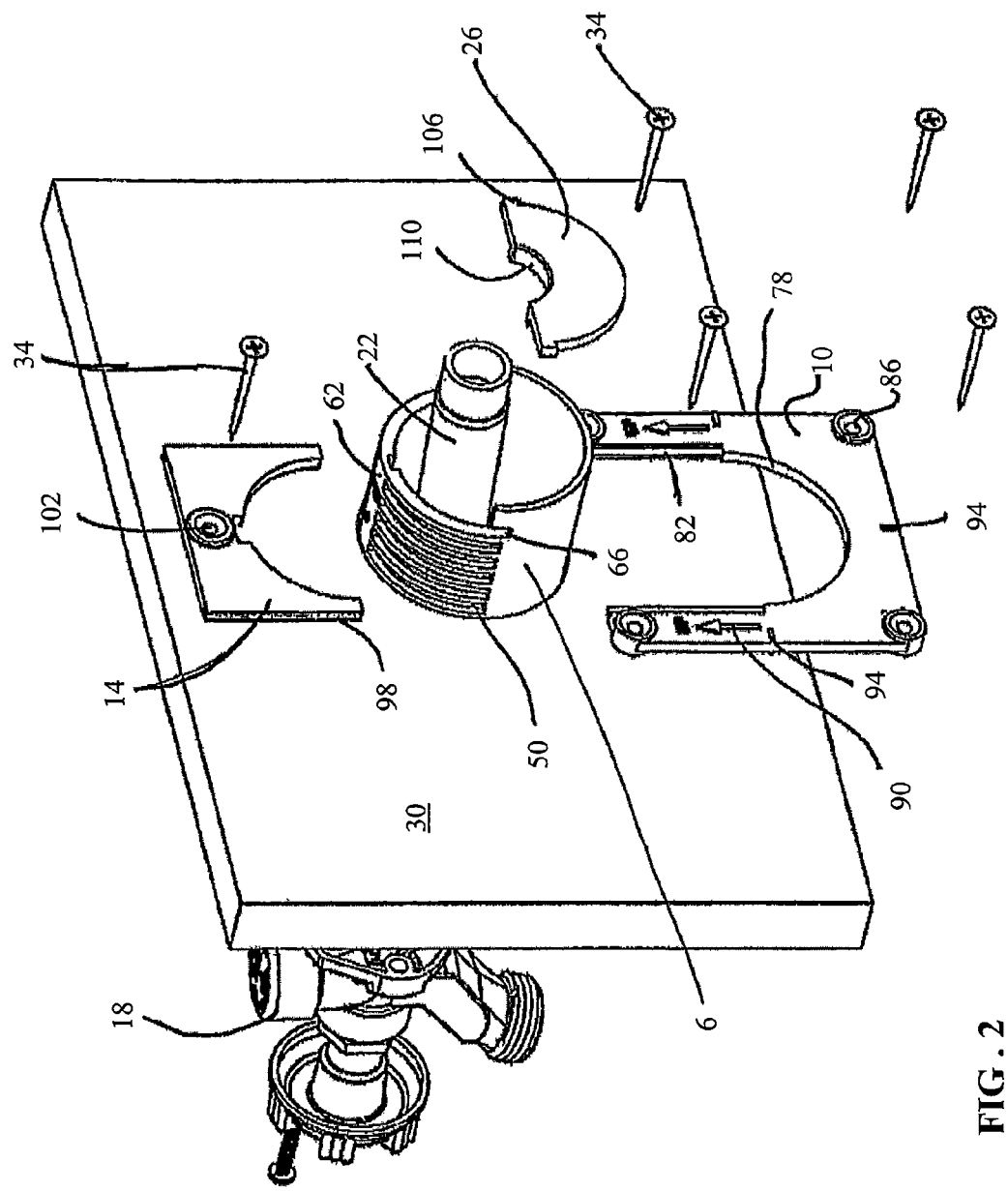
FIG. 2 is an exploded rear perspective view of the faucet mounting assembly of FIG. 1 interconnected to a wall.
Figure 3:
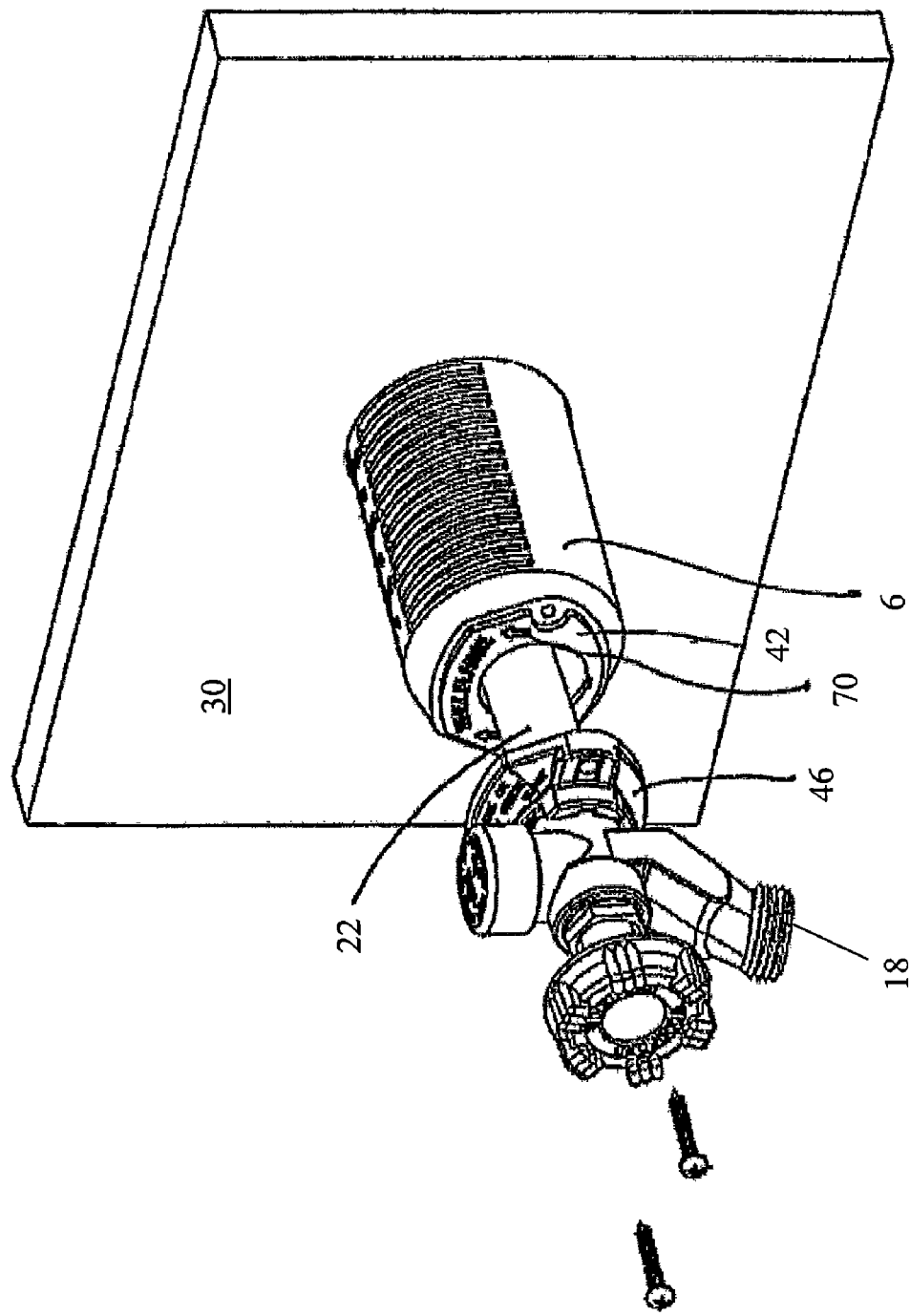
FIG. 3 is a front perspective view of a faucet assembly positioned in the faucet mounting assembly of one embodiment of the present invention.

To assist in the understanding of the present invention the following list of components and associated numbering found in the drawings is provided herein:

| # | Component |
|---|---|
| 2 | Faucet mounting assembly |
| 6 | Mounting sleeve |
| 10 | Bottom bracket |
| 14 | Top bracket |
| 18 | Faucet |
| 22 | Tube |
| 26 | Tube rest |
| 32 | Mortar |
| 30 | Wall |
| 34 | Fastener |
| 38 | Exterior building material |

-continued

| # | Component |
|---|---|
| 42 | Sleeve flange |
| 46 | Faucet flange |
| 50 | Groove |
| 54 | Front opening |
| 58 | Aperture |
| 62 | Offset indicator |
| 66 | Slot |
| 70 | Orientation arrow |
| 74 | Boss |
| 78 | Mounting sleeve rest |
| 82 | Tongue |
| 86 | Aperture |
| 90 | Orientation arrow |
| 94 | Alignment mark |
| 98 | Channel |
| 102 | Aperture |
| 106 | Protrusion |
| 110 | Tube resting surface |
| 114 | Bracket |
| 118 | Plate |
| 122 | Pin |
| 126 | Tab |
| 130 | Slot |
| 134 | Dimple |
| 138 | Pin |
| 142 | Stud |
| 146 | Spine |
| 150 | Threads |
| 154 | Hook |
| 158 | Handle |
| 162 | Outlet |
| 166 | Valve |
| 170 | Screw |
| 174 | Boss |
| 178 | Housing |
| 182 | Recess |
| 186 | Threaded sleeve |
| 190 | Nut element |
| 194 | Plate |
| 198 | Pins |
| 200 | Nut element |
| 202 | Stem |
| 206 | Hot water |
| 210 | Cold water inlet |
| 214 | Hot water inlet |
| 215 | Seal |
| 216 | Groove |
| 218 | Pocket |
| 222 | Anchor plate |
| 226 | Key |
| 230 | Anchor bolts |
| 234 | Nut |

It should be understood that the drawings are not necessarily to scale, but that relative dimensions can be nevertheless be determined thereby. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-33, a faucet mounting assembly 2 of one embodiment of the present invention is provided that includes a mounting sleeve 6 that is selectively interconnected to a bottom bracket 10. The mounting sleeve 6 is held in place relative to the bottom bracket 10 by a top bracket 14. In operation, a faucet 18 and associated tube 22 are designed to interface with the mounting sleeve 6, thereby securing the faucet 18 to a dwelling. A tube rest 26 is interconnected to a rear portion of the mounting sleeve 6 that supports and angles the tube 22 such that drainage is facilitated which prevents freezing. Embodiments of the present invention are designed to interconnect to an interior wall 30 of a building via a plurality of fasteners 34, thus creating a stable interconnection between the faucet assembly (i.e., the faucet 18 and tube 22) over the interconnection schemes employed by the prior art. In operation, the bottom bracket 10 is interconnected to the wall 30 and mounting sleeve 6 is selectively positioned relative thereto to accommodate variations of an exterior building surface 38. Once a desirable length is achieved, the top bracket 14 is associated with the bottom bracket 10 to fix the mounting sleeve 6 in place. As will be shown and/or described, the mounting sleeve 6 may be of multiple pieces that are interference fit together or the mounting sleeve may possess a combination of grooves, threads and/or interference fits to provide a robust scheme of selective offsets to accommodate any type of building surface. Further, the sleeve may be easily shortened by sawing or the inclusion of break-away points, for example, that allow selective reduction in length.

Referring now to FIG. 1, the faucet mounting assembly 2 of one embodiment of the present invention is provided. Here, the mounting sleeve 6 is substantially cylindrical and is positioned between the bottom bracket 10 and the top bracket 14. The bottom bracket 10 is designed to support the mounting sleeve 6 and the top bracket 14 is designed to maintain the mounting sleeve 6 in a fixed location relative to the bottom bracket 10. A front surface of the mounting sleeve 6 includes a sleeve flange 42 that is adapted to receive and secure a faucet flange. The sleeve flange 42 may be selectively interconnected to the mounting sleeve 6.

Referring now to FIGS. 2-6, the faucet mounting assembly 2 of embodiments of the present invention are shown interconnected to a wall 30 of the dwelling. Here, the wall 30, be it wood or concrete, is drilled through to accommodate the mounting sleeve 6. The mounting sleeve 6 is then inserted through the hole provided through the wall 30. The bottom bracket 10 is then brought up to provide support to the mounting sleeve 6 and to provide a location for the interconnection of a top bracket 14. One of skill in the art will appreciate that the bottom bracket 10 may be installed prior to installation of the mounting sleeve 6. Further, the bottom bracket 10 may be interconnected to the wall 30 prior to drilling therethrough to function as a hole location device. The top bracket 14 of embodiments of the present invention is then slid onto the bottom bracket 10 and both brackets are secured to the wall 30. One of skill in the art will appreciate that the mounting sleeve may be secured within a bracket positioned therearound wherein the mounting sleeve is held in place by a bar that is associated with the bracket and that engages the mounting sleeve.

Prior to adding exterior surface materials 20 to a building (or after), the faucet 18 is interconnected to the sleeve flange 42 and the tube 22 is inserted into the mounting sleeve 6. Embodiments of the present invention reduce the chance of the faucet 18 being installed upside down since the sleeve flange 42 of the mounting sleeve 6 includes features that match the faucet flange 46. The mounting sleeve 6, top bracket 14 and bottom bracket 10 may include indicia as well to insure the correct installation of the mounting sleeve.

The tube rest 26 is selectively interconnected to the rear end of the mounting sleeve 6. The tube rest 26 provides the proper offset from a center axis of the mounting sleeve 6 such that the tube 22 preferably positioned at an angle (α), which will be shown succinctly below in FIG. 6. The angle (α) of the tube 22 allows for water therein to drain from the faucet 18, thereby reducing the chances of freeze damage. Tube rests 26 of other embodiments of the present invention may be integral to the mounting sleeve 6.

Figure 4:
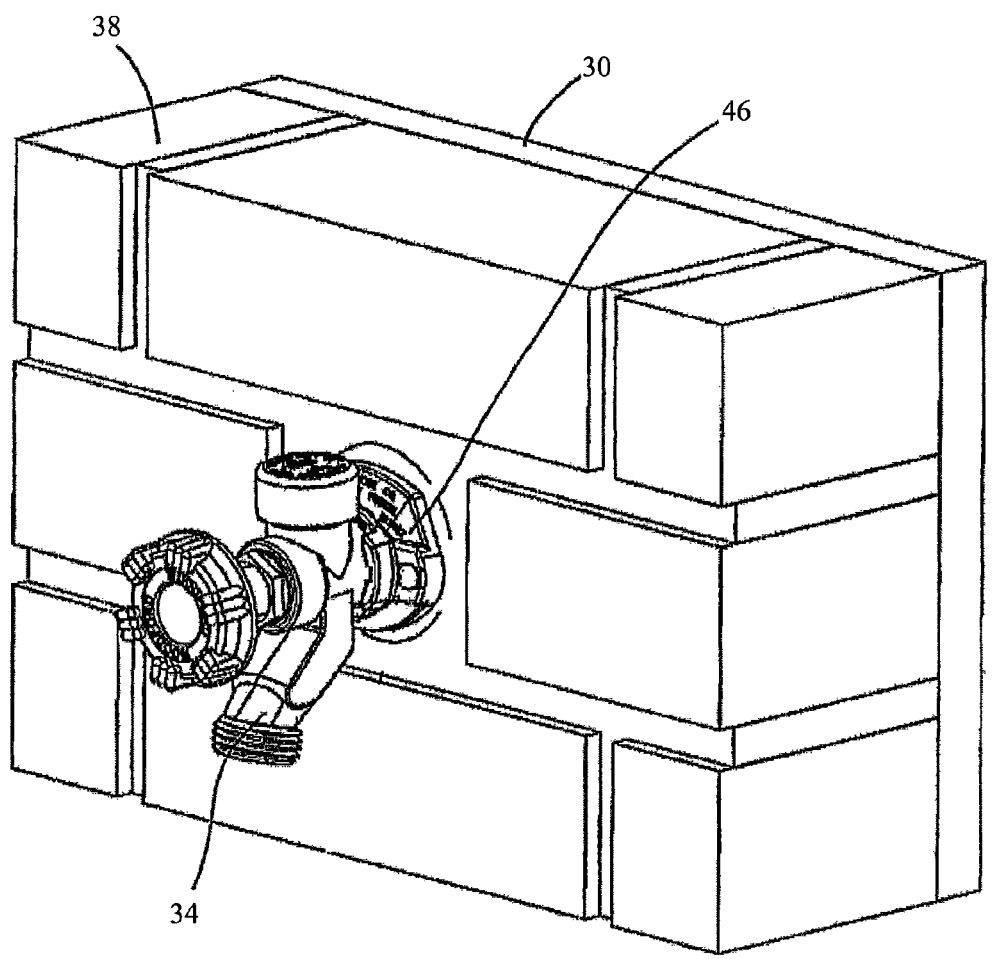
FIG. 4 is a front perspective view of a faucet assembly secured by a faucet mounting assembly positioned adjacent to an exterior building surface.
Figure 5:
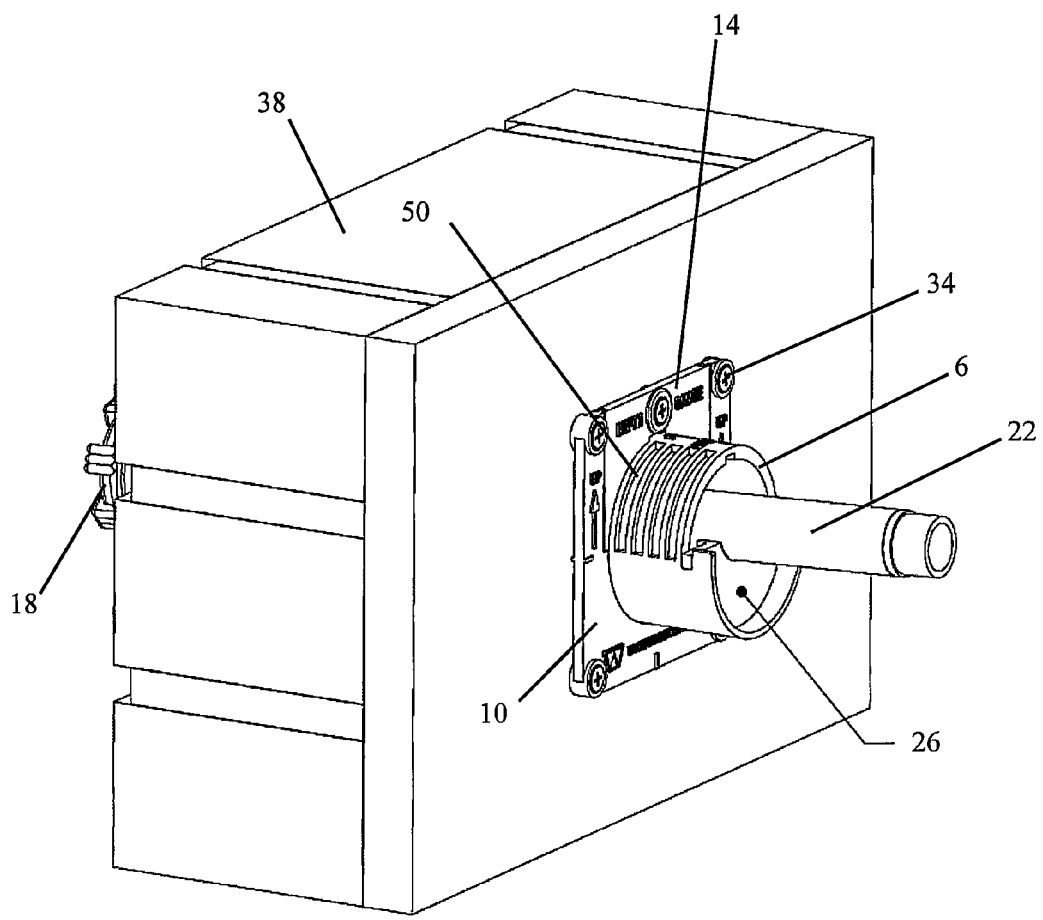
FIG. 5 is a rear perspective view of a faucet assembly secured by a faucet mounting assembly positioned adjacent to an exterior building surface.
Figure 6:
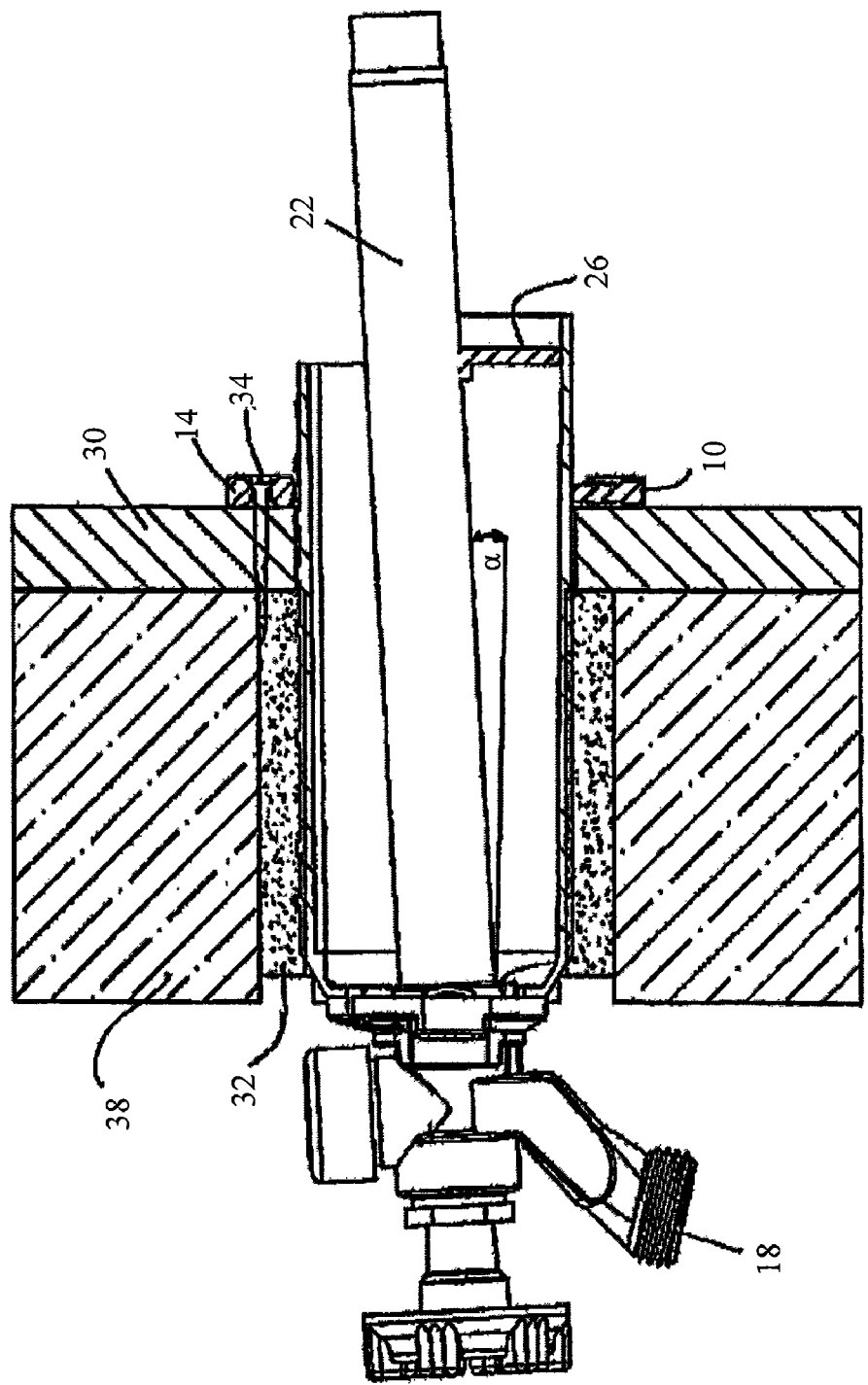
FIG. 6 is a side cross-sectional view of a faucet assembly secured by a faucet mounting assembly positioned adjacent to an exterior building surface.
Figure 7:
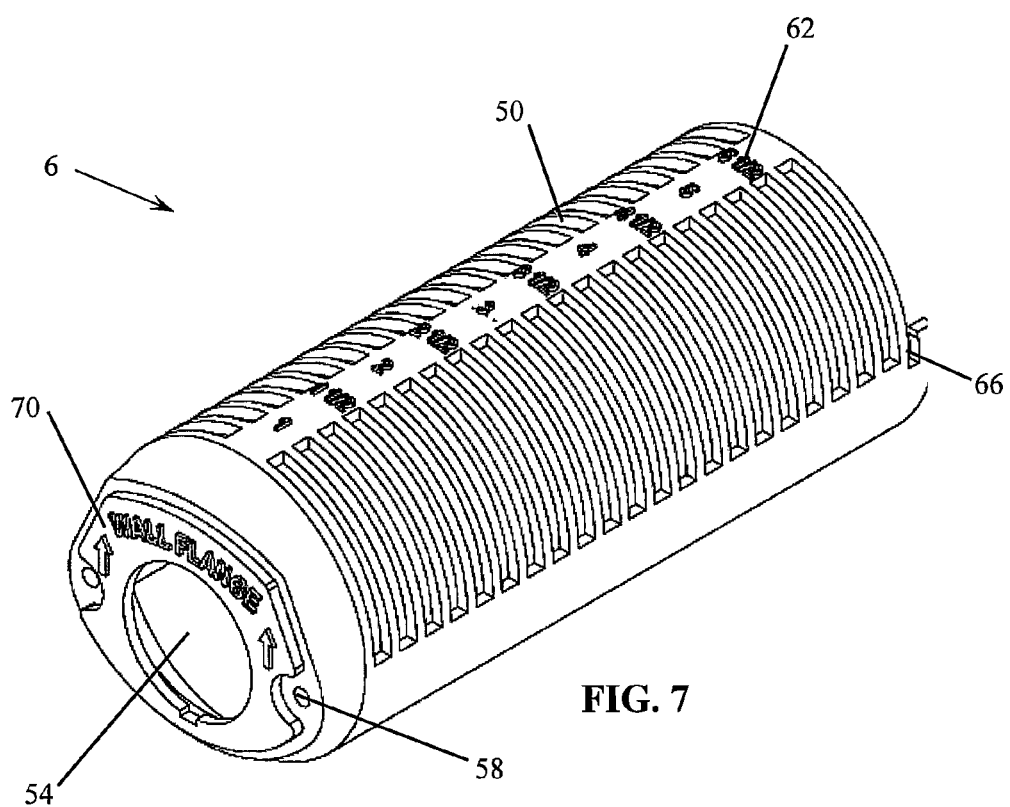
FIG. 7 is a perspective view of the mounting sleeve of one embodiment of the invention.
Figure 11:
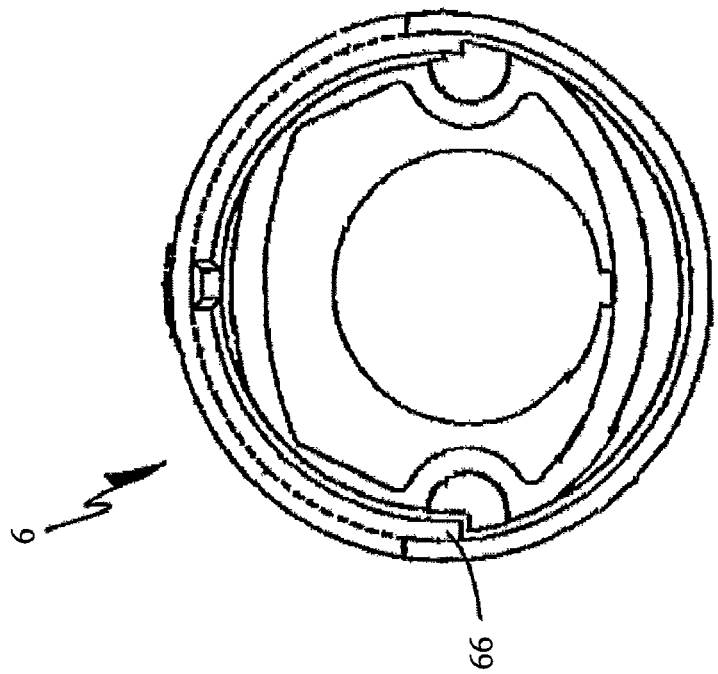
FIG. 11 is a right elevation view of FIG. 9.

With specific reference to FIGS. 4-6, the bottom bracket 10 may be directly interconnected to the wall 30. As shown herein, a plurality of external building surfaces 38, such as bricks, are positioned about the exterior surface of the mounting sleeve 6. These figures illustrate the above-mentioned aspect of the invention wherein the mounting sleeve 6 may be positioned relative to the bottom bracket 10, and wall 30, to accommodate such irregular building surfaces 38. After the top bracket 14 is installed, which locks the mounting sleeve 6 in place, mortar 32 or other finishing materials may be placed in the gap between the mounting sleeve 6 and the exterior building surface 38 to provide an aesthetically pleasing look. Although the mounting sleeve 6 has been shown thus far as cylindrical, one skilled in the art will appreciate that it may be prismatic with a square or rectangular profile. This profile may better suit applications wherein brick is employed, for example, wherein brick and/or mortar may be directly interconnected to the mounting sleeve 6. The mounting sleeve 6 may be made as large as a brick and may be any size to accommodate any building surface 38 or faucet 18 configuration.

Referring now specifically to FIG. 6, a cross-sectional view of the faucet mounting assembly 2 is shown. Here, it is succinctly shown how the top bracket 14 and bottom bracket 10 are interconnected to the interior wall 30 of a dwelling, thereby providing increased rigidity. As mentioned above, the prior art interconnection schemes would simply interconnect the faucet flange 46 directly to the exterior surface 38, such as mortar, which is a less than ideal interconnection material. It is also shown in FIG. 6 that the tube rest 26 supports the tube 22 such that an angle ($\alpha$) is provided that allows for water trapped within the tube 22 to drain from the faucet 18 after water is shut off. Although shown herein, a brick exterior building material 38 is shown, one skilled in the art will appreciate that embodiments of the present invention are adapted to be used with various types of building components, such as stone, mortar, stucco, hay, siding, corrugated steel, etc. That is, the mounting sleeve 6 is adapted to move relative to the bottom bracket 10 and top bracket 14 and be selectively locked into place, thereby providing a sufficient offset to accommodate any uneven exterior building material 38. After installation is complete, an installer may add mortar or other materials between the exterior building surfaces 38 and the mounting sleeve 6 to provide an aesthetically pleasing visual assembly.

Referring now to FIGS. 7-14, a mounting sleeve of one embodiment of the present invention is shown. The mounting sleeve of one embodiment of the present invention is cylindrical wherein a plurality of grooves 50 are positioned on at least an upper surface thereof. The grooves 50 are adapted to receive a portion of the top bracket, thereby preventing axial motion of the mounting sleeve 6 after installation. The faucet and associated tube are threaded through a front opening 54 positioned in the sleeve flange 42. The mounting sleeve 6 includes at least one aperture 48 that receive fasteners that interconnect the faucet flange onto the sleeve flange 42 of the mounting sleeve 6. The mounting sleeve 6 may also include an offset indication device 62, preferably, embossed or raised numerals or alpha numeric characters that allow for an installer to gauge the distance between the sleeve flange 42 and the top and bottom brackets. The mounting sleeve 6 also includes a slot 66 positioned adjacent to its rear end to receive the tube rest.

Figure 10:
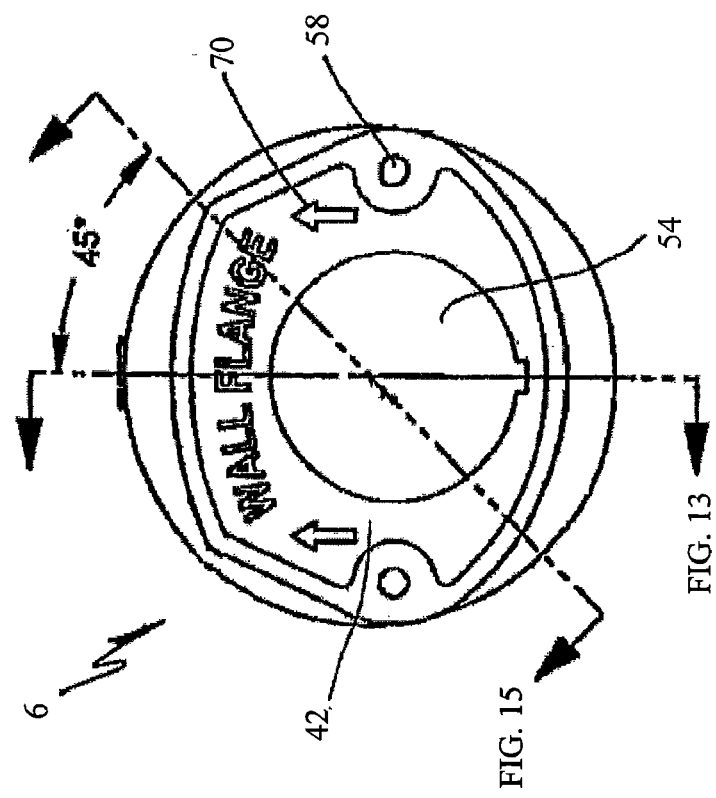
FIG. 10 is a left elevation view of FIG. 9 showing a flange of the mounting sleeve.

Referring now specifically to FIG. 10, the sleeve flange 42 of the mounting sleeve 6 is shown. The sleeve flange 6 is designed to generally match the faucet flange, thereby reducing incorrect orientations. The sleeve flange 42 may also include orientation arrows 70 to ensure that the mounting sleeve 6 is oriented in the proper fashion.

Referring now to FIGS. 12-14, cross-sectional views of the mounting sleeve 6 are shown. Here, a plurality of bosses 74 are provided that are associated with the apertures 58 positioned in the sleeve flange. The bosses 74 may be threaded or unthreaded and are designed to receive fasteners that interconnect the faucet flange to the mounting sleeve 6. The slots 66 are also provided adjacent to the rear end of the mounting sleeve 6. The slots 66 are adapted to receive a protrusion of a tube rest, which will be explained in further detail below. The mounting sleeve 6 may be of any diameter to fit any size tube. In addition, additional internal walls may be provided to further support the tube. Alternatively insulation, i.e. expandable foam, may be added into the mounting sleeve 6 after the tube is inserted to firmly associate the tube with the mounting sleeve 6.

It is contemplated that the mounting sleeve may be made in more than one piece. More specifically, embodiments of the present invention employ a two-piece mounting sleeve 6 that includes one portion that comprises the slot 66 for receiving the tube rest. The other portion would accommodate the faucet flange. The flange portion that receives the flange faucet may be capable of an angular or axial adjustment with respect to the portion that is supported by the brackets. The portions may be interconnected, via heat welding, threaded interconnection, or interference fit. Further, the length of the mounting sleeve 6 is arbitrary and can be customized for any application.

Preferably the mounting sleeve 6 of one embodiment of the present invention is cylindrical and about 6 inches long and about 2.5 inch diameter. The bosses 74 integrated in the mounting sleeve 6 are approximately 1.3 inches deep with a center bore of about 1.2 inches deep that have a radius of about 0.15 inches. The grooves 50 of one embodiment of the present invention are 0.16 inches wide and may include an about 0.5 degree draft, and are equally spaced along the length of at least an upper portion of the mounting sleeve 6. Embodiments of the present invention employ grooves that are about 0.097 inches deep.

Figure 15:
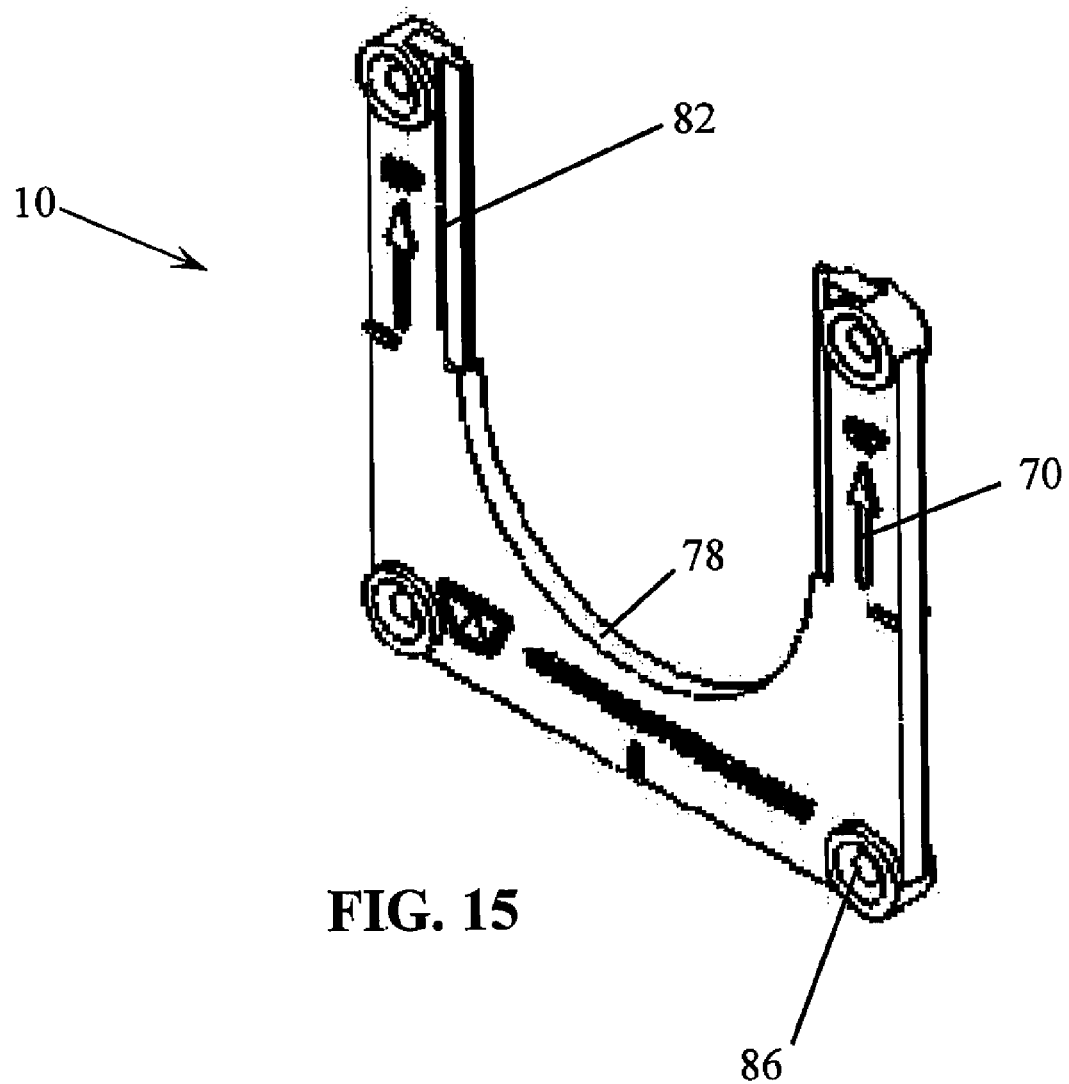
FIG. 15 is a perspective view of a bottom bracket of one embodiment of the present invention.
Figure 17:
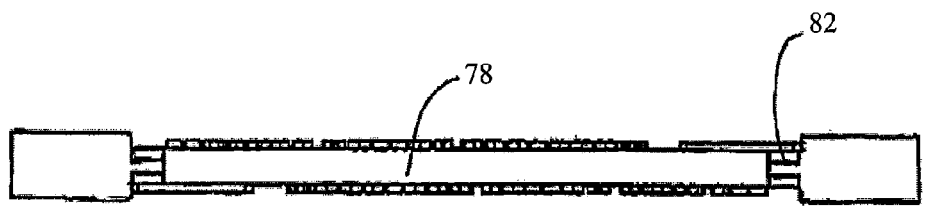
FIG. 17 is a cross-sectional view of the bottom bracket shown FIG. 16.
Figure 16:
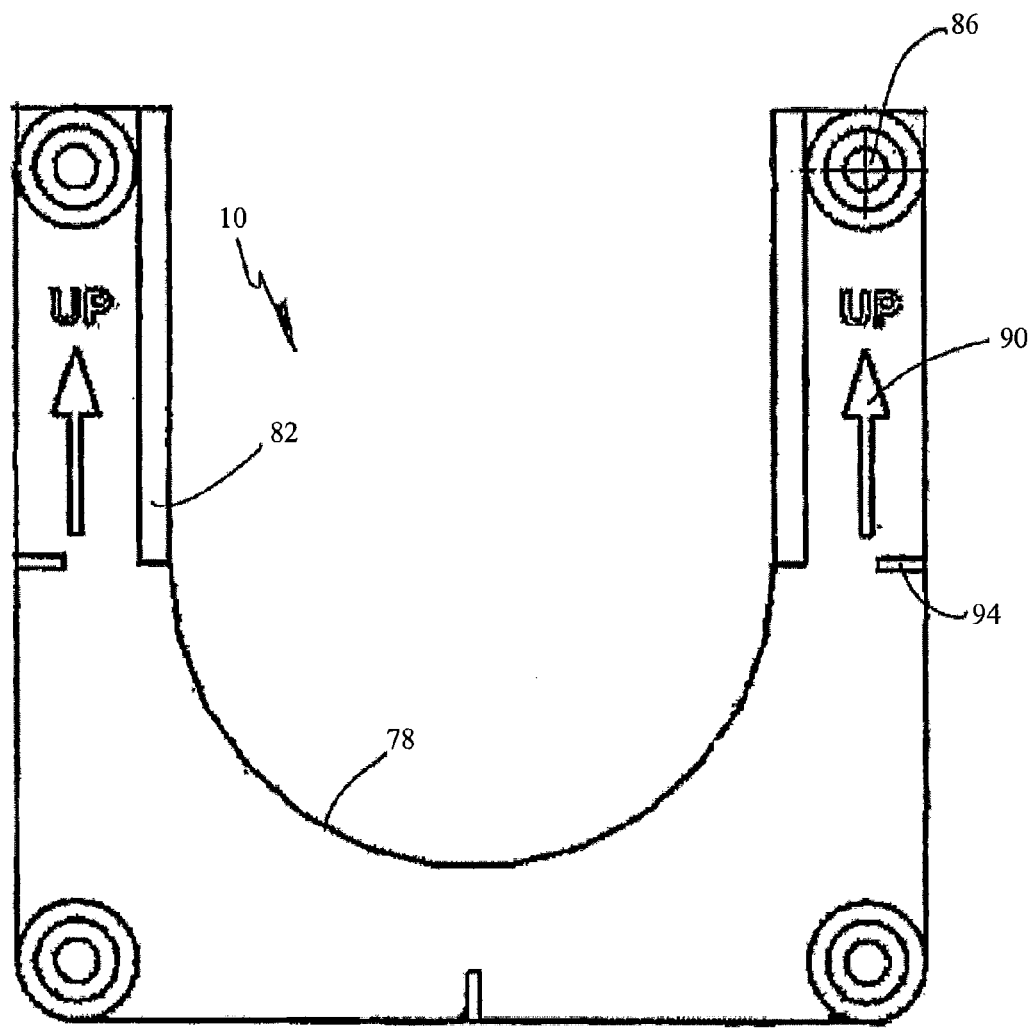
FIG. 16 is a front elevation view of the bottom bracket shown in FIG. 15.
Figure 18:
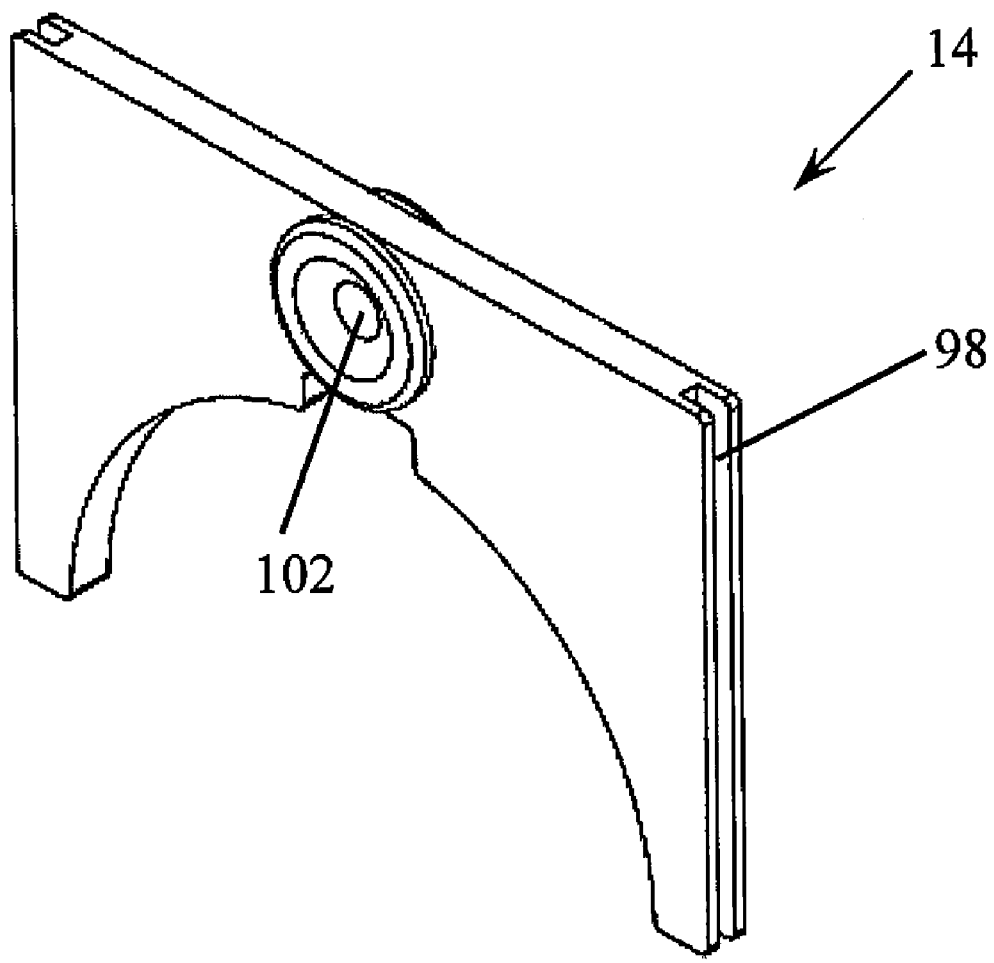
FIG. 18 is a perspective view of a top bracket of one embodiment of the present invention.

Referring now to FIGS. 15-17, the bottom bracket 10 of one embodiment of the present invention is shown. The bottom bracket 10 includes an arcuate (in the case of a cylindrical mounting sleeve) mounting sleeve rest 78. The mounting sleeve rest 78 surface includes an about 180 degree arc that leads into a pair of inwardly positioned tongues 82 that are adapted to receive the top bracket, which will be described in further detail below. The bottom bracket 10 also includes a plurality of apertures 86 for the receipt of fasteners for interconnection to the wall. Further, the bottom bracket 10 includes an orientation arrow 70, or other device for indicating the proper positioning of the bottom bracket 10 during installation. The bottom bracket 10 may also include at least one alignment mark 94 which helps locate the hole to be drilled in the wall.

In one embodiment of the present invention, the bottom bracket 10 is about 3.8 inches high and 3.8 inches wide. The apertures 86 possess an about 0.180 diameter for receiving a fastener. The apertures 86 are spaced about 3.3 inches in the horizontal direction and about 3.3 inches in the vertical direction. The mounting sleeve rest is about 1.26 inches in radius.

Referring now to FIGS. 18-21 the top bracket 14 of embodiments of the present invention is shown that includes channels 98 that receive the tongues of the bottom bracket, thereby locking the top bracket 14 relative thereto. The top bracket 14 also includes a surface that rests within the grooves of the mounting sleeve, thereby preventing the relative motion of the mounting sleeve after installation. The top bracket 14 also includes at least one aperture 102 for the receipt of a fastener that interconnects the top bracket 14 to the wall.

In one embodiment of the present invention, the top bracket is about 1.9 inches high and 2.75 inches wide. The surface that receives the groove has the radius of about 1.16 inches. The channel, that receives the tongue of the bottom bracket is about 0.7 inches wide.

Figure 22:
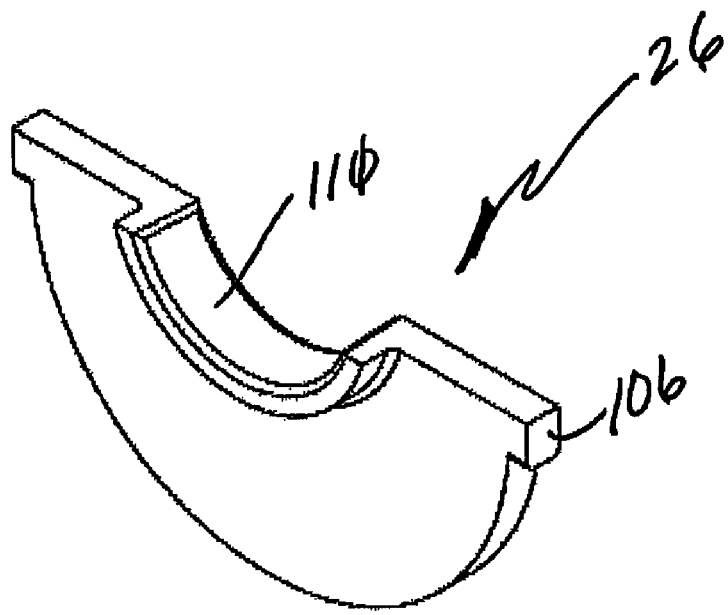
FIG. 22 is a perspective view of a tube rest employed by some embodiments of the present invention.
Figure 23:
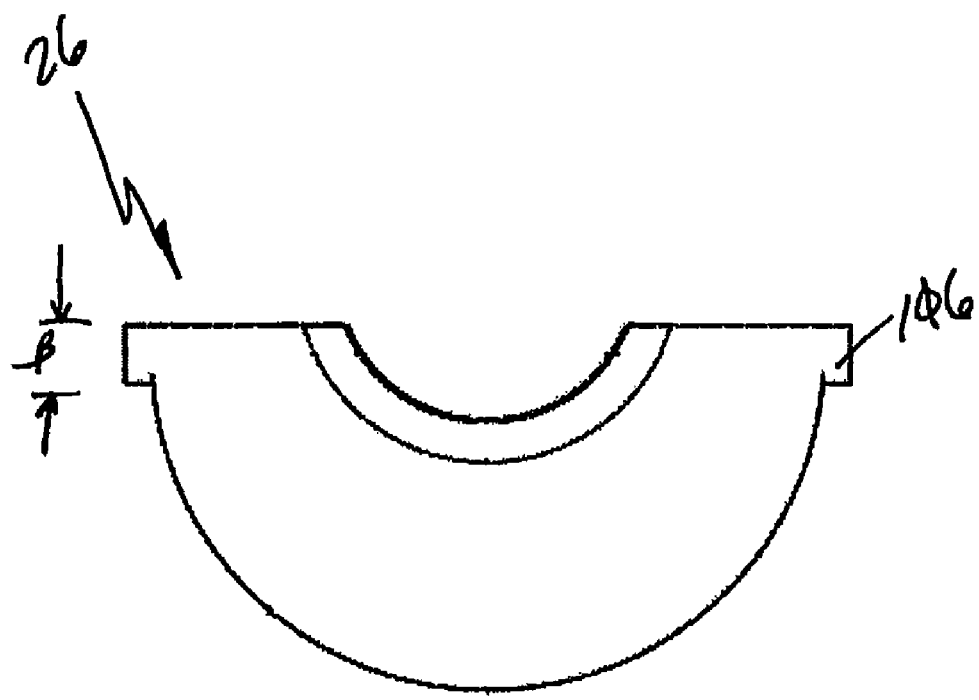
FIG. 23 is a front elevation view of FIG. 22.

Referring now to FIGS. 22 and 23, the tube rest 26 of one embodiment of the present invention is shown that includes a plurality of protrusions 106 that fit into the slots located in the mounting sleeve. To alter the angle ($\alpha$) of the installed tube, the protrusions 106 and/or slots can be selectively increased or decreased in thickness ($\beta$). For example, the greater the thickness ($\beta$) of the protrusion, the greater the tilt of the installed tube. Another protrusion may be positioned on the bottom portion of the tube rest 26 to provide alignment that maintains the tube rest 26 in an interconnective relationship with the mounting sleeve. The tube rest 26 includes a resting surface 110 that may be widened to enhance support of the installed tube.

Figure 24:
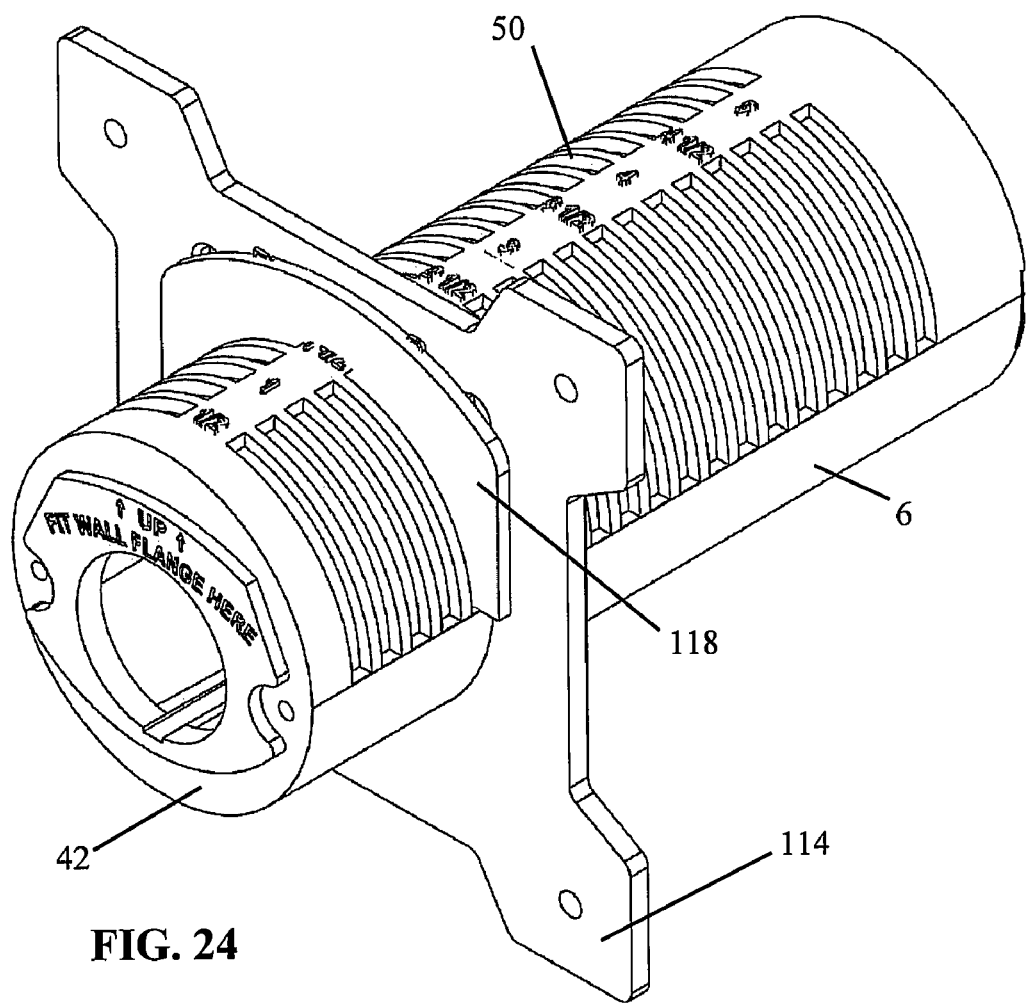
FIG. 24 is a perspective view of a faucet mounting assembly of another embodiment of the present invention.
Figure 25:
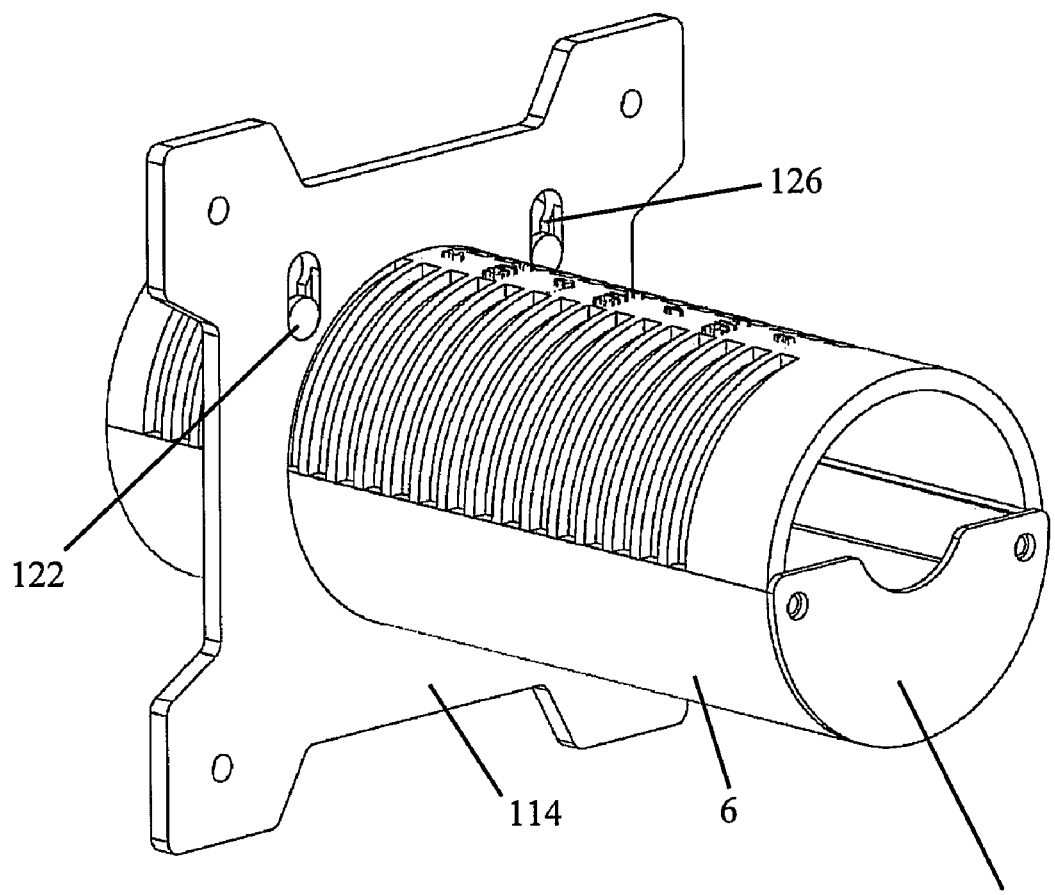
FIG. 25 is a rear perspective view of the embodiment of the present invention shown in FIG. 24.

Referring now to FIGS. 24 and 25, yet another embodiment of the present invention is shown that employs a mounting sleeve 6 similar to that described above. The bracket 114, however, is of a one-piece design that employs a plate 118. The plate 118 is selectively interconnected to the bracket 114 to secure the mounting sleeve 6. The plate 118 may include a plurality of pins 122 that interface with tabs 126 positioned on the bracket.

Figure 26:
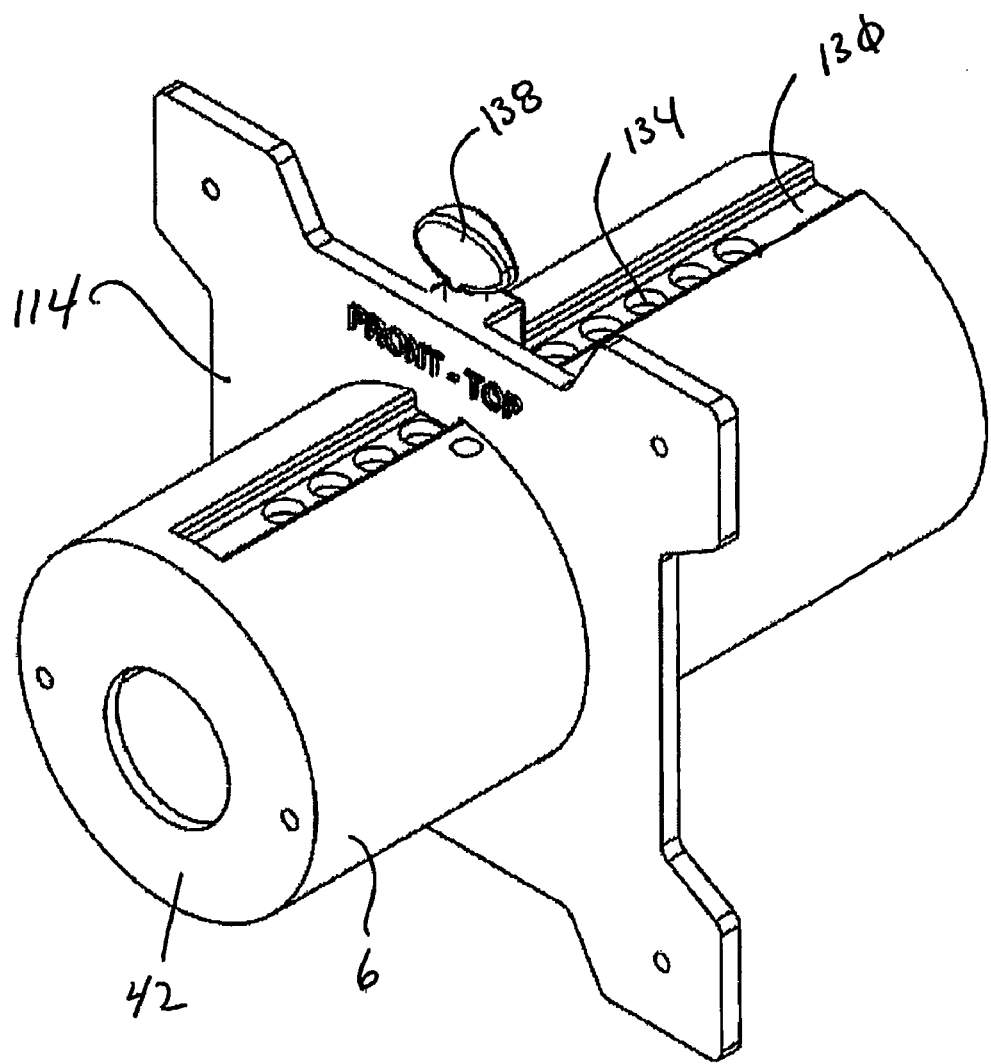
FIG. 26 is a perspective view of a faucet mounting assembly of another embodiment of the present invention.
Figure 27:
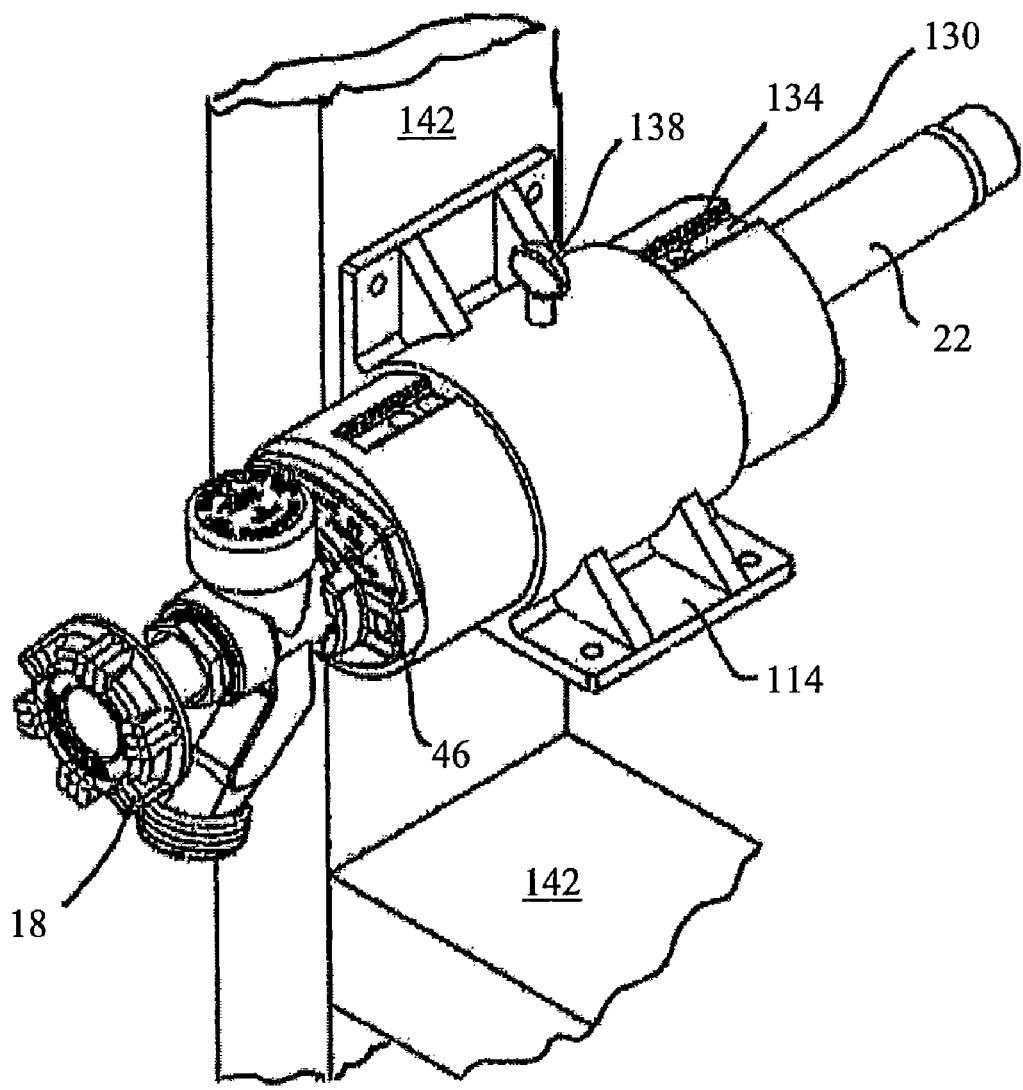
FIG. 27 is a perspective view of another embodiment of a faucet mounting assembly similar to that shown in FIG. 26.

Referring now to FIGS. 26 and 27, another embodiment of the present invention is shown that employs a mounting sleeve 6 with a longitudinal slot 130. The slot 130 further includes a plurality of dimples 134 or holes. The bracket 114 of this embodiment of the present invention includes a selectively adjustable pin 138 that interfaces with a dimple 134 to restrict the movement of the mounting sleeve 6 relative to the bracket 114. It is contemplated that the pin 138 be spring loaded, threaded into the bracket 114, or simply dropped into a dimple 134 to secure the mounting sleeve 6. FIG. 27, specifically shows an alternate embodiment of a bracket 114 that contacts a greater portion of the mounting sleeve 6, thereby providing additional stability. This elongated bracket 114 also is adapted for interconnection to at least one stud 142.

Figure 28:
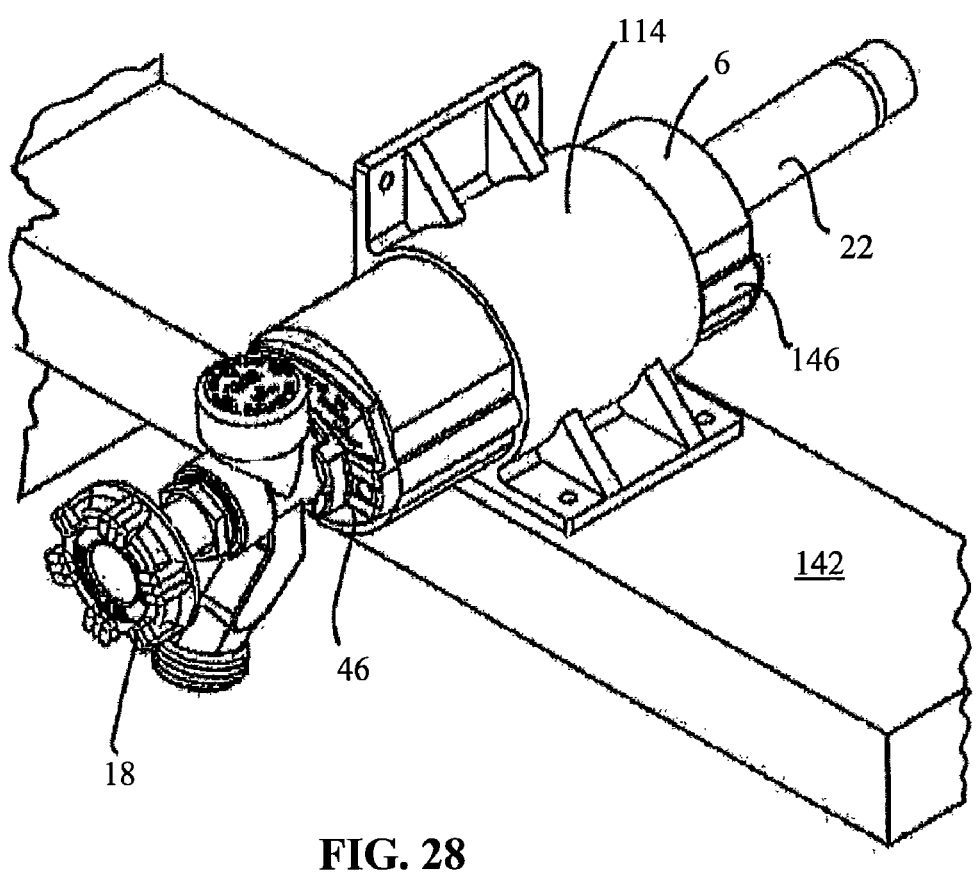
FIG. 28 is a perspective view of a faucet mounting assembly of another embodiment of the present invention.

Referring now to FIG. 28, the bracket shown in FIG. 27 is shown without the pin. More specifically, this embodiment of the present invention employs a mounting sleeve 6 with a longitudinal spine 146. The function of the spine 146 is to interface with an inner portion of the bracket 114, thereby preventing rotation of the mounting sleeve 6. One skilled in the art, however, will appreciate that the spine 146 does not need to span the entire length of the mounting sleeve 6 to perform its designed function. Upon review of the figure, one skilled in the art will appreciate that this version of the mounting sleeve includes no screws thus maybe axially altered.

Figure 29:
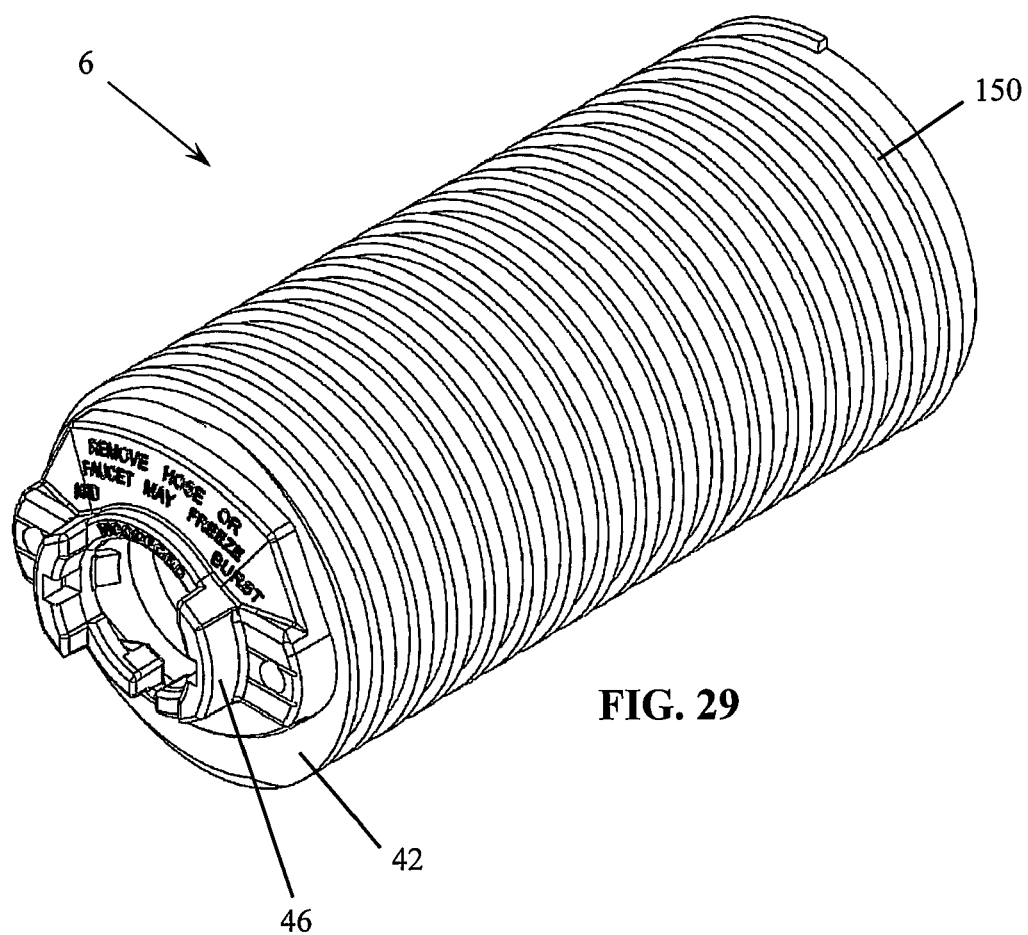
FIG. 29 is a perspective view of an alternate embodiment of a mounting sleeve.

Referring now to FIG. 29, an alternate embodiment of a mounting sleeve 6 is shown that employs a threaded outer surface. It is envisioned that the threads 150 will interface with threads provided on the bracket to allow adjustments of the mounting sleeve 6 relative to the bracket. It is also contemplated that this type of mounting sleeve 6 may be incorporated with mounting sleeves previously described wherein the threaded mounting sleeve provides fine adjustments compared to the gross adjustments provided by a mounting sleeve with grooves, for example.

Figure 30:
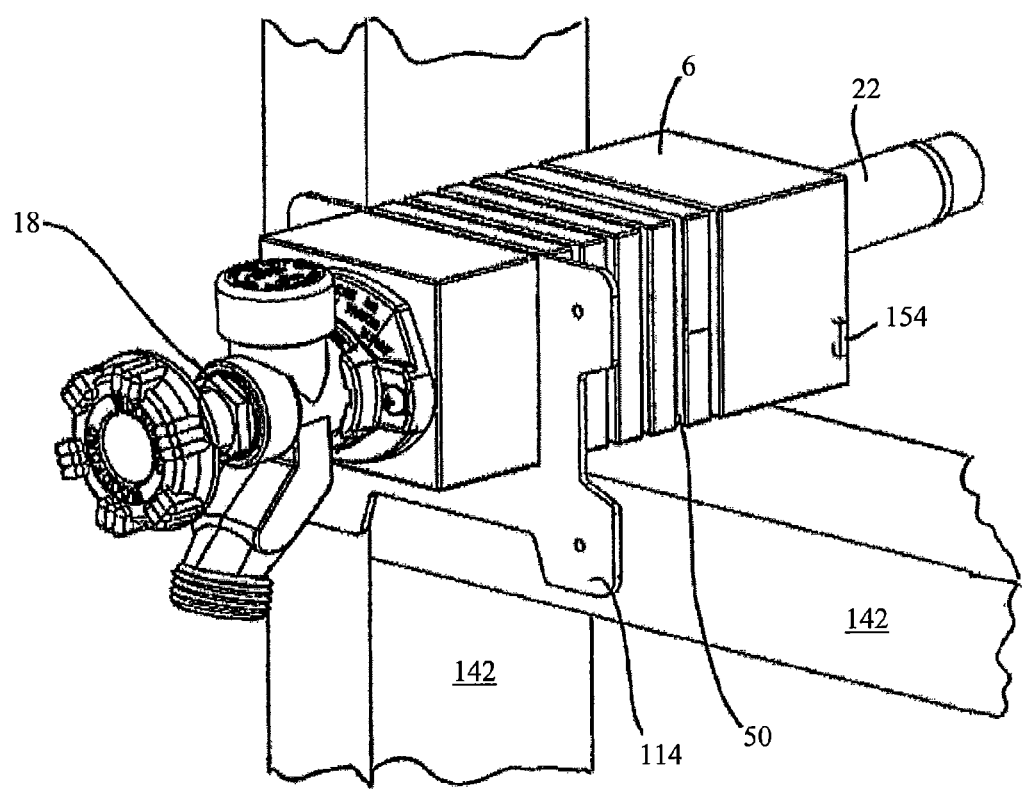
FIG. 30 is a perspective view of an alternate embodiment of the present invention wherein a generally rectangular mounting sleeve is employed.
Figure 31:
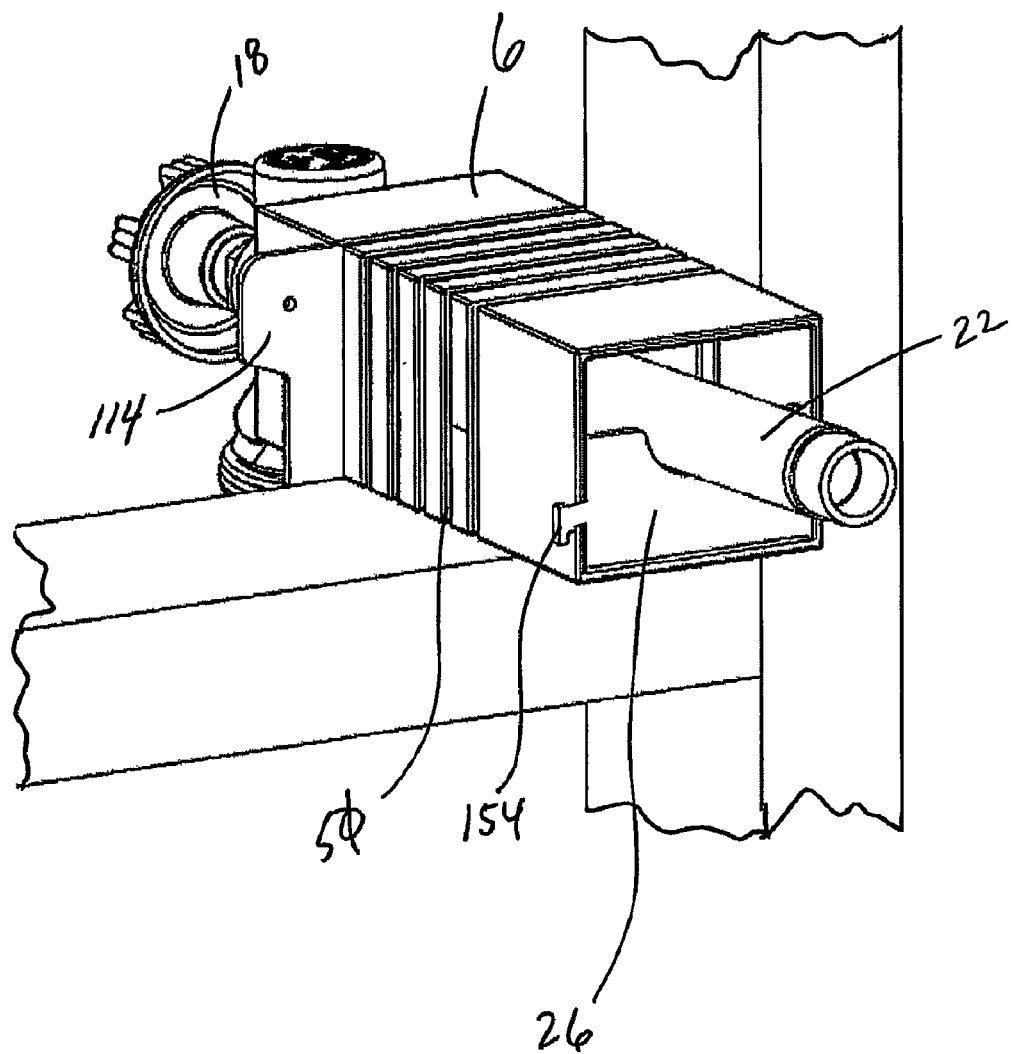
FIG. 31 is a rear perspective view of the embodiment of the present invention shown in FIG. 30.
Figure 32:
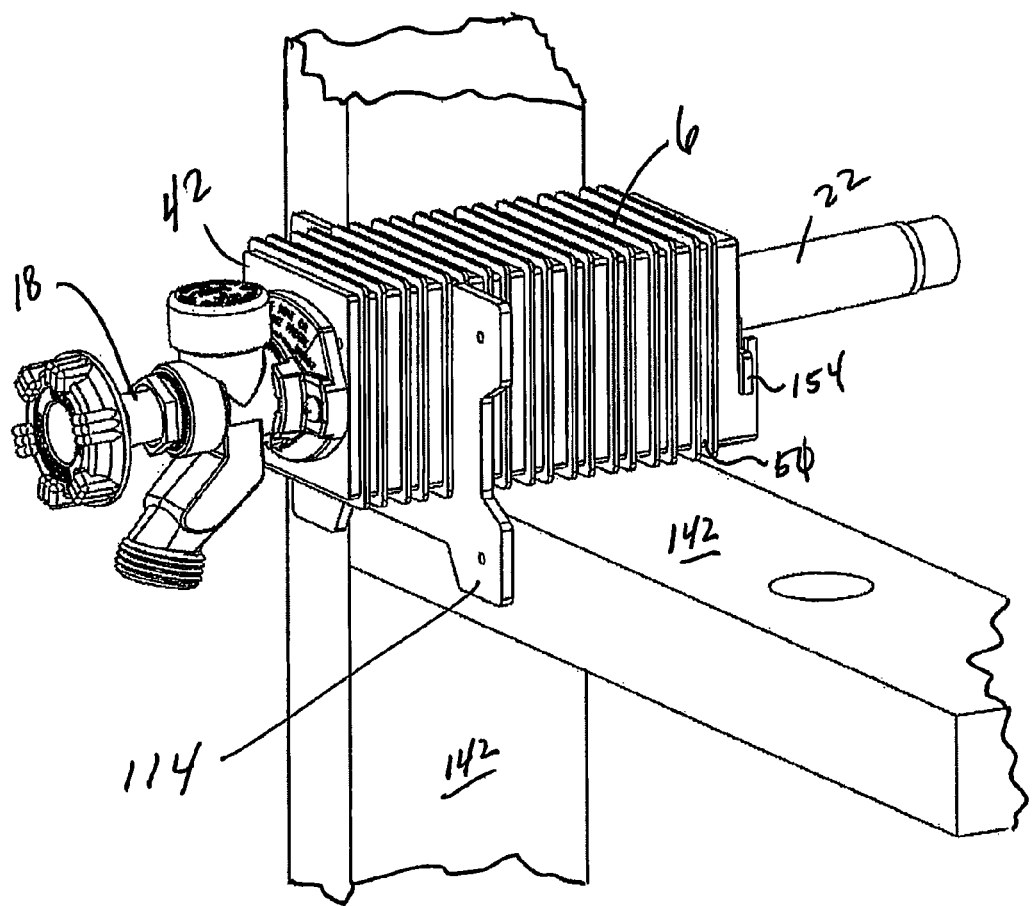
FIG. 32 is a perspective view of an alternate embodiment of the faucet mounting assembly similar to that shown in FIG. 30.

Referring now to FIGS. 30-32, a mounting sleeve 6 having a generally rectangular or square cross section is provided. Here, the mounting sleeve 6 also includes a plurality of grooves 50 that interface with a bracket 114 to secure the mounting sleeves relative thereto. The tube rests 26 of these embodiments of the present invention may include hooks 154 that engage with the outer surface of the mounting sleeve 6. The rectangular mounting sleeve is shown associated with a horizontal/vertical studs 142 of a building wherein the bracket 114 is nailed directly to at least one stud 142. The shape of the mounting sleeve 6 also provides additional stability such that its engagement with the vertical/horizontal studs 142 prevents rotation of the mounting sleeve 6.

Figure 33:
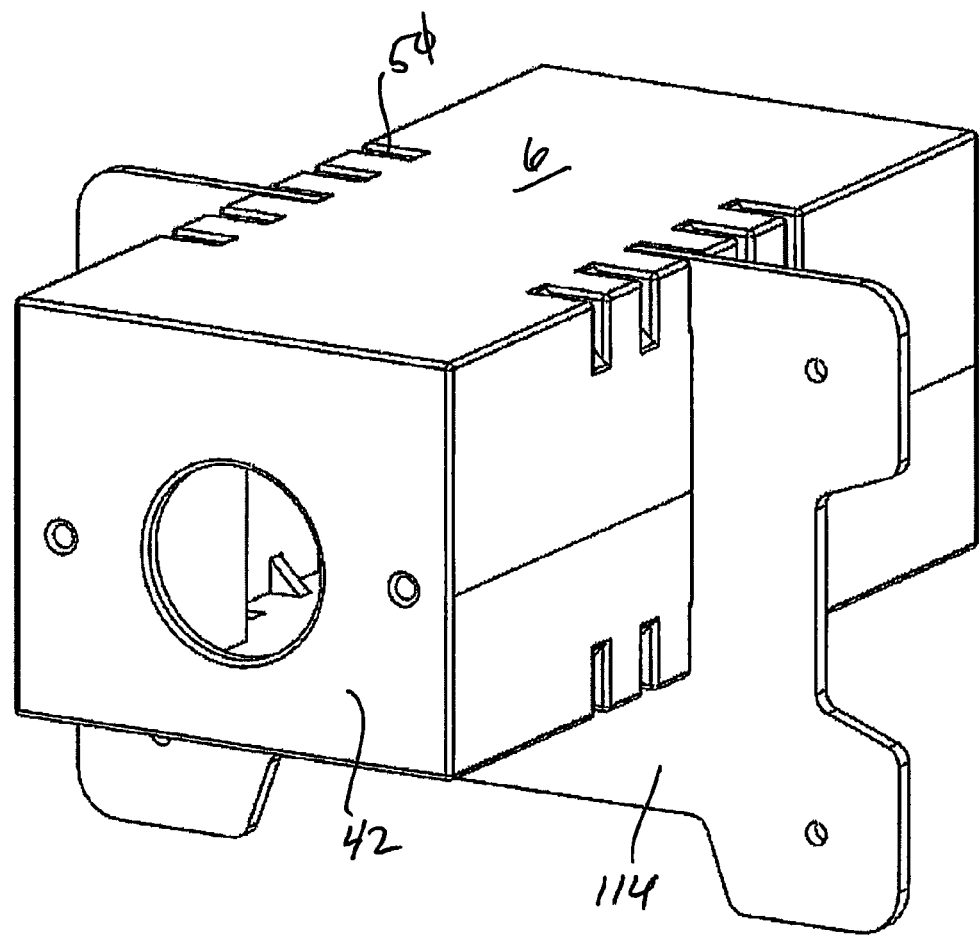
FIG. 33 is a perspective view of an alternate embodiment of the faucet mounting assembly similar that shown in FIG. 30.
Figure 34:
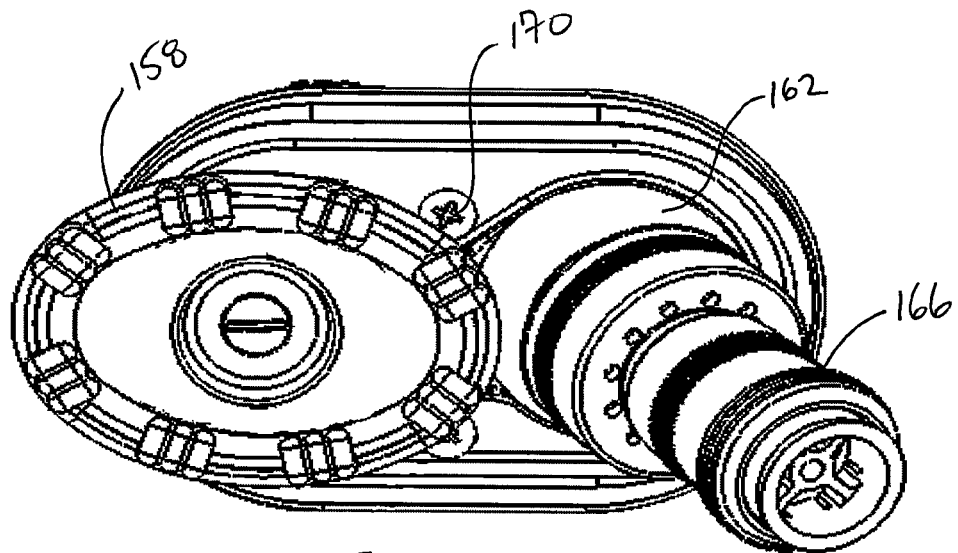
FIG. 34 is a front elevation view of a faucet used in conjunction with another embodiment of the present invention.
Figure 35:
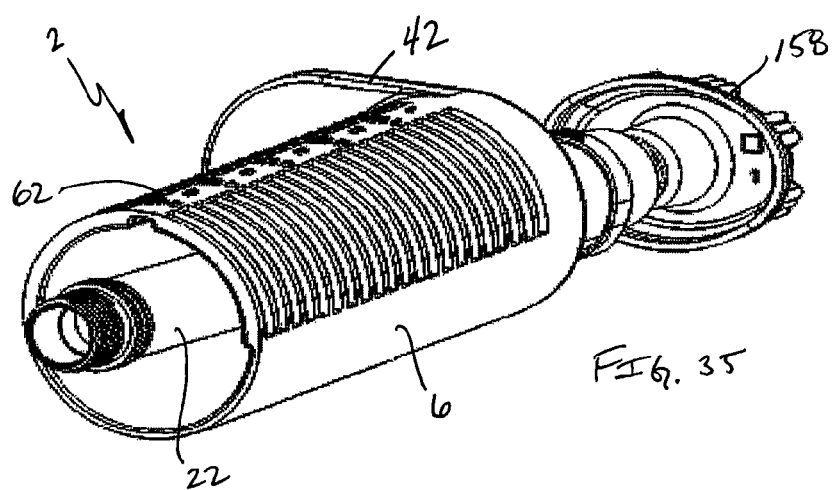
FIG. 35 is a rear perspective view of a faucet mounting assembly of another embodiment of the present invention.
Figure 36:
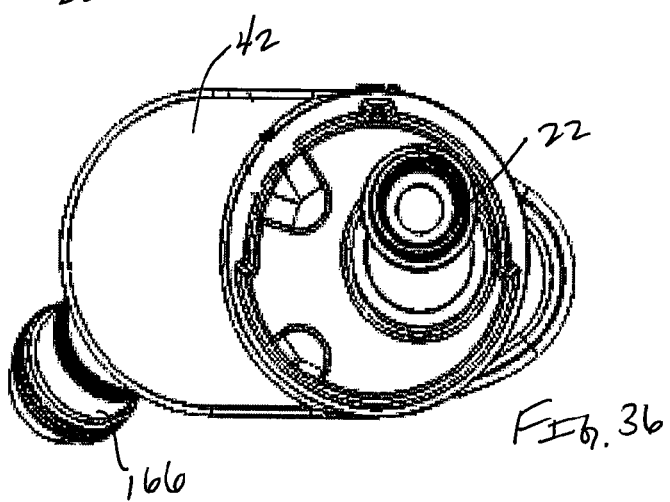
FIG. 36 is a rear elevation view of FIG. 35.
Figure 37:
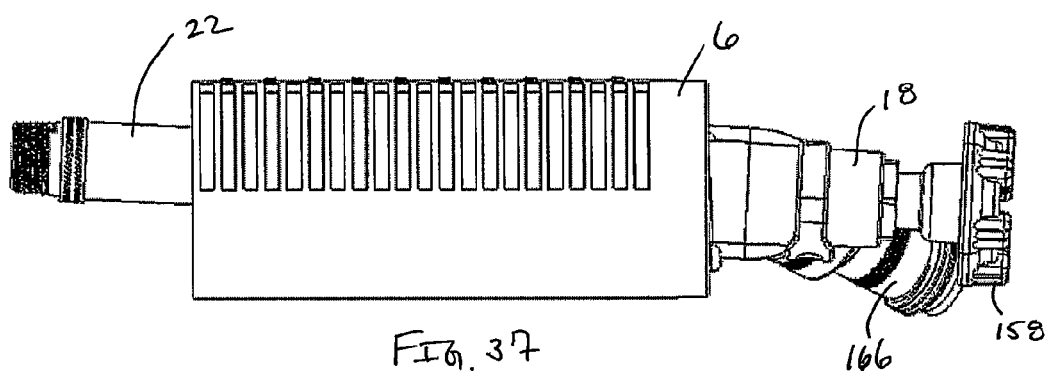
FIG. 37 is a side elevation view of FIG. 35.

Referring now to FIG. 33, yet another embodiment of the present invention is shown that employs a square mounting sleeve 6. Here, the grooves 50 are non-continuous and interface with the bracket 114. In the embodiments shown, the bracket 114 snap fits into grooves 50 to secure the mounting sleeve 6. The bracket 114 employs a plurality of apertures for the receipt of nails or wood screws to interconnect to the studs of a building, for example.

Referring now to FIGS. 1-33, the mounting sleeve 6 of one embodiment of the present invention is interconnected to a dwelling, or other structure, in the following manner. Initially, faucet location are identified from inside the dwelling and a level line is drawn. A 2 9/16 inch hole is drilled such that its center coincides with the level line previously drawn. The bottom bracket 10 is then aligned to the hole such that the mounting sleeve rest 78 coincides with the bottom lip of the hole. Alignment marks 94 on the bottom bracket 10 are also aligned with the previously drawn level line. Once all is in alignment, fasteners 34 are used to interconnect the bottom bracket 10 to the well 30 of the dwelling. The mounting sleeve 6 is then inserted through the hole and maintained on the bottom bracket 10. Next, the approximate offset needed to compensate for the exterior surface 38 is estimated and the offset is noted from the offset indicator 62 provided on the mounting sleeve 6. Preferably, the mounting sleeve 6 should be near flush with the exterior finished surface 38. Once the desired offset is maintained, the top bracket 14 is slid onto the bottom bracket 10 wherein the bottom bracket 10 is also positioned within a groove 50 of the mounting sleeve 6 to hold the mounting sleeve 6 in place. At least one fastener 34 is then used to secure the top bracket 14 to the wall 30. Next, a finishing material or veneer 32 is added around the mounting sleeve 6, thereby blending it in with the exterior surface 38. Finally, the faucet assembly is then interconnected to the mounting sleeve 6 wherein the faucet flange 46 is fastened with screws to the mounting sleeve 6. This installation step also positions the tube 22 on the tube rest 26 to ensure a proper drain angle ($\alpha$) of about 3 degrees. The final step is to interconnect the water supply to the tube 22.

Referring now to FIGS. 34-44, another embodiment of the faucet mounting assembly is shown that is adapted to receive faucets with varying sizes and shapes of faucet flanges. More specifically, often faucet flanges 42 may be elongated such that the handle 158 and the outlet 162 of the faucet assembly is laterally spaced. This is done such that a larger handle 158, which sometimes may be oval in shape, may be used that helps facilitate gripping thereof. Often the outlet 162 also receives an anti-siphon valve 166. The outlet 162 and valve 166 shown are designed to be oriented at an angle relative to the faucet flange 42. By angling these components, the users hands will not readily contact the outlet 162 and valve 166 when the larger handle 158 is turned. One skilled in the art will appreciate that the faucet flange 142 may be of such a length to accommodate a plurality of outlets 162. For example, a faucet assembly having hot and cold water outlets may be used in conjunction with embodiments of the present invention. It also should be understood that the outlet 162 may be positioned above or below the handle as well. In practice, the faucet assembly is secured to the faucet mounting assembly via a plurality of screws 170 which are received in to faucets 174. The mounting sleeve 6 is adapted to engage onto a wall 30 with a plurality of brackets, similar to what has been described above.

Referring now specifically to FIGS. 34-38 the mounting sleeve 6 of another embodiment of the present invention with an elongated flange 42 is provided. The mounting sleeve 6, as described above, includes an offset indicator 62 and is adapted to receive a tube 22 of the faucet assembly. A plurality of bosses 174 or other mechanisms are used that receive screws 170 that hold the faucet flange onto the elongated flange 42 of the faucet mounting assembly 2.

Figure 38:
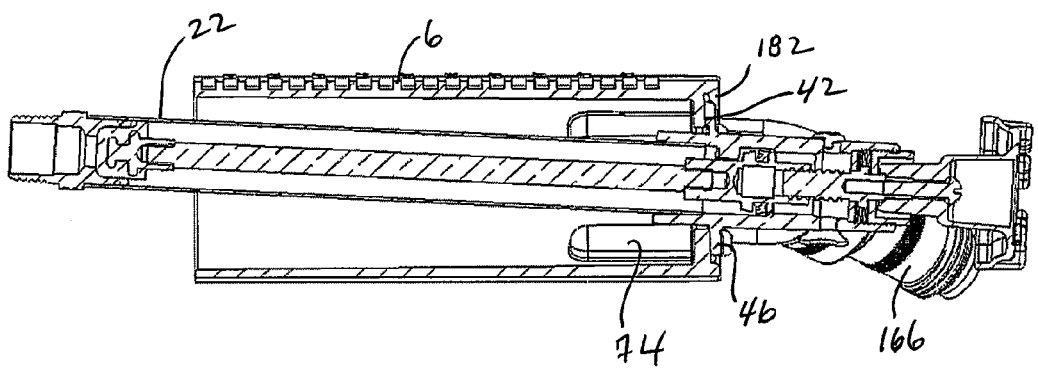
FIG. 38 is a cross-sectional view of FIG. 37.
Figure 39:
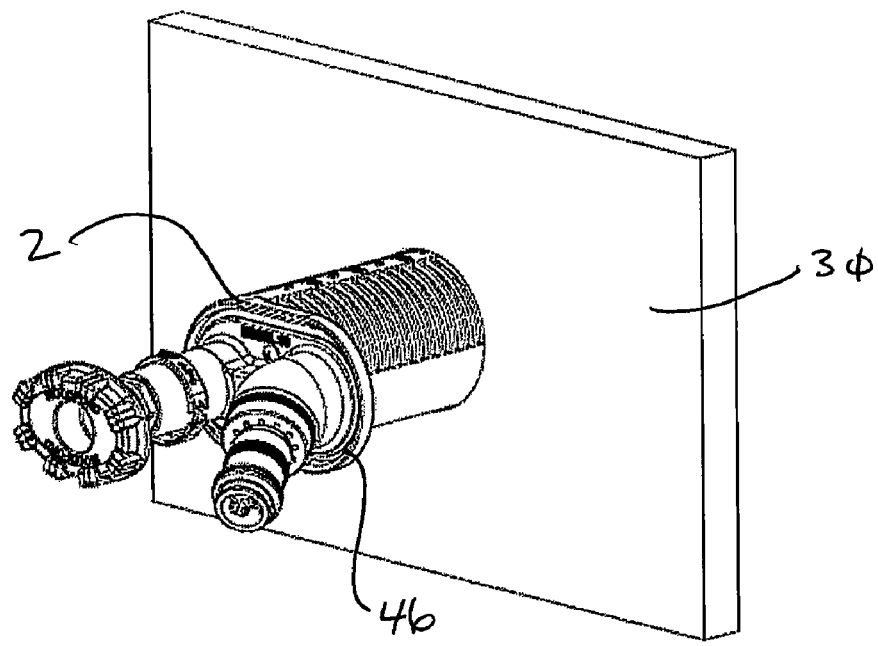
FIG. 39 is a front perspective view showing the faucet mounting assembly of FIG. 35 associated with an interior wall of a dwelling.
Figure 41:
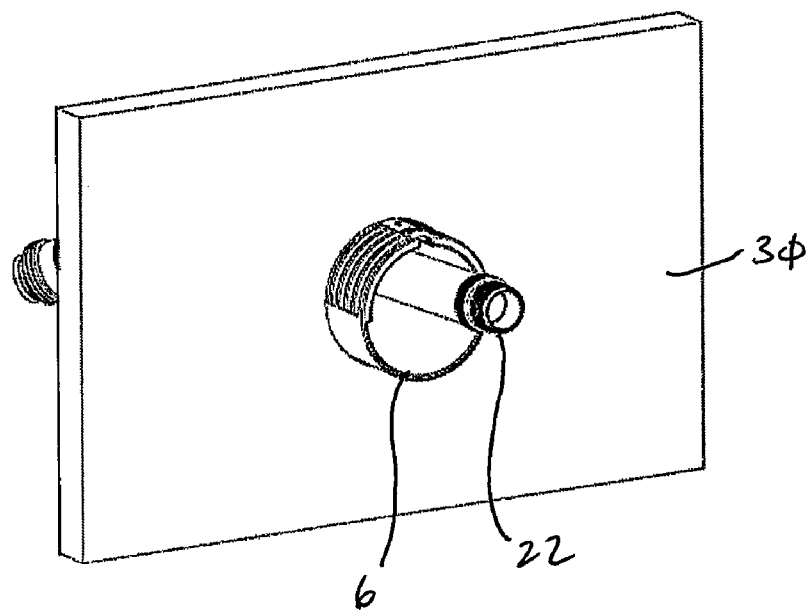
FIG. 41 is a rear perspective view of FIG. 40.
Figure 40:
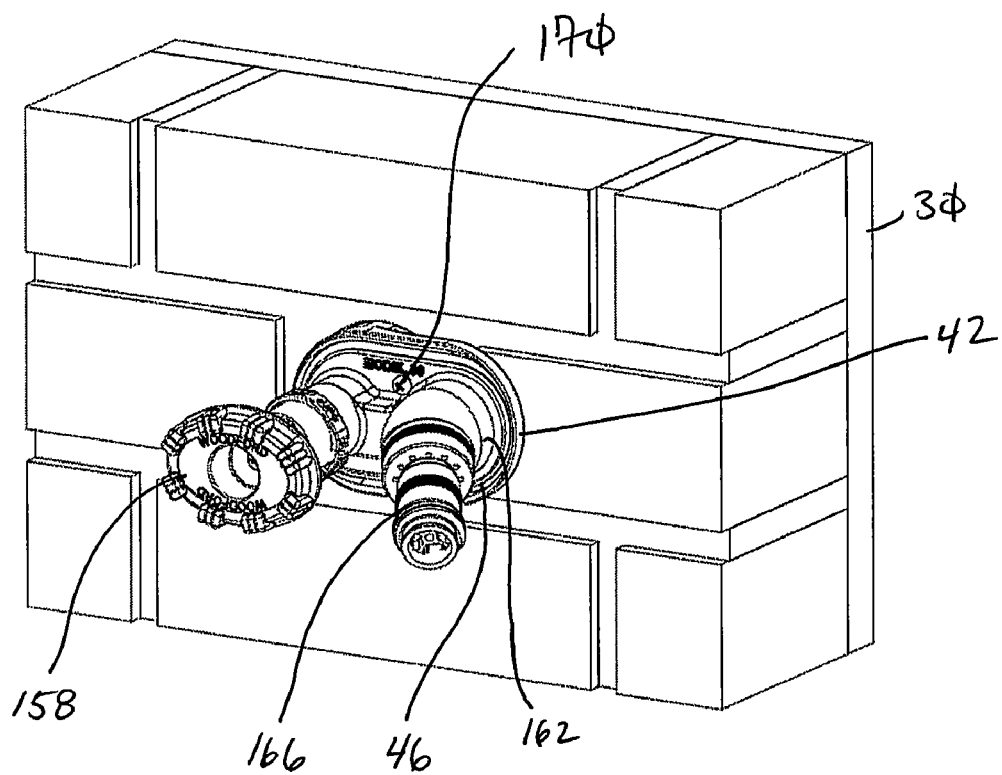
FIG. 40 is a front perspective view similar to that of FIG. 39 wherein exterior building material has been added to the wall.
Figure 42:
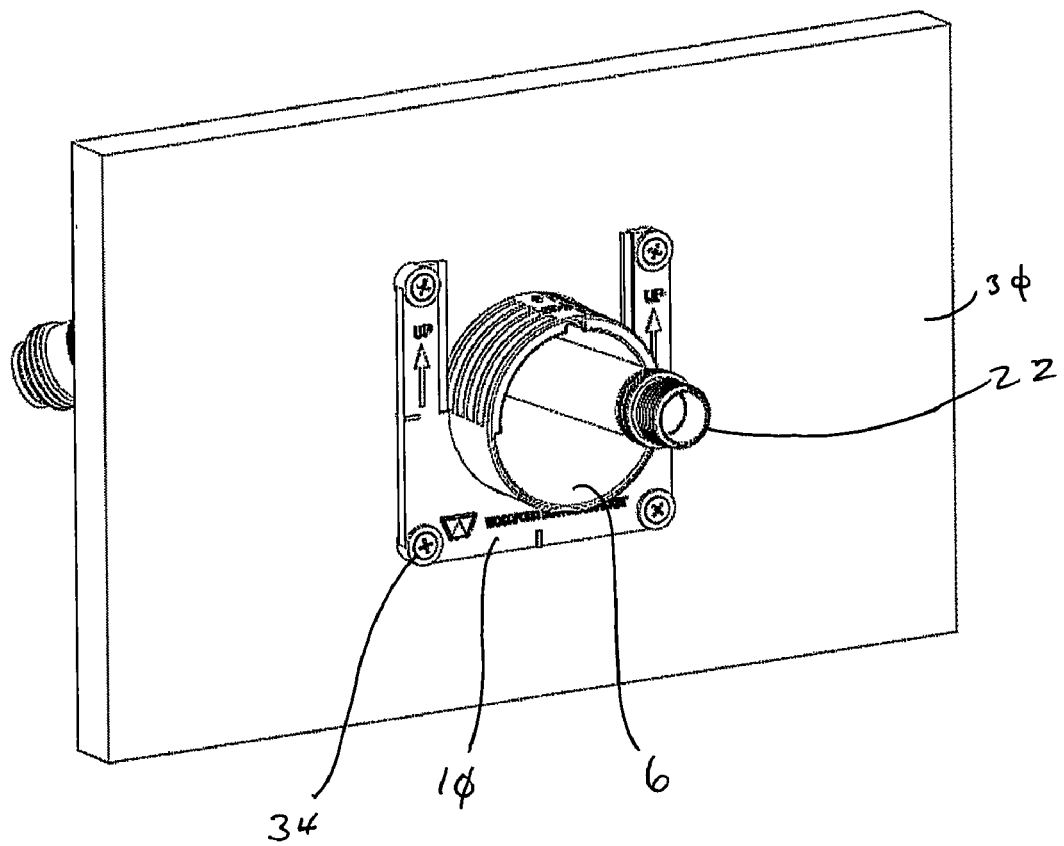
FIG. 42 is a rear perspective view of FIG. 40 wherein a bottom bracket is shown associated with the mounting sleeve.
Figure 43:
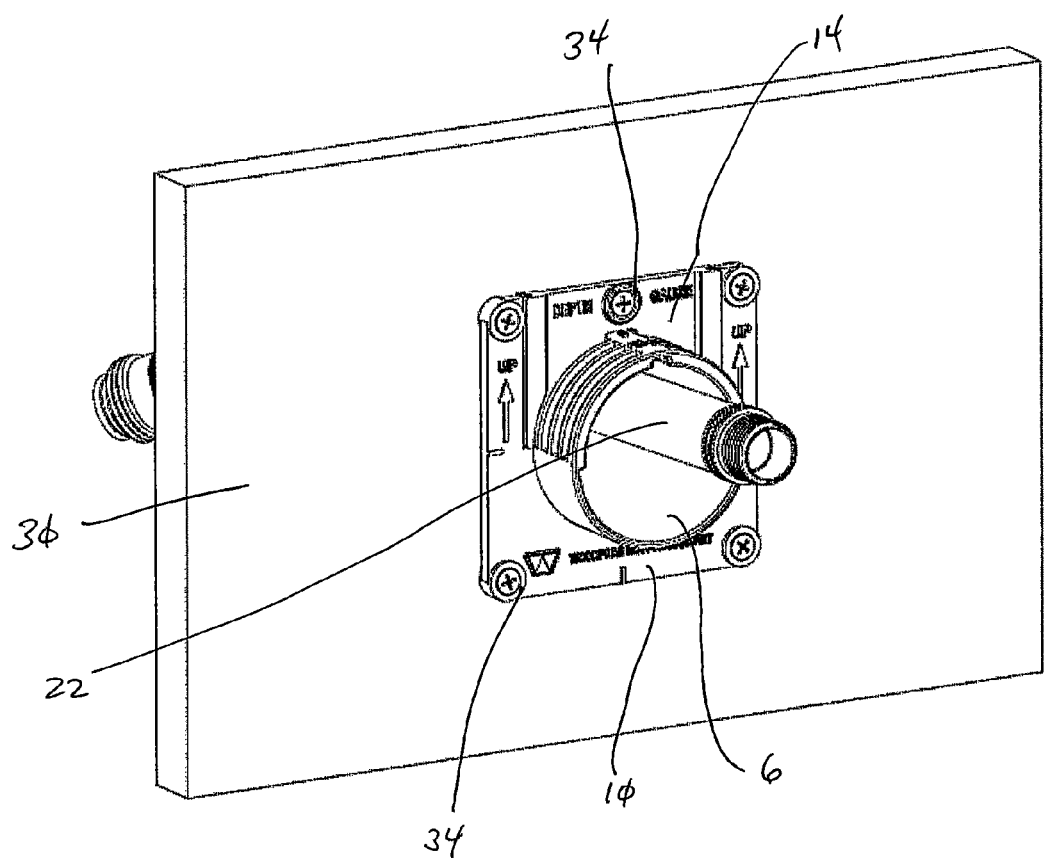
FIG. 43 is a rear perspective view of FIG. 40 wherein a top bracket and bottom bracket has been associated with the mounting sleeve and the wall.
Figure 44:
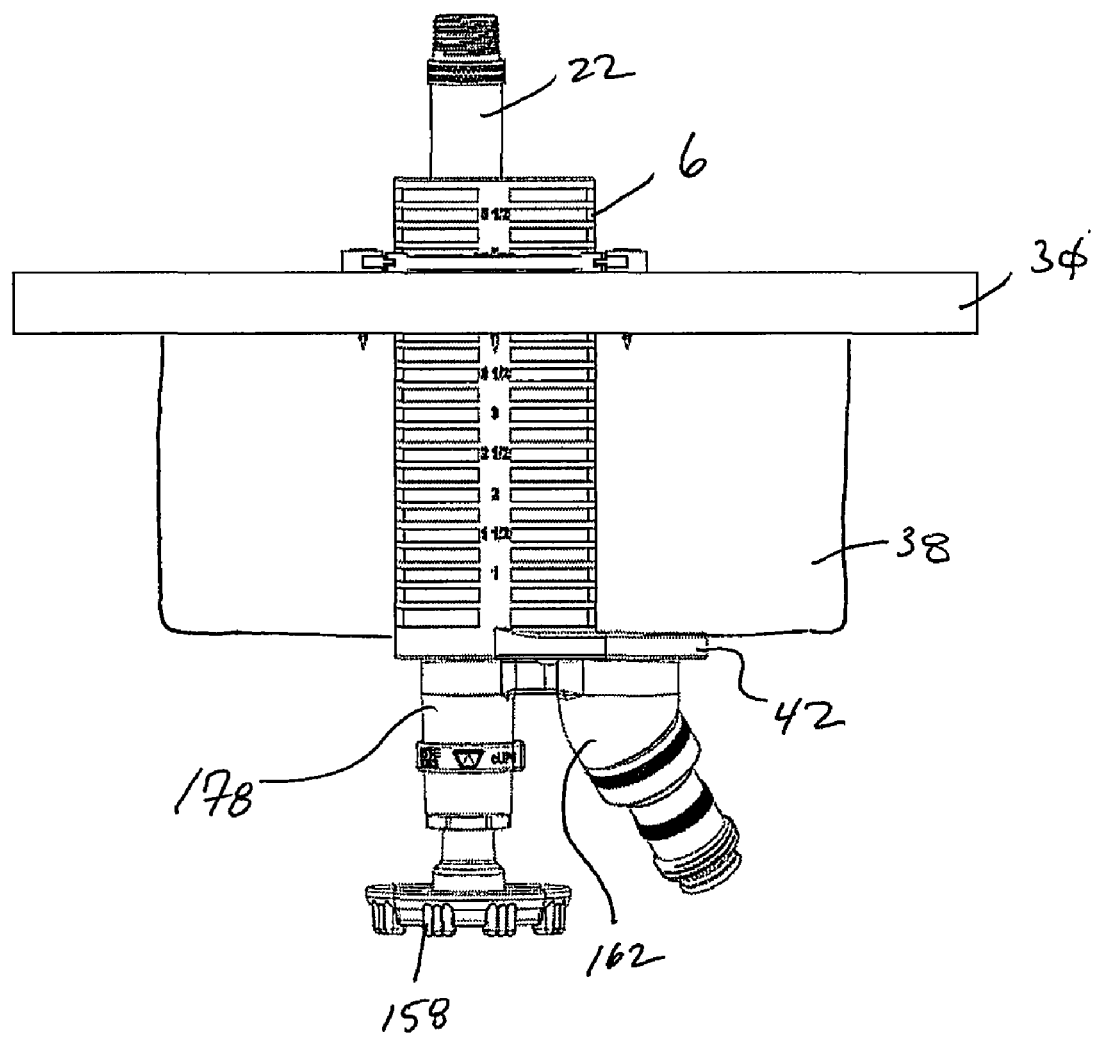
FIG. 44 is a top plan view of FIG. 40 wherein some of the exterior building material has been omitted for clarity.
Figure 45:
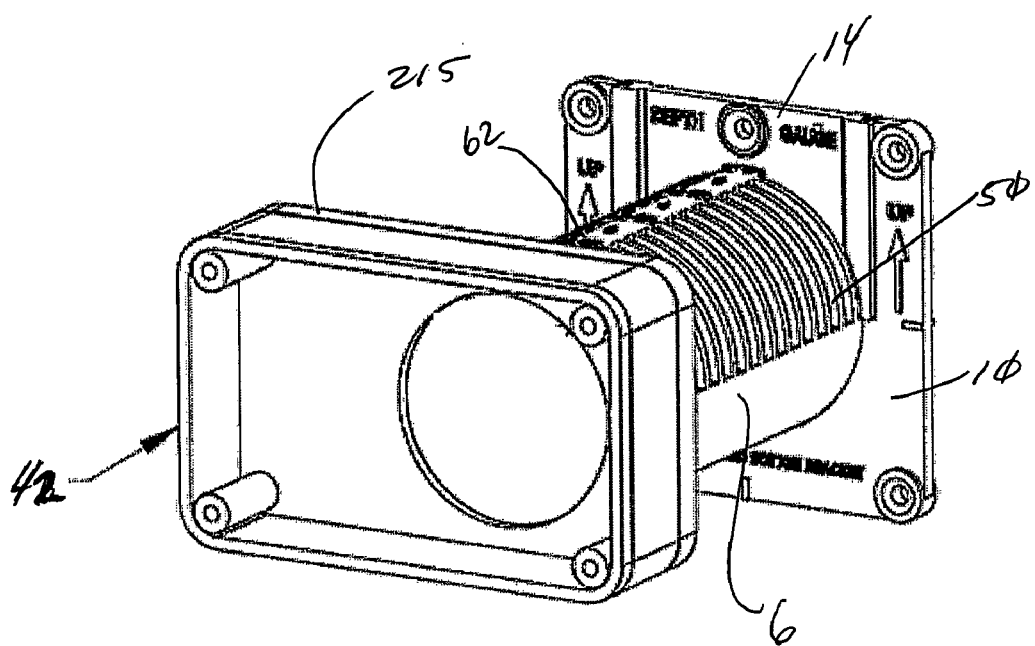
FIG. 45 is a front perspective view of a mounting sleeve of another embodiment of the present invention that is designed to accommodate industrial faucets.
Figure 46:
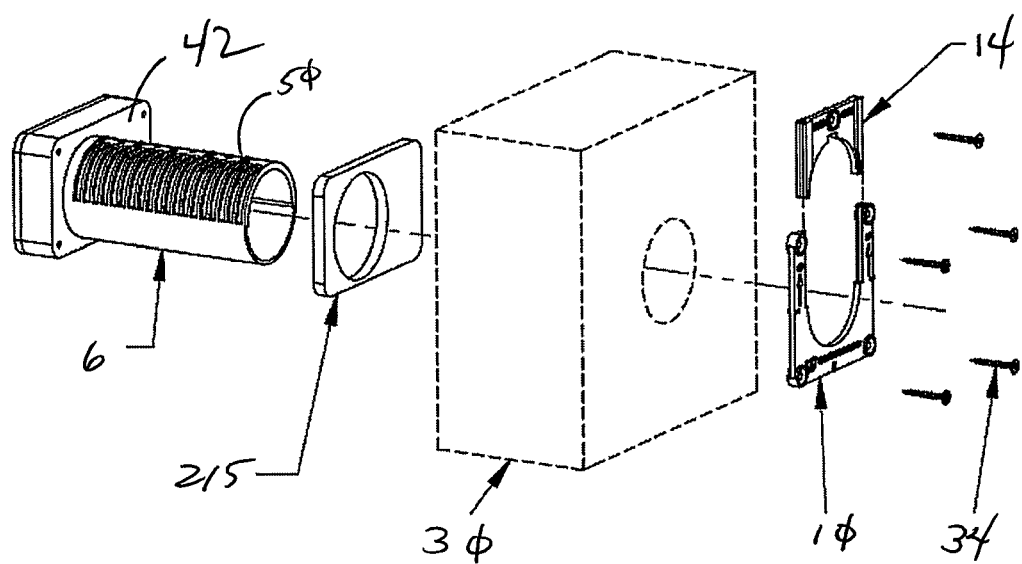
FIG. 46 is a rear exploded perspective view of the mounting sleeve shown in FIG. 45.
Figure 47:
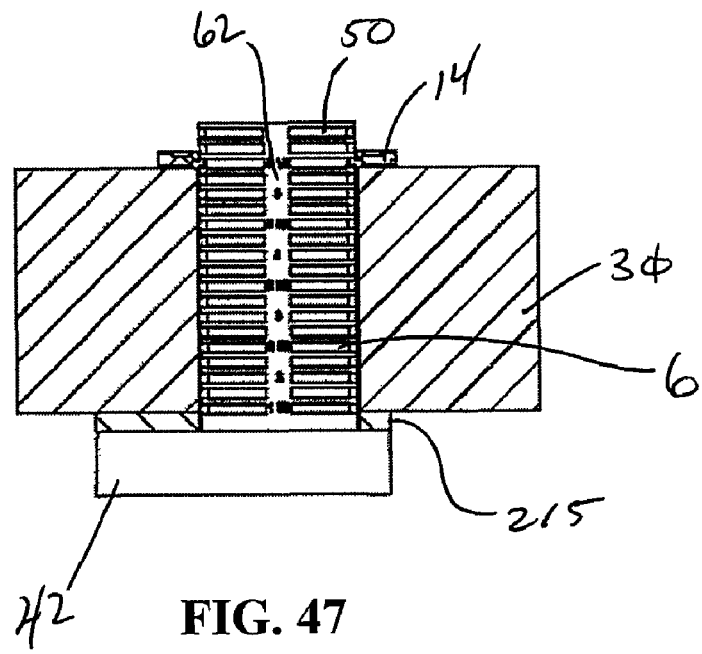
FIG. 47 is top plan view of the mounting sleeve shown in FIG. 45.
Figure 48:
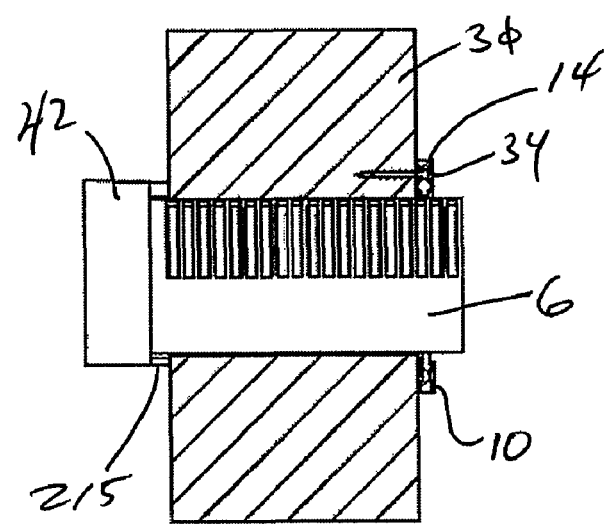
FIG. 48 is a side elevation view of the mounting sleeve shown in FIG. 45.
Figure 49:
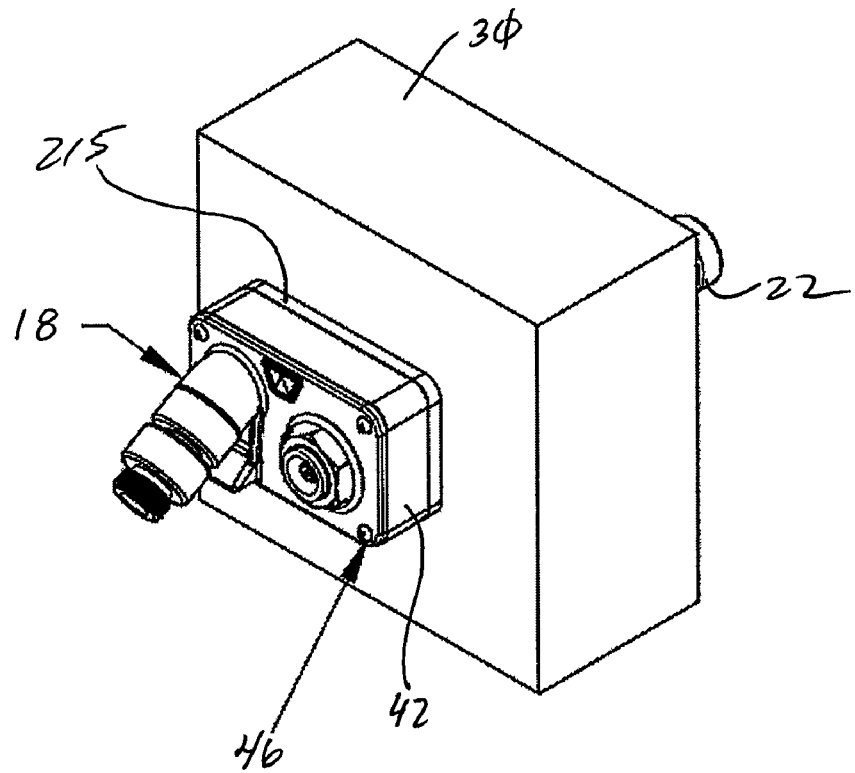
FIG. 49 is a front perspective view of the mounting sleeve shown in FIG. 45 incorporated to a wall.
Figure 50:
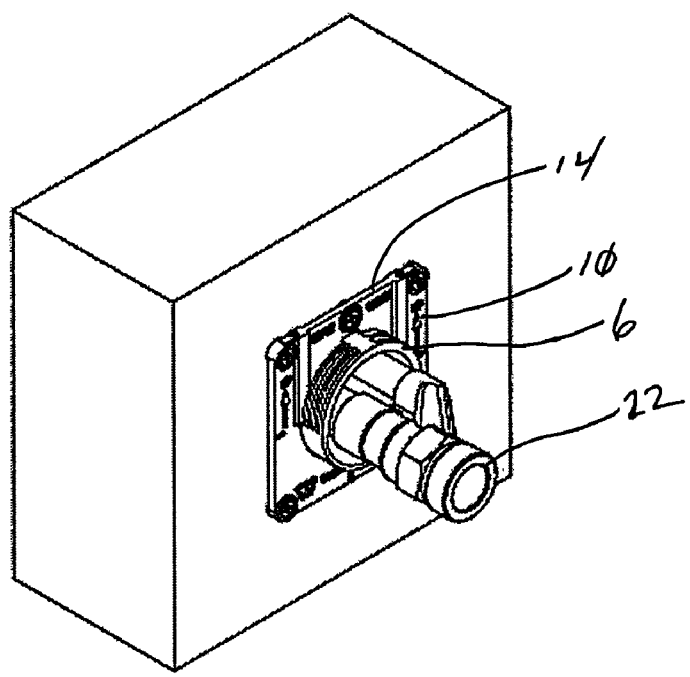
FIG. 50 is a rear perspective view of the mounting sleeve shown in FIG. 45 incorporated to a wall.
Figure 51:
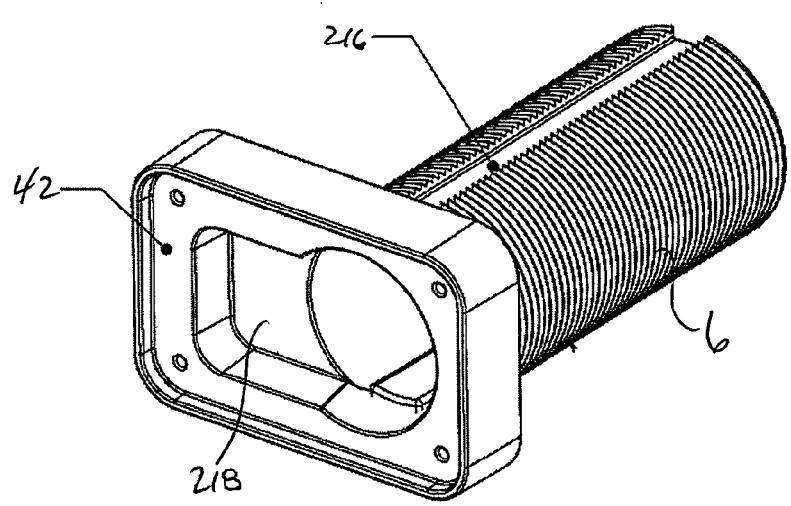
FIG. 51 is a front perspective view of a mounting sleeve of another embodiment of the present invention that is designed to accommodate industrial faucets.
Figure 52:
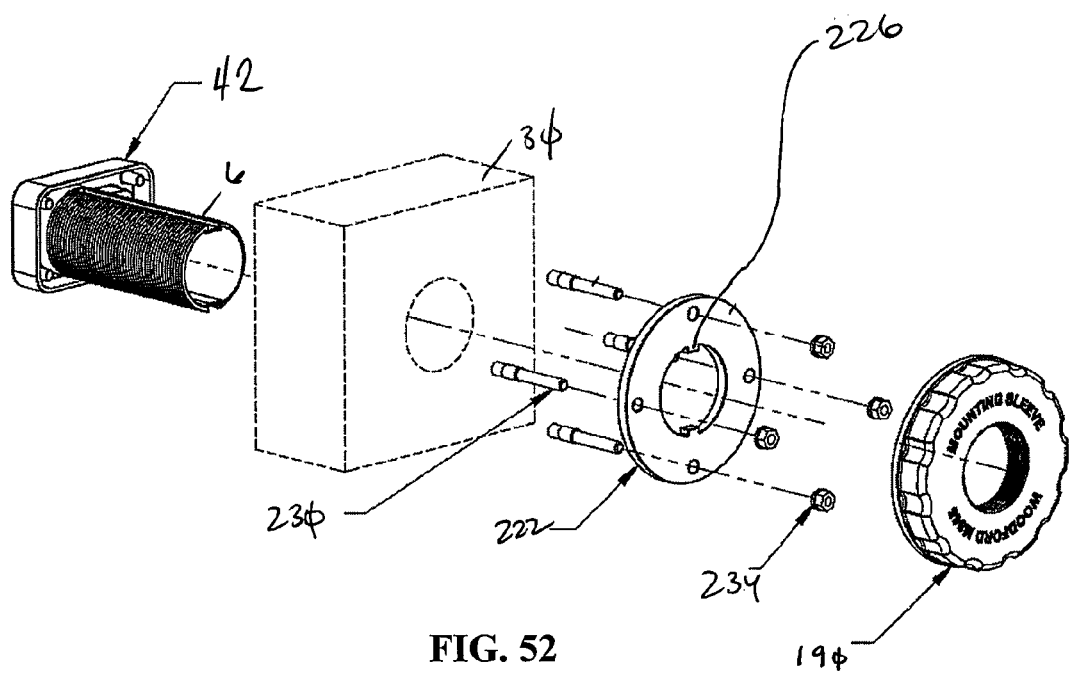
FIG. 52 is a rear exploded perspective view of the mounting sleeve shown in FIG. 51.
Figure 53:
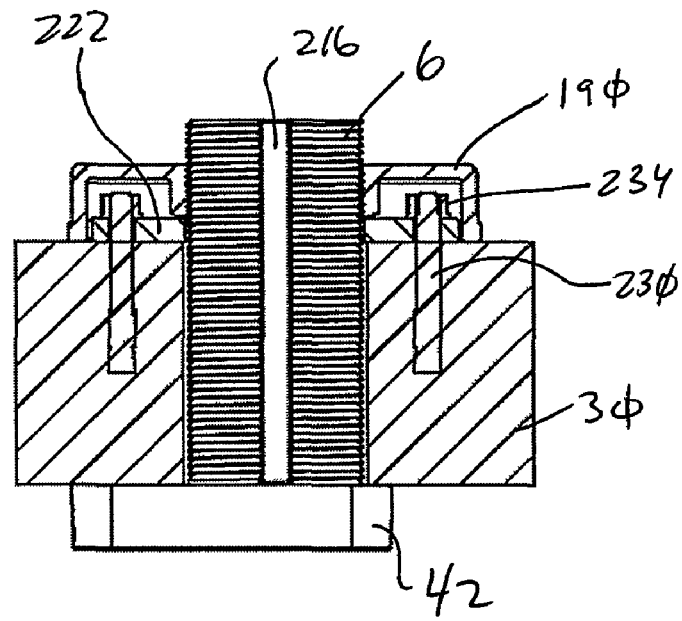
FIG. 53 is top plan view of the mounting sleeve shown in FIG. 51.
Figure 54:
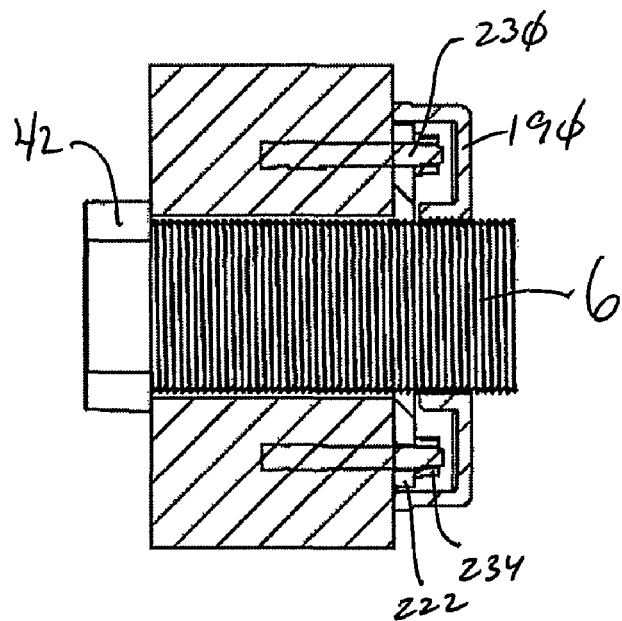
FIG. 54 is a side elevation view of the mounting sleeve shown in FIG. 51.
Figure 55:
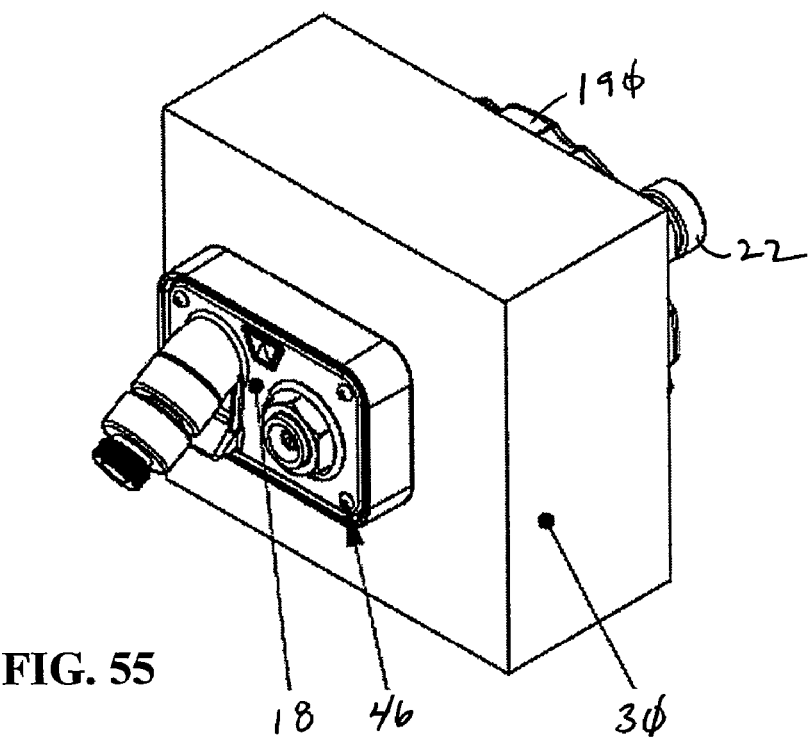
FIG. 55 is a front perspective view of the mounting sleeve shown in FIG. 51; incorporated to a wall.
Figure 56:
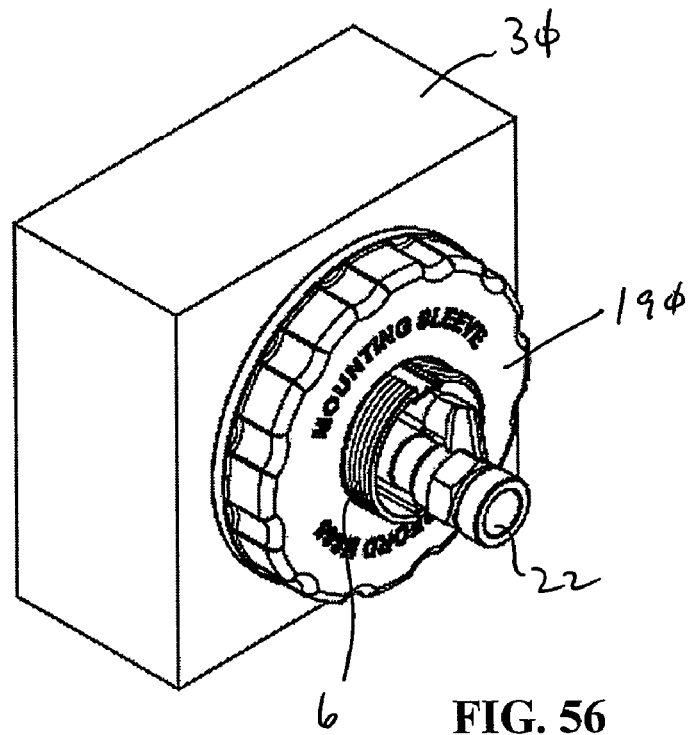
FIG. 56 is a rear perspective view of the mounting sleeve shown in FIG. 51; incorporated to a wall.
Figure 57:
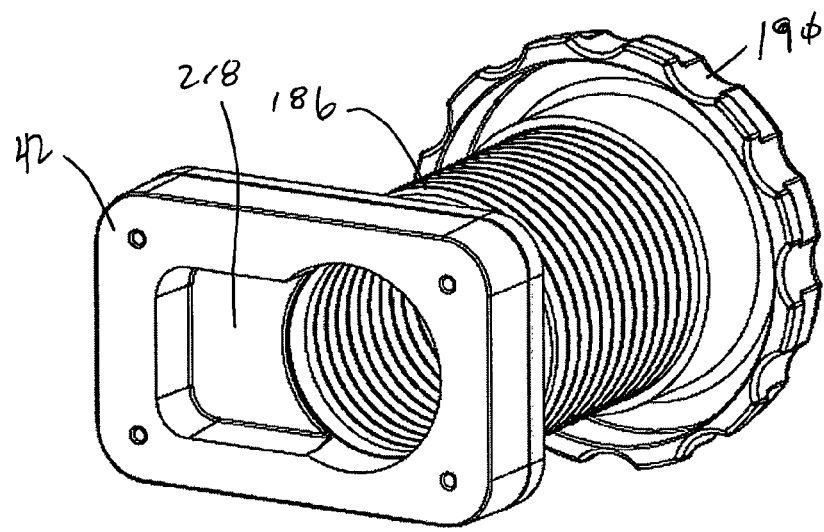
FIG. 57 is a front perspective view of a mounting sleeve of another embodiment of the present invention that employs a nut element.
Figure 58:
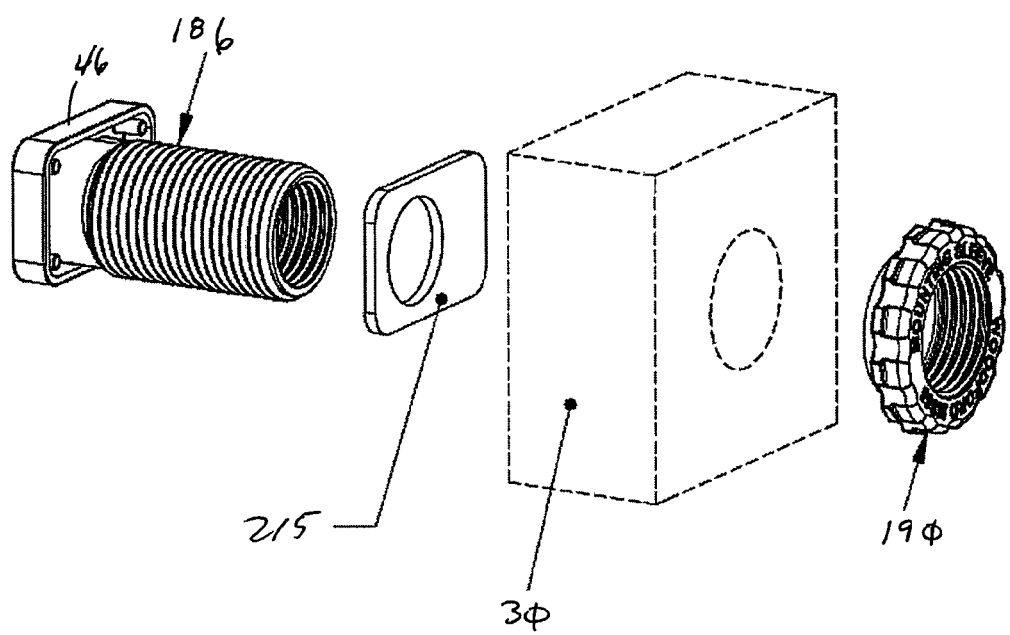
FIG. 58 is a rear exploded perspective view of the mounting sleeve shown in FIG. 57.
Figure 59:
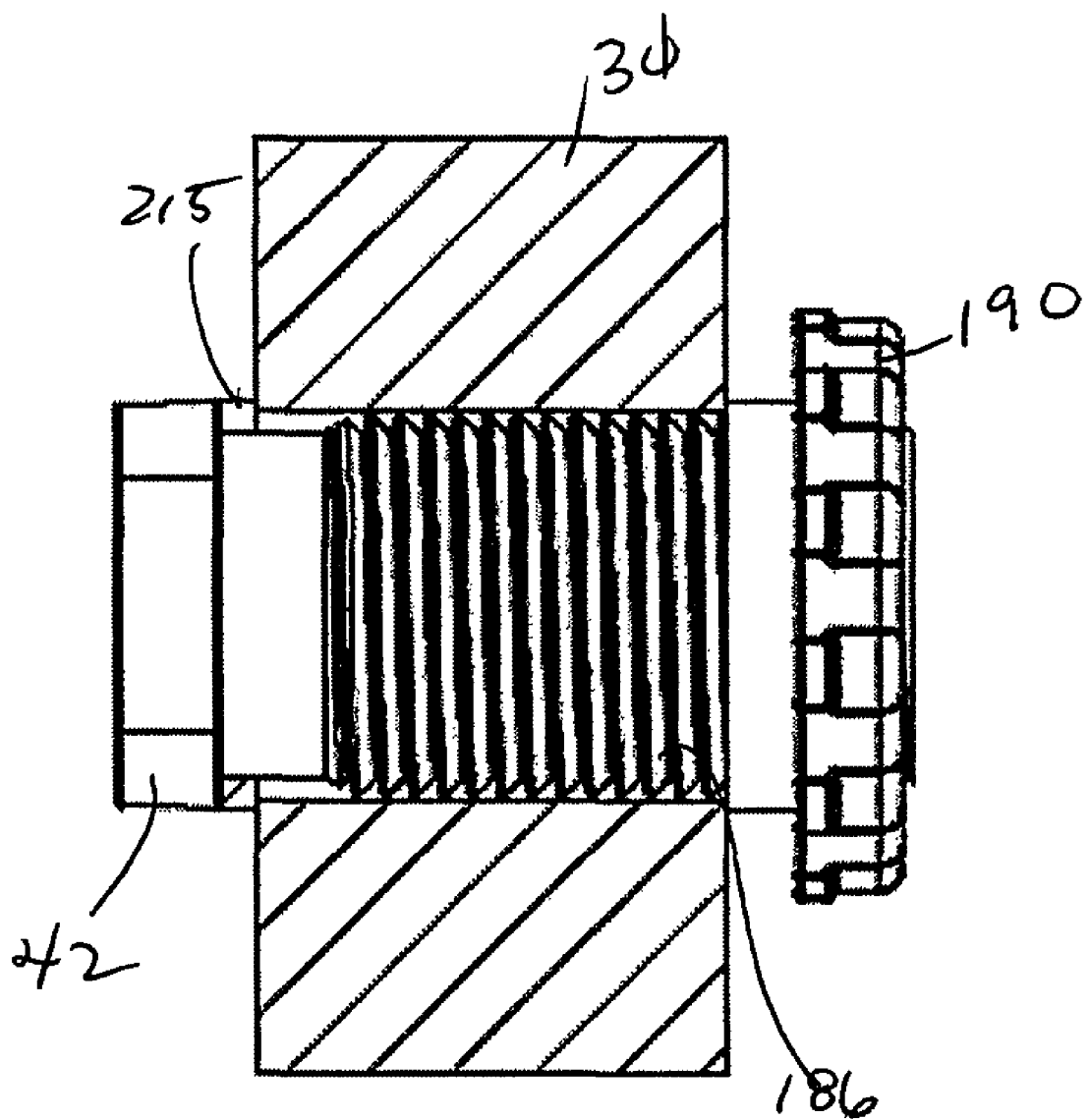
FIG. 59 is a front elevation view of the mounting sleeve of FIG. 57 incorporated into a wall.
Figure 60:
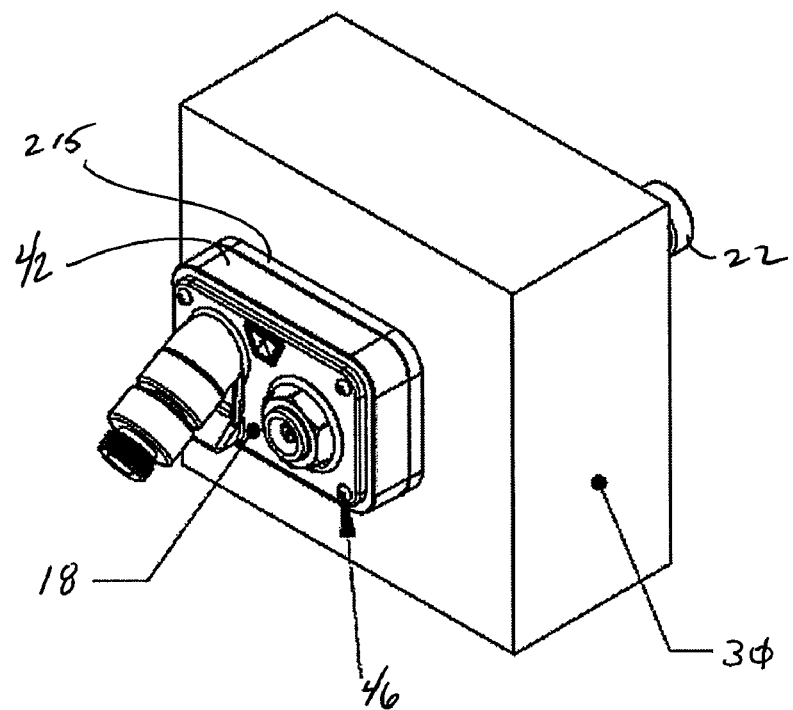
FIG. 60 is a front perspective view of FIG. 59.
Figure 61:
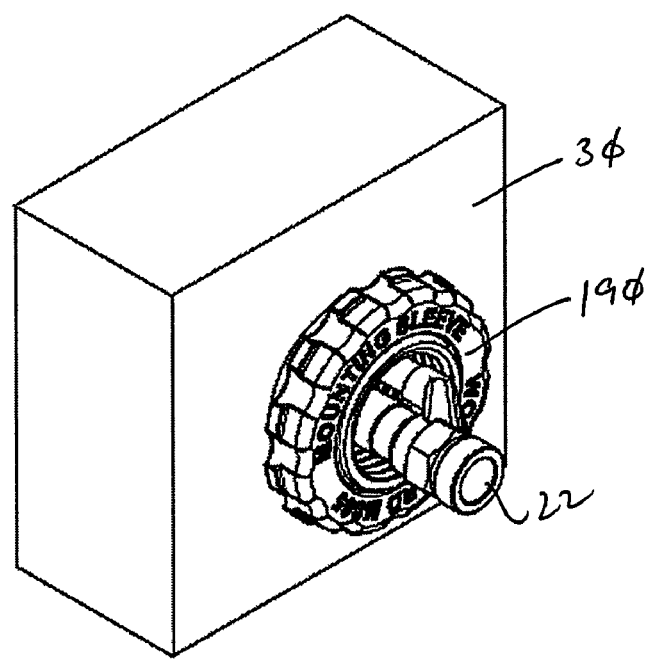
FIG. 61 is a rear perspective view of FIG. 59.
Figure 62:
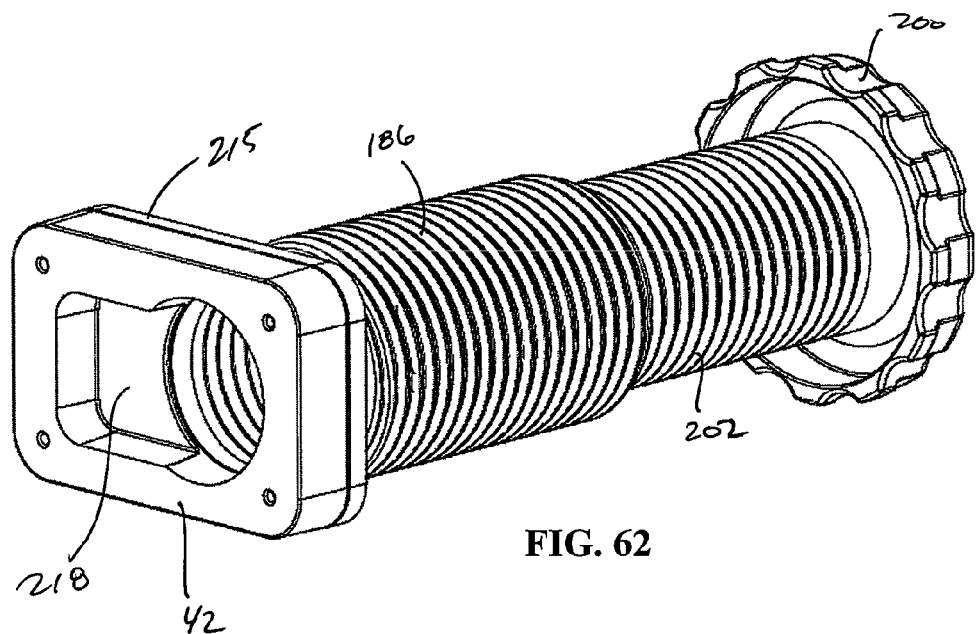
FIG. 62 is a perspective view of another embodiment of the present invention that utilizes a telescoping mounting sleeve.
Figure 63:
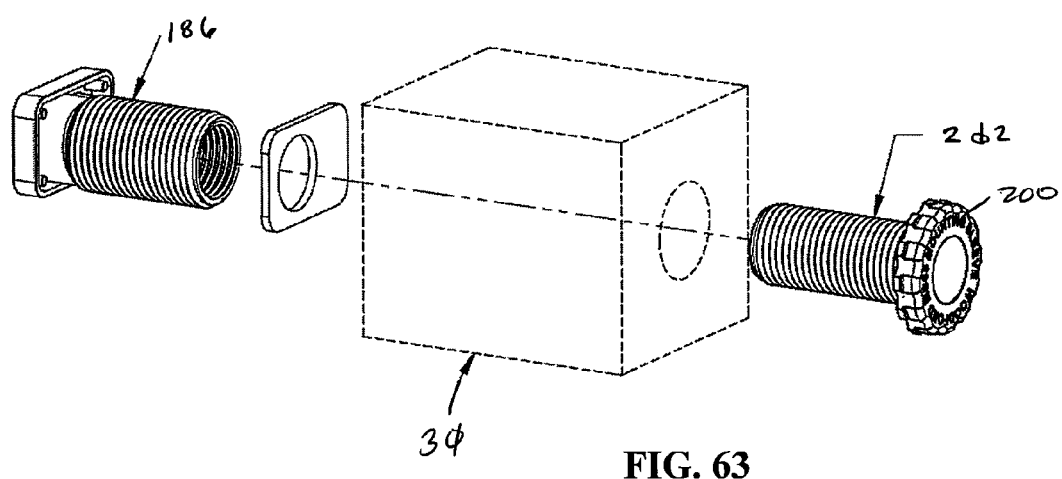
FIG. 63 is a rear exploded perspective view of the mounting sleeve shown in 62.
Figure 64:
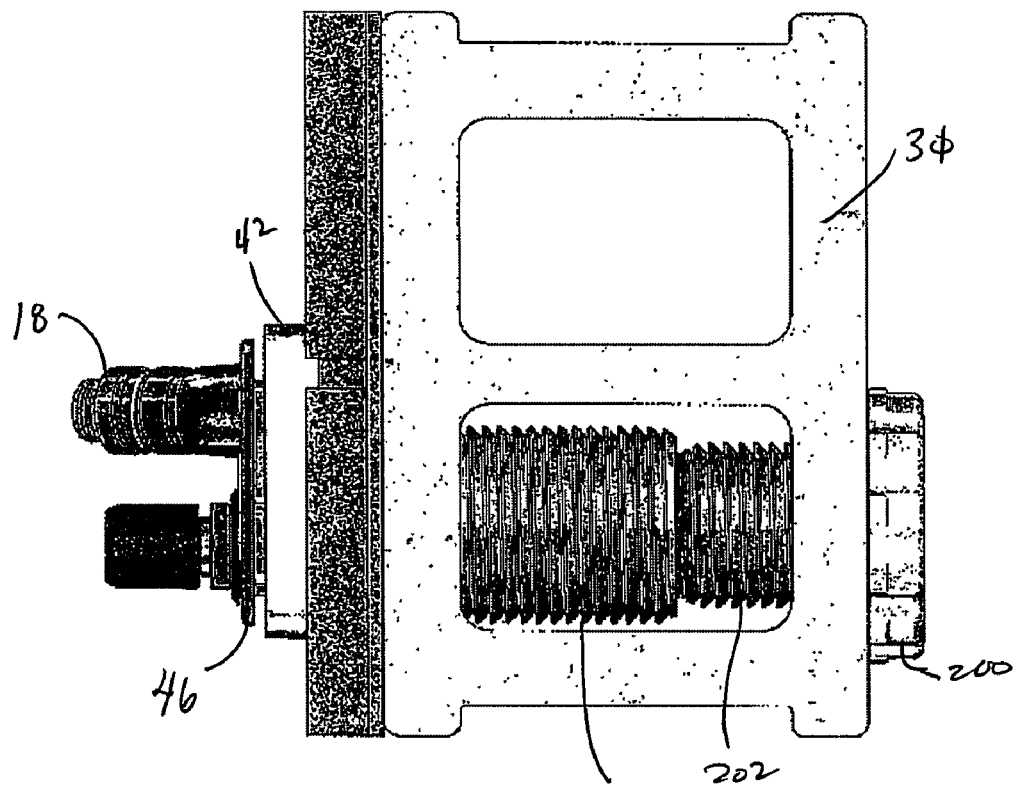
FIG. 64 is a top elevation view of the mounting sleeve shown in FIG. 63.
Figure 65:
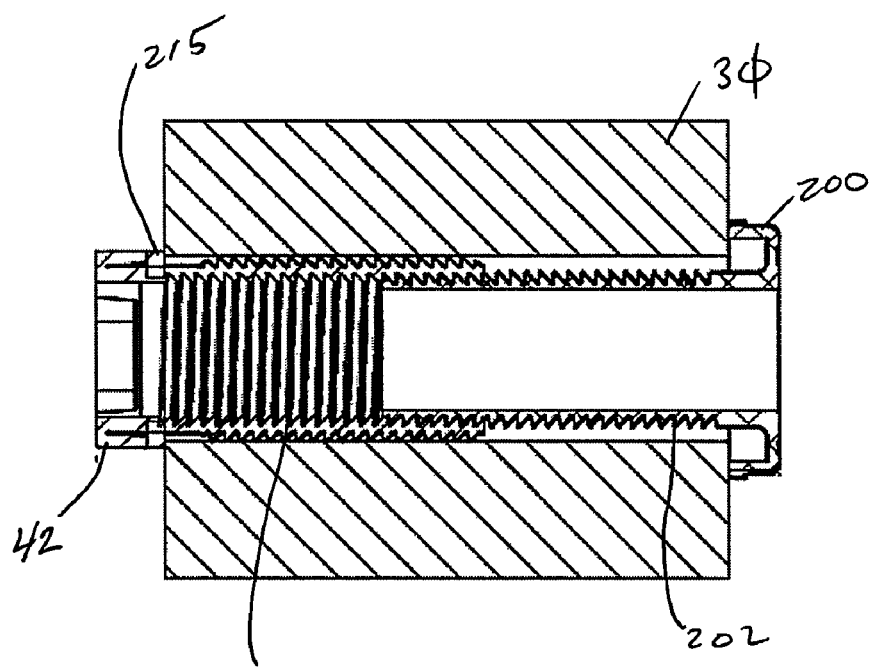
FIG. 65 is a front cross-sectional view of the mounting sleeve shown in FIG. 62.
Figure 66:
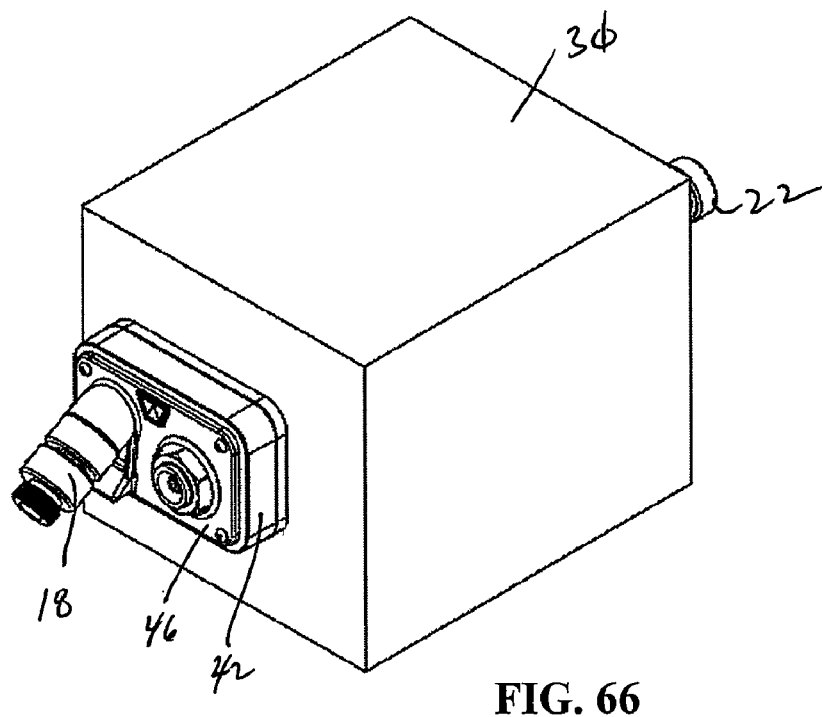
FIG. 66 is a front elevation view of the mounting sleeve of FIG. 62 incorporated into a wall.
Figure 67:
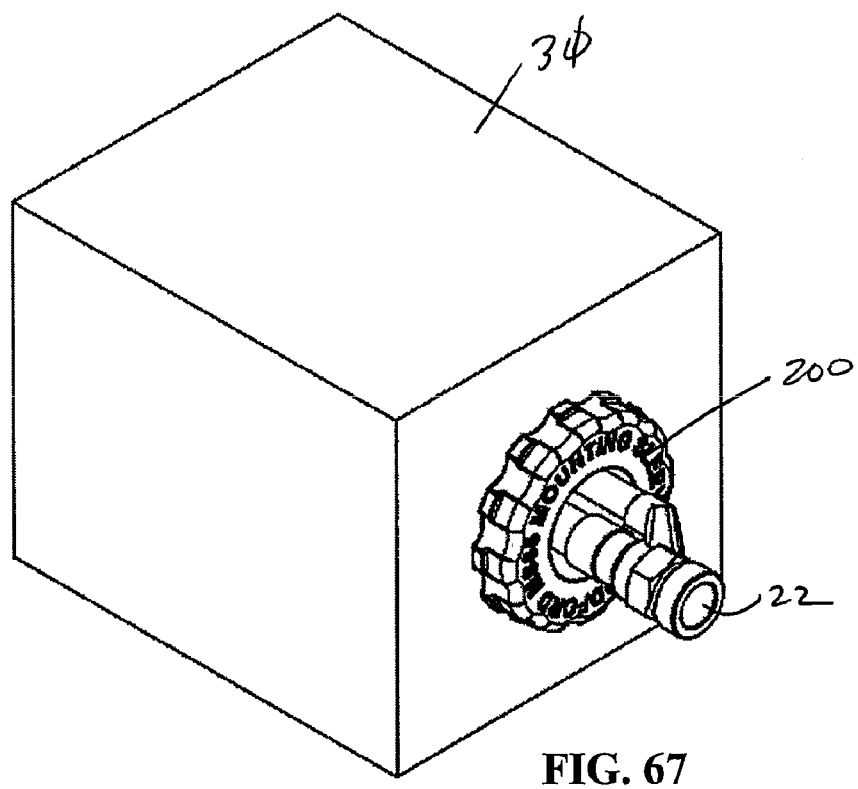
FIG. 67 is a rear elevation view of the mounting sleeve of FIG. 62 incorporated into a wall.
Figure 68:
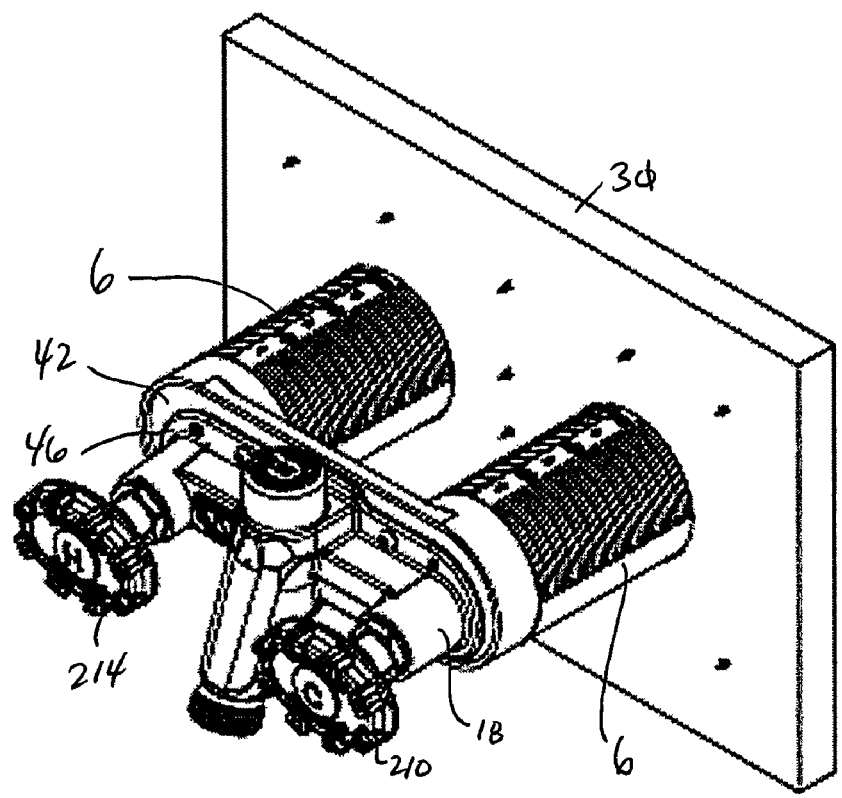
FIG. 68 is a front perspective view of a dual mounting sleeve.
Figure 69:
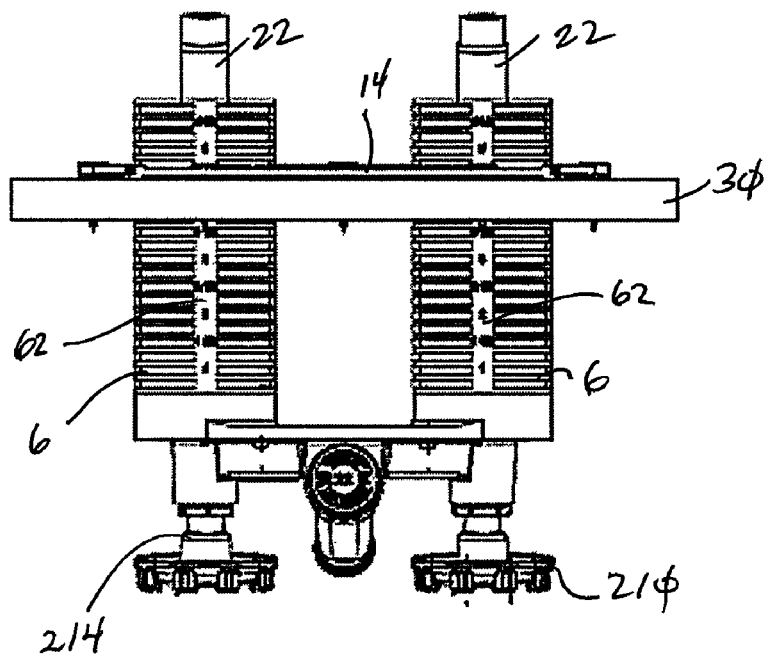
FIG. 69 is a top plan view of FIG. 68.
Figure 70:
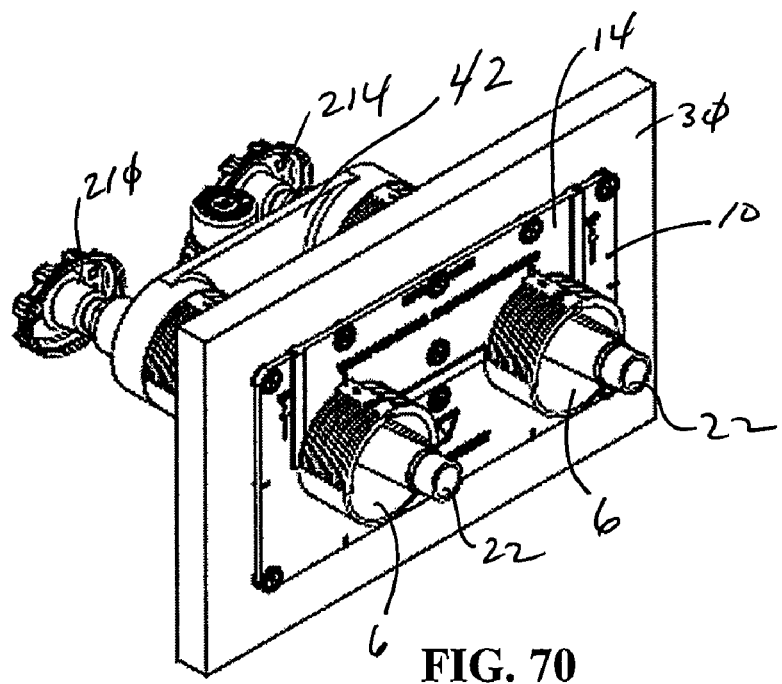
FIG. 70 is a rear perspective view of FIG. 68.
Figure 71:
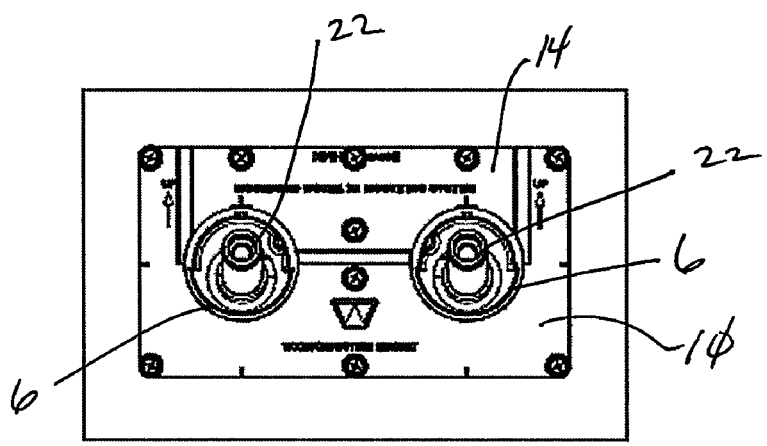
FIG. 71 is a rear plan view of FIG. 68.
Figure 72:
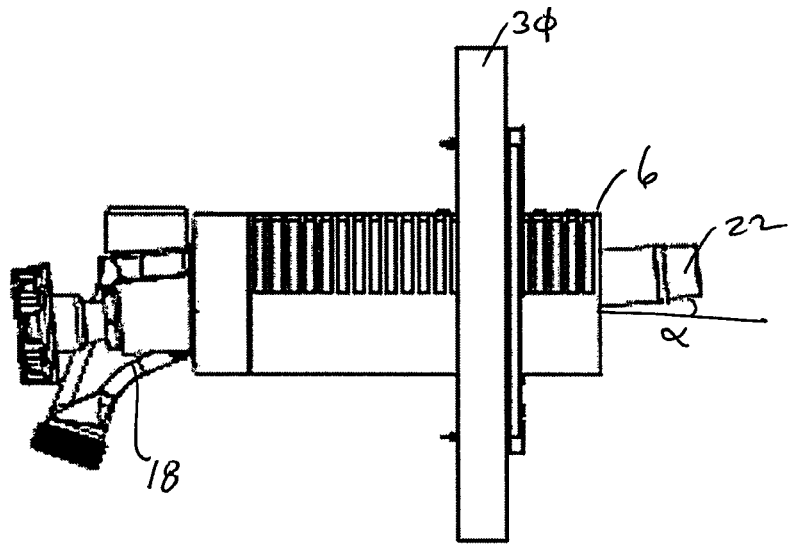
FIG. 72 is a side elevation view of FIG. 68.
Figure 73:
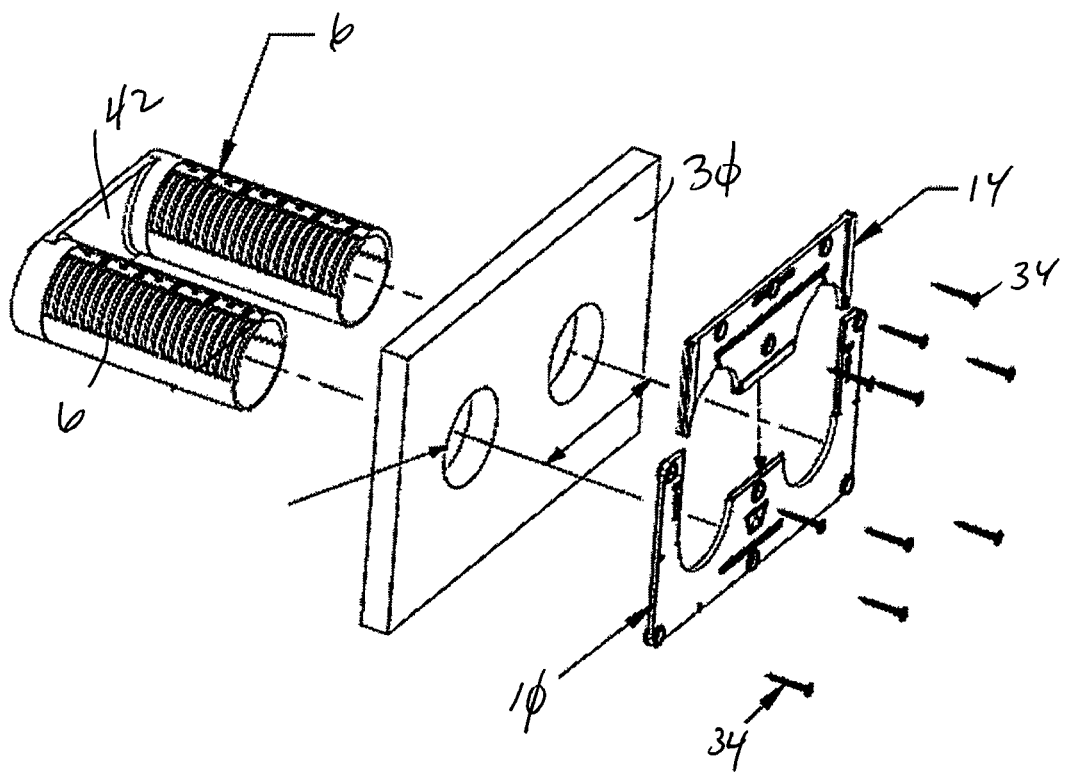
FIG. 73 is an exploded view of FIG. 68.
Figure 74:
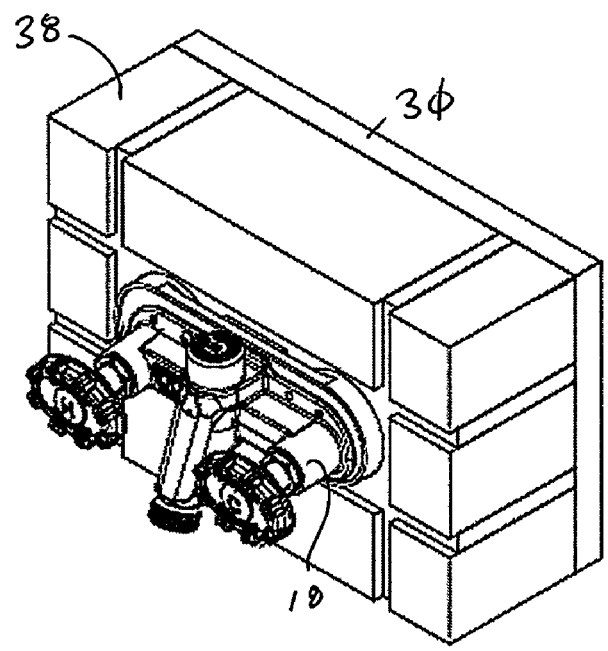
FIG. 74 shows the embodiment of FIG. 68 incorporated into a wall with associated exterior.
Figure 75:
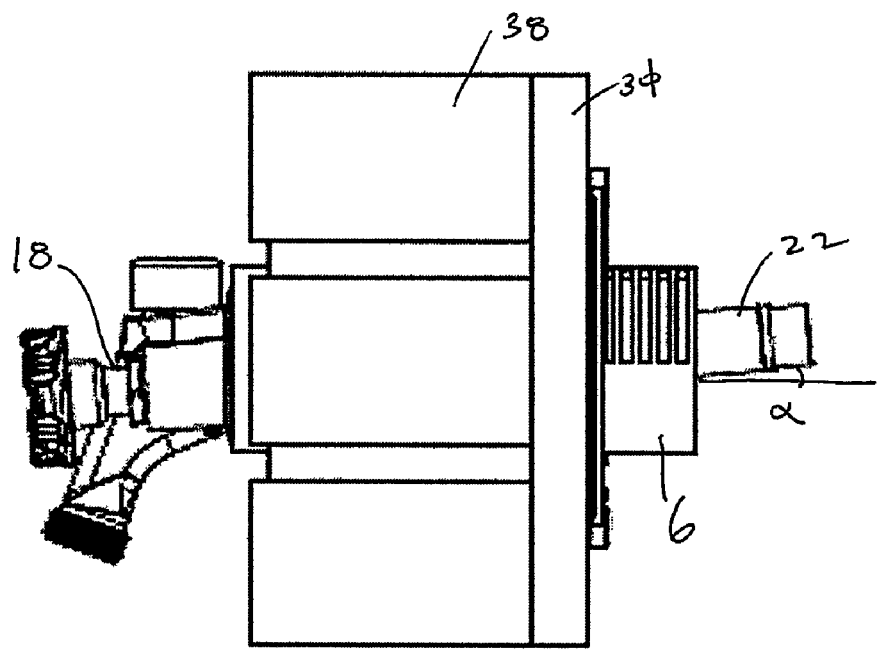
FIG. 75 is a side elevation view of FIG. 74.

Referring now to FIG. 38, the tube 22 is shown angled with respect to the sleeve flange 42. The angulation is important since it helps ensure that water trapped within the tube 22 is efficiently expelled from the valve or outlet of the faucet assembly. In order to achieve this angulation, the faucet mounting sleeve described above used a tube rest 26. This embodiment, however, employs a housing 178 that has an angular inlet that receives the tube 22 such that it is positioned at an angle relative to the housing 178. The flange 42 may be recessed 182 within the mounting sleeve 6 such that the faucet flange 46 resides within a recess 182. This ensures that the faucet flange 46 is oriented correctly in relation to the mounting sleeve 6 so that the tube 42 is also positioned at the appropriate angle to ensure water is not trapped in the tube 22 after the faucet is shut off.

Referring now to FIGS. 39-44, interconnection of the faucet mounting assembly 2 is shown. For example, initially a hole is drilled through an interior wall 30 wherein the faucet mounting assembly 2 is positioned therein. The mounting sleeve 6 is then offset a predetermined distance from the wall 30. Next, the bottom bracket 10 and the top bracket 14 are then interconnected to the mounting sleeve 6 and interconnected by various fasteners 34 onto the wall 30. The exterior building material 38 is then added to the wall 30 such that the sleeve flange 42 is positioned against the exterior building material 38. At this stage, the sleeve flange 42 may be moved relative to the wall 30 as required to accommodate differences in thicknesses often found in the use of varying sizes of exterior building materials, such as stone. Once the proper offset is achieved, the remainder of the exterior building material is added to the wall 30. Next, the faucet assembly is added to the faucet mounting assembly wherein the tube 22 is placed within the mounting sleeve 6 and the faucet flange 46 is engaged onto the sleeve flange 42 via a plurality of screws 170. One skilled in the art will appreciate that the faucet assembly may be interconnected to the faucet mounting assembly prior to the addition of the exterior building materials. The faucet flange 46 is placed within the recess (not shown) of the sleeve flange 42 to help facilitate the orientation of the faucet assembly and thus to ensure that the tube 22 is positioned at the appropriate angle to allow fluid egress from the outlet 162 and/or valve 166.

Referring now to FIGS. 45-50, another embodiment of the present invention is shown that is specifically designed to accommodate larger industrial faucets. The faucet mounting sleeve 6 is selectively associated with an upper bracket 14 and a lower bracket 10, as described above with respect to FIGS. 1-33. In addition, the faucet flange 46 engages the sleeve flange 42 such that the tube 22 is situated at an angle such that water is allowed to escape through the faucet 18 when it is turned off. Thus, the tube support rest as described above is required. However, one skilled in the art will appreciate that a tube rest may be used to help support the tube 22. This embodiment of the present invention also includes a mounting sleeve 6 having an offset indicator 62 and a series of grooves 50 that engage the upper bracket 14 and/or lower bracket 10 to prevent movement of the sleeve 6 subsequent to installation. The upper bracket 14 and lower bracket 10 interconnect the wall 30 as described above. A seal 215 may also be placed between the sleeve flange 42 and the wall 30.

Referring now to FIGS. 51-56, yet another embodiment of the present invention is shown that uses a mounting sleeve having a groove 216 therein. More specifically, a mounting sleeve similar to those described above is shown having at least one groove 216 integrated along the length thereof. This embodiment of the present invention may also include a pocket 218 that receives a portion of the faucet 18 (now shown). In operation, the mounting sleeve 6 is placed through a hole in a wall 30. An anchor plate 222 is then slid around the sleeve 6. The anchor plate preferably has at least one key 226 that is received within the groove 216, thereby preventing rotation of the sleeve 6 and associated sleeve flange 42. Prior to placing the anchor plate 222 onto the wall 30, a plurality of holes (now shown) are drilled into the wall 30 that receive a plurality of anchor bolts 230. The anchor bolts are also received within apertures in the anchor plate 222 and are secured and the anchor plate 222 is secured to the anchor bolts 230 by a plurality of nuts 234. This configuration prevents the anchor plate 222 from rotation and thus prevents the sleeve 6 and associated sleeve flange 42 from rotating as well. In order to prevent the sleeve 6 and associated flange 42 from pulling away from the wall 30, a nut element is screwed onto the threads of the mounting sleeve 6. One skilled in the art will appreciate that other methods, such as an interference fit between the mounting sleeve 6 and the anchor plate 222 may be employed to achieve this function. Further, other methods, as described in this specification or generally known in the art may be used to achieve this function.

Referring now to FIGS. 57-61, another embodiment of the present invention is shown that employs a threaded sleeve 186 that receives a nut element 190. The nut element is adapted to rotate relative to the threaded member 186, thereby moving the nut element 190 with respect to the sleeve flange 42. In operation, the sleeve 186 is placed through a hole in the wall 30 wherein the sleeve flange 42 is abutted against an exterior portion of the wall 30. The nut element 190 is then tightened on to the other side of the wall 30 to secure the mounting sleeve 186 and associated faucet 18 relative to the wall.

Referring now to FIGS. 62-67, yet another embodiment of the present invention is shown that employs an adjustable threaded mounting sleeve. More specifically, a threaded mounting sleeve 186 is employed in combination with a threaded stem 202 that is associated with a nut element 200. As succinctly shown in FIGS. 64 and 65, this telescoping member allows the mounting sleeve to be used in conjunction with thicker walls. One skilled in the art will appreciate that the stem 202 may be associated on the outside of the threaded mounting sleeve 186 as opposed to inside the threaded mounting sleeve 186. This embodiment of the present invention contemplates that the threaded mounting sleeve 186 may be used with a nut element 190 described above with respect to FIGS. 57-61 for certain situations, but if the wall 30 thickness is increased, the nut 190 may be replaced by the nut element 200 having the extended stem 202. It also should be understood that the threaded sleeve 186 may receive a stem 202 that is not associated with a nut element 200. For example, one skilled in the art will appreciate that embodiments of the present invention may employ an extending piece somewhat like the stem 202 that fits into internal threads of the sleeve 186. This member could be made of any length and selectively cut to fit a particular situation. Then a free standing nut element, similar to that shown as 200, may be used to complete the assembly.

Referring now to FIGS. 68-75, another embodiment of the present invention is shown that employs at least two mounting sleeves 6. The mounting sleeves 6 are interconnected to an elongated sleeve flange 42 and receive a cold water inlet 210 and a hot water inlet 214. The mounting sleeve 6 are similar to those described above with respect to FIGS. 1-33 and include an offset indicator 62, an upper bracket 14, and a lower bracket 10. Tube rests (not shown) that ensure that the pipes 22 are at the proper angle, may also be employed. Often, however, the faucet flange 46, of this embodiment or any embodiment of the invention disclosed herein, provides the necessary angle (α) for the tubes 22, in which case the tube rest is not required. One skilled in the art will appreciate that the sleeve flange 42 may be alternatively associated with a wider one-piece sleeve that accommodates both tubes 22. However, such a configuration shown, lends itself easily to be installed wherein the holes drilled through the wall 30 may be done with common drill bits (9/16 inch, for example) without further alterations to the wall 30. As shown succinctly in FIGS. 74 and 75, the offset of the faucet 18 with respect to the wall 30 may be selectively altered to accommodate an exterior building surface 38 as described herein.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. In addition, one skilled in the art will appreciate that aspects of other inventions may be incorporated and are added in combination to the embodiments of the present invention disclosed herein. For example, aspects of the inventions disclosed in, for example, U.S. Pat. Nos. 6,142,172 and 6,431,204, both of which being incorporated by reference herein, which concern wall faucets, may be incorporated into embodiments of the present invention.

What is claimed is:

1. A faucet mounting assembly adapted to secure a faucet assembly, comprising:
   a bottom bracket having an arcuate surface that is adapted to interconnect to an interior structure of a dwelling;
   a first cylindrical mounting sleeve having a first end, a second end, a top portion with a plurality of spaced grooves that are defined by equally-spaced and parallel ridges, and a smooth bottom surface, said first end associated with an elongated flange, which is adapted to receive and secure a non-circular faucet flange, said first cylindrical mounting sleeve being selectively engaged onto said arcuate surface of said bottom bracket;
   a second cylindrical mounting sleeve having a first end, a second end, a top portion with a plurality of spaced grooves that are defined by equally-spaced and parallel ridges, and a smooth bottom surface, said first end being interconnected to said elongated flange, said second cylindrical mounting sleeve being selectively engaged onto said arcuate surface of said bottom bracket wherein said first cylindrical mounting sleeve and said second cylindrical mounting sleeve are capable of moving relative to said bottom bracket to alter the distance between said elongated flange and the interior structure; and
   a top bracket selectively interconnected to said bottom bracket wherein said first mounting sleeve and said second mounting sleeve are positioned therebetween, said top bracket being positioned within one of said plurality of spaced grooves of said first cylindrical mounting sleeve and within one of said plurality of spaced grooves of said second cylindrical mounting sleeve to substantially fill the same such that said first cylindrical mounting sleeve and said second cylindrical mounting sleeve are secured relative to said bottom bracket and said top bracket such that substantial movement of said first cylindrical mounting sleeve and said second cylindrical mounting sleeve in a direction parallel to their longitudinal axes is prevented.

2. The assembly of claim 1, wherein said elongated flange possesses a profile that matches a profile of the non-circular faucet flange.

3. The assembly of claim 1, wherein said elongated flange includes a recess for receiving the non-circular faucet flange.

4. The assembly of claim 1, wherein said elongated flange is selectively interconnected to at least one of said first mounting sleeve and said second mounting sleeve.

5. A fluid delivery system interconnected to a structure, comprising:
   a faucet assembly that includes a faucet with an associated non-circular faucet flange and a first fluid delivery tube and a second fluid delivery tube in communication with said faucet;
   a first mounting sleeve having a first end interconnected to said non-circular faucet flange and a second end that receives said first fluid delivery tube, said first mounting sleeve also including a plurality of spaced grooves that are defined by equally-spaced and parallel ridges, and a smooth bottom surface;
   a second mounting sleeve having a first end interconnected to said non-circular faucet flange and a second end that receives said second fluid delivery tube, said second mounting sleeve also including a plurality of spaced grooves that are defined by equally-spaced and parallel ridges, and a smooth bottom surface; a bottom bracket interconnected to an interior surface of the structure; and
   a top bracket selectively interconnected to said bottom bracket with said mounting sleeves positioned therebetween wherein said top bracket is positioned within and substantially filling one groove of the plurality thereof of said first mounting sleeve and said second mounting sleeve.

6. The assembly of claim 5, wherein said first mounting sleeve and said second mounting sleeve are cylindrical.

7. The assembly of claim 5, wherein at least one of said first mounting sleeve and said second mounting sleeve includes a device for measuring.

8. The assembly of claim 5, wherein said non-circular faucet flange includes a recess that is adapted to provide an interconnection location for a faucet flange provided on the faucet assembly.

9. The assembly of claim 5 wherein said top bracket includes a channel that selectively engages a tongue provided in said bottom bracket to secure said top bracket to said bottom bracket.

* * * * *